US010277299B2

(12) United States Patent
Moshfeghi

(10) Patent No.: US 10,277,299 B2
(45) Date of Patent: Apr. 30, 2019

(54) METHOD AND SYSTEM FOR OPTIMIZING COMMUNICATION USING REFLECTORS IN DISTRIBUTED TRANSCEIVER ENVIRONMENTS

(71) Applicant: Golba LLC

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 74 days.

(21) Appl. No.: 15/372,417

(22) Filed: Dec. 8, 2016

(65) Prior Publication Data
US 2017/0156069 A1    Jun. 1, 2017

Related U.S. Application Data

(63) Continuation of application No. 13/919,972, filed on Jun. 17, 2013, now Pat. No. 9,548,805.
(Continued)

(51) Int. Cl.
*H04W 24/02* (2009.01)
*H04B 7/10* (2017.01)
(Continued)

(52) U.S. Cl.
CPC ............. *H04B 7/0697* (2013.01); *H04B 7/02* (2013.01); *H04B 7/024* (2013.01); *H04B 7/0456* (2013.01);
(Continued)

(58) Field of Classification Search
CPC .......... H04W 24/02; H04L 5/00; H04B 7/046; H04B 7/10; H04B 17/336
See application file for complete search history.

(56) References Cited

U.S. PATENT DOCUMENTS 3,618,097 A    11/1971   McLeod, Jr.
5,525,990 A     6/1996   Lewis
(Continued)

FOREIGN PATENT DOCUMENTS

WO    WO 2013/058998    4/2013
WO    WO 2013/058999    4/2013

OTHER PUBLICATIONS

U.S. Appl. No. 15/472,148, filed Mar. 28, 2017, Moshfeghi, Mehran.
(Continued)

*Primary Examiner* — Jeffrey M Rutkowski
*Assistant Examiner* — Jonathan Wood
(74) *Attorney, Agent, or Firm* — Makoui Law, PC

(57) ABSTRACT

A communication device may comprise a plurality of distributed transceivers and one or more corresponding antenna arrays. A processor may configure a first distributed transceiver to receive signals comprising one or more first data streams via one or more first communication links. The processor may configure a second distributed transceiver to receive signals comprising one or more second data streams via one or more second communication links. The processor may determine a channel response matrix associated with communication of the one or more first data streams via the one or more first communication links and/or the one or more second data streams via the one or more second communication links. The processor may optimize one or both of link capacity and/or link reliability of the one or more first communication links and/or the one or more second communication links based on the determined channel response matrix.

22 Claims, 25 Drawing Sheets

Related U.S. Application Data

(60) Provisional application No. 61/725,005, filed on Nov. 11, 2012, provisional application No. 61/680,872, filed on Aug. 8, 2012.

(51) Int. Cl.

| | |
|---|---|
| *H04B 7/0456* | (2017.01) |
| *H04B 17/336* | (2015.01) |
| *H04L 5/00* | (2006.01) |
| *H04B 7/06* | (2006.01) |
| *H04W 4/00* | (2018.01) |
| *H04W 84/00* | (2009.01) |
| *H04B 7/02* | (2018.01) |
| *H04B 7/024* | (2017.01) |
| *H04B 7/08* | (2006.01) |
| *H04B 7/12* | (2006.01) |
| *H04B 17/26* | (2015.01) |
| *H04B 17/309* | (2015.01) |
| *H04B 17/382* | (2015.01) |
| *H04L 12/64* | (2006.01) |
| *H04L 7/033* | (2006.01) |
| *H04W 76/15* | (2018.01) |
| *H04W 16/10* | (2009.01) |

(52) U.S. Cl.
CPC ......... *H04B 7/0617* (2013.01); *H04B 7/0689* (2013.01); *H04B 7/0871* (2013.01); *H04B 7/10* (2013.01); *H04B 7/12* (2013.01); *H04B 17/26* (2015.01); *H04B 17/309* (2015.01); *H04B 17/336* (2015.01); *H04B 17/382* (2015.01); *H04L 5/0048* (2013.01); *H04L 7/033* (2013.01); *H04L 12/6418* (2013.01); *H04W 4/00* (2013.01); *H04W 24/02* (2013.01); *H04W 76/15* (2018.02); *H04W 84/00* (2013.01); *H04W 16/10* (2013.01)

(56) References Cited

U.S. PATENT DOCUMENTS

| | | | |
|---|---|---|---|
| 5,936,577 A | 8/1999 | Shoki et al. | |
| 6,018,316 A | 1/2000 | Rudish et al. | |
| 6,487,417 B1* | 11/2002 | Rossoni | H04W 16/00 |
| | | | 455/506 |
| 6,600,776 B1* | 7/2003 | Alamouti | H04B 7/10 |
| | | | 375/147 |
| 6,718,159 B1 | 4/2004 | Sato | |
| 6,802,035 B2 | 10/2004 | Catreux et al. | |
| 6,804,491 B1 | 10/2004 | Uesugi | |
| 6,992,622 B1 | 1/2006 | Chiang et al. | |
| 7,058,367 B1 | 6/2006 | Luo et al. | |
| 7,187,949 B2 | 3/2007 | Chang et al. | |
| 7,248,217 B2 | 7/2007 | Mani et al. | |
| 7,260,141 B2 | 8/2007 | Bierly et al. | |
| 7,333,455 B1* | 2/2008 | Bolt | H04B 7/10 |
| | | | 370/329 |
| 7,574,236 B1 | 8/2009 | Mansour | |
| 7,636,573 B2 | 12/2009 | Walton et al. | |
| 7,688,909 B2 | 3/2010 | Tsutsui | |
| 7,689,216 B2 | 3/2010 | Wandel et al. | |
| 7,710,319 B2 | 5/2010 | Nassiri-Toussi et al. | |
| 7,890,114 B2 | 2/2011 | Braun et al. | |
| 7,904,117 B2 | 3/2011 | Doan et al. | |
| 7,986,742 B2 | 7/2011 | Ketchum et al. | |
| 8,098,752 B2 | 1/2012 | Hwang et al. | |
| 8,126,408 B2 | 2/2012 | Ahrony et al. | |
| 8,140,122 B2 | 3/2012 | Park et al. | |
| 8,160,601 B2 | 4/2012 | Veselinovic et al. | |
| 8,203,978 B2 | 6/2012 | Walton et al. | |
| 8,279,132 B2 | 10/2012 | Jung et al. | |
| 8,280,445 B2 | 10/2012 | Yong et al. | |
| 8,320,304 B2 | 11/2012 | Deb et al. | |
| 8,364,188 B2 | 1/2013 | Srinivisan et al. | |
| 8,369,791 B2 | 2/2013 | Hafeez | |
| 8,385,305 B1 | 2/2013 | Negus et al. | |
| 8,385,452 B2 | 2/2013 | Gorokhov | |
| 8,396,157 B2 | 3/2013 | Li et al. | |
| 8,462,047 B1 | 6/2013 | Ai et al. | |
| 8,570,988 B2 | 10/2013 | Wallace et al. | |
| 8,620,301 B1* | 12/2013 | Hessel | H04W 16/18 |
| | | | 455/277.2 |
| 8,644,262 B1 | 2/2014 | Sun et al. | |
| 8,654,815 B1 | 2/2014 | Forenza et al. | |
| 8,750,264 B2 | 6/2014 | Shatti | |
| 8,780,943 B2 | 7/2014 | Moshfeghi | |
| 8,817,678 B2 | 8/2014 | Moshfeghi | |
| 8,854,255 B1 | 10/2014 | Ehret | |
| 8,885,628 B2 | 11/2014 | Palanki et al. | |
| 9,037,094 B2 | 5/2015 | Moshfeghi | |
| 9,065,515 B2 | 6/2015 | Le Pezennec et al. | |
| 9,112,648 B2 | 8/2015 | Moshfeghi | |
| 9,197,982 B2 | 11/2015 | Moshfeghi | |
| 9,225,482 B2 | 12/2015 | Moshfeghi | |
| 9,226,092 B2 | 12/2015 | Moshfeghi | |
| 9,253,587 B2 | 2/2016 | Moshfeghi | |
| 9,438,389 B2 | 9/2016 | Moshfeghi | |
| 9,548,805 B2 | 1/2017 | Moshfeghi | |
| 9,602,257 B2 | 3/2017 | Moshfeghi | |
| 9,660,777 B2 | 5/2017 | Moshfeghi | |
| 9,680,554 B2 | 6/2017 | Moshfeghi | |
| 9,686,060 B2 | 6/2017 | Moshfeghi | |
| 9,698,948 B2 | 7/2017 | Moshfeghi | |
| 9,736,637 B2* | 8/2017 | Larsen | H04W 4/023 |
| 2002/0196186 A1* | 12/2002 | Holt | G01S 5/02 |
| | | | 342/453 |
| 2003/0012208 A1 | 1/2003 | Bernheim et al. | |
| 2003/0125040 A1 | 7/2003 | Walton et al. | |
| 2003/0129989 A1 | 7/2003 | Gholmieh et al. | |
| 2004/0077354 A1 | 4/2004 | Jason et al. | |
| 2004/0082356 A1* | 4/2004 | Walton | H04B 7/022 |
| | | | 455/522 |
| 2004/0095907 A1 | 5/2004 | Agee et al. | |
| 2004/0116129 A1 | 6/2004 | Wilson | |
| 2004/0127174 A1 | 7/2004 | Frank et al. | |
| 2004/0166808 A1 | 8/2004 | Hasegawa et al. | |
| 2005/0048964 A1 | 3/2005 | Cohen et al. | |
| 2005/0088358 A1 | 4/2005 | Larry et al. | |
| 2005/0136943 A1 | 6/2005 | Banerjee et al. | |
| 2005/0181755 A1 | 8/2005 | Hoshino et al. | |
| 2005/0232216 A1 | 10/2005 | Webster et al. | |
| 2005/0237971 A1 | 10/2005 | Skraparlis | |
| 2005/0243756 A1 | 11/2005 | Cleveland et al. | |
| 2006/0063494 A1 | 3/2006 | Zhang et al. | |
| 2006/0121946 A1 | 6/2006 | Walton et al. | |
| 2006/0267839 A1 | 11/2006 | Vaskelainen et al. | |
| 2007/0052519 A1 | 3/2007 | Talty et al. | |
| 2007/0093270 A1 | 4/2007 | Lagnado | |
| 2007/0100548 A1 | 5/2007 | Small | |
| 2007/0116012 A1 | 5/2007 | Chang et al. | |
| 2008/0076370 A1 | 3/2008 | Kotecha et al. | |
| 2008/0117961 A1 | 5/2008 | Han et al. | |
| 2008/0166975 A1 | 7/2008 | Kim et al. | |
| 2008/0212582 A1 | 9/2008 | Zwart et al. | |
| 2008/0258993 A1 | 10/2008 | Gummala et al. | |
| 2008/0261509 A1 | 10/2008 | Sen | |
| 2008/0305820 A1* | 12/2008 | Sadiq | H04W 4/10 |
| | | | 455/518 |
| 2009/0093265 A1 | 4/2009 | Kimura et al. | |
| 2009/0156227 A1 | 6/2009 | Frerking et al. | |
| 2009/0161235 A1* | 6/2009 | Border | G02B 13/002 |
| | | | 359/726 |
| 2009/0325479 A1 | 12/2009 | Chakrabarti et al. | |
| 2010/0080197 A1 | 4/2010 | Kanellakis et al. | |
| 2010/0090898 A1 | 4/2010 | Gallagher et al. | |
| 2010/0105403 A1 | 4/2010 | Lennartson et al. | |
| 2010/0117890 A1 | 5/2010 | Vook et al. | |
| 2010/0124895 A1 | 5/2010 | Martin et al. | |
| 2010/0136922 A1* | 6/2010 | Rofougaran | H04B 7/0871 |
| | | | 455/73 |
| 2010/0172309 A1 | 7/2010 | Forenza et al. | |
| 2010/0220012 A1 | 9/2010 | Reede | |

(56) References Cited

U.S. PATENT DOCUMENTS

| | | |
|---|---|---|
| 2010/0273504 A1 | 10/2010 | Bull et al. |
| 2010/0304680 A1 | 12/2010 | Kuffner et al. |
| 2010/0304770 A1 | 12/2010 | Wietfeldt et al. |
| 2010/0328157 A1 | 12/2010 | Culkin et al. |
| 2011/0002410 A1* | 1/2011 | Forenza .............. H04B 7/0617 375/267 |
| 2011/0069773 A1 | 3/2011 | Doron et al. |
| 2011/0105032 A1 | 5/2011 | Maruhashi et al. |
| 2011/0105167 A1 | 5/2011 | Pan et al. |
| 2011/0140954 A1 | 6/2011 | Fortuny-Guasch |
| 2011/0194504 A1 | 8/2011 | Gorokhov et al. |
| 2011/0212684 A1 | 9/2011 | Nam et al. |
| 2011/0268037 A1 | 11/2011 | Fujimoto |
| 2011/0299441 A1 | 12/2011 | Petrovic |
| 2012/0002742 A1* | 1/2012 | Cheng .................... H04B 7/024 375/267 |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0149300 A1 | 6/2012 | Forster |
| 2012/0184203 A1 | 7/2012 | Tulino et al. |
| 2012/0184219 A1* | 7/2012 | Richardson .......... G01S 5/0036 455/67.11 |
| 2012/0194385 A1 | 8/2012 | Schmidt et al. |
| 2012/0230274 A1 | 9/2012 | Xiao et al. |
| 2012/0238202 A1 | 9/2012 | Kim et al. |
| 2012/0314570 A1 | 12/2012 | Forenza et al. |
| 2013/0027240 A1 | 1/2013 | Chowdhury |
| 2013/0027250 A1 | 1/2013 | Chen |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0094439 A1 | 4/2013 | Moshfeghi |
| 2013/0095747 A1 | 4/2013 | Moshfeghi |
| 2013/0095874 A1 | 4/2013 | Moshfeghi |
| 2013/0114468 A1 | 5/2013 | Hui et al. |
| 2013/0155891 A1 | 6/2013 | Dinan |
| 2013/0272220 A1 | 10/2013 | Li et al. |
| 2013/0322561 A1 | 12/2013 | Abreu et al. |
| 2013/0324055 A1 | 12/2013 | Kludt et al. |
| 2014/0010319 A1 | 1/2014 | Balk et al. |
| 2014/0016573 A1 | 1/2014 | Nuggehalli et al. |
| 2014/0045478 A1 | 2/2014 | Moshfeghi |
| 2014/0045541 A1 | 2/2014 | Moshfeghi |
| 2014/0072078 A1 | 3/2014 | Sergeyev et al. |
| 2014/0086191 A1* | 3/2014 | Berntsen .................. H01Q 1/34 370/329 |
| 2014/0241296 A1 | 8/2014 | Shattil |
| 2015/0241020 A1* | 8/2015 | Lee ................... G02F 1/133603 362/308 |
| 2016/0211905 A1 | 7/2016 | Moshfeghi |
| 2017/0126374 A1 | 5/2017 | Moshfeghi |
| 2017/0230099 A1 | 8/2017 | Moshfeghi |

OTHER PUBLICATIONS

U.S. Appl. No. 15/473,618, filed Mar. 30, 2017, Moshfeghi, Mehran.
U.S. Appl. No. 15/595,919, filed May 15, 2017, Moshfeghi, Mehran.
U.S. Appl. No. 15/595,940, filed May 28, 1517, Moshfeghi, Mehran.
U.S. Appl. No. 15/616,911, filed Jun. 7, 2017, Moshfeghi, Mehran.
Portions of prosecution history of U.S. Appl. No. 13/473,083, dated Apr. 17, 2015, Moshfeghi, Mehran.
Portions of prosecution history of U.S. Appl. No. 14/709,136, dated Jun. 1, 2017, Moshfeghi, Mehran.
Portions of prosecution history of U.S. Appl. No. 13/473,096, dated Jul. 20, 2015, Moshfeghi, Mehran.
Portions of prosecution history of U.S. Appl. No. 14/813,058, dated Feb. 17, 2017, Moshfeghi, Mehran.
Portions of prosecution history of U.S. Appl. No. 13/473,105, dated Jul. 30, 2014, Moshfeghi, Mehran.
Portions of prosecution history of U.S. Appl. No. 14/455,859, dated Aug. 12, 2016, Moshfeghi, Mehran.
Portions of prosecution history of U.S. Appl. No. 15/229,135, dated Apr. 11, 2017, Moshfeghi, Mehran.
Portions of prosecution history of U.S. Appl. No. 13/473,113, dated Nov. 24, 2015, Moshfeghi, Mehran.
Portions of prosecution history of U.S. Appl. No. 14/980,281, dated May 17, 2017, Moshfeghi, Mehran.
Portions of prosecution history of U.S. Appl. No. 13/473,160, dated Aug. 25, 2017, Moshfeghi, Mehran.
Portions of prosecution history of U.S. Appl. No. 13/473,144, dated Jul. 26, 2017, Moshfeghi, Mehran.
Portions of prosecution history of U.S. Appl. No. 13/473,180, dated Jun. 11, 2014, Moshfeghi, Mehran.
Portions of prosecution history of U.S. Appl. No. 13/325,218, dated Apr. 20, 2017, Moshfeghi, Mehran.
Portions of prosecution history of U.S. Appl. No. 13/919,958, dated Jan. 6, 2016, Moshfeghi, Mehran.
Portions of prosecution history of U.S. Appl. No. 13/919,932, dated Mar. 10, 2017, Moshfeghi, Mehran.
Portions of prosecution history of U.S. Appl. No. 13/919,967, dated Nov. 20, 2015, Moshfeghi, Mehran.
Portions of prosecution history of U.S. Appl. No. 13/980,338, dated Mar. 14, 2017, Moshfeghi, Mehran.
Portions of prosecution history of U.S. Appl. No. 13/919,922, dated Oct. 19, 2015, Moshfeghi, Mehran.
Portions of prosecution history of U.S. Appl. No. 13/940,130, dated May 4, 2017, Moshfeghi, Mehran.
Portions of prosecution history of U.S. Appl. No. 13/919,972, dated Dec. 16, 2016, Moshfeghi, Mehran.
International Search Report and Written Opinion for PCT/US2012/058839, dated Jan. 4, 2013, Golba LLC.
International Preliminary Report on Patentability for PCT/US2012/058839, dated May 1, 2014, Golba LLC.
International Search Report and Written Opinion for PCT/US2012/058842, dated Jan. 4, 2013, Golba LLC.
International Preliminary Report on Patentability for PCT/US2012/058842, dated May 1, 2014, Golba LLC.

* cited by examiner

METHOD AND SYSTEM FOR OPTIMIZING COMMUNICATION USING REFLECTORS IN DISTRIBUTED TRANSCEIVER ENVIRONMENTS

CROSS-REFERENCE TO RELATED APPLICATIONS/INCORPORATION BY REFERENCE

This application is a continuation application of U.S. patent application Ser. No. 13/919,972, filed Jun. 17, 2013, now published as U.S. Patent Publication 2014/0044043, U.S. patent application Ser. No. 13/919,972 makes reference to, claims priority to and claims the benefit of U.S. Provisional Application Ser. No. 61/725,005, which was filed on Nov. 11, 2012; and U.S. Provisional Application Ser. No. 61/680,872, which was filed on Aug. 8, 2012. U.S. patent application Ser. No. 13/919,972, now published as U.S. Patent Publication 2014/0044043 is incorporated herein by reference.

This application also makes reference to:
U.S. application Ser. No. 13/473,096, which was filed on May 16, 2012, issued as U.S. Pat. No. 9,112,648;
U.S. application Ser. No. 13/473,144, which was filed on May 16, 2012, published as U.S. Patent Publication 2013-0095747;
U.S. application Ser. No. 13/473,105, which was filed on May 16, 2012, issued as U.S. Pat. No. 8,817,678;
U.S. application Ser. No. 13/473,160, which was filed on May 16, 2012, issued as U.S. Pat. No. 9,780,928;
U.S. application Ser. No. 13/473,180, which was filed on May 16, 2012, issued as U.S. Pat. No. 8,780,943;
U.S. application Ser. No. 13/473,113, which was filed on May 16, 2012, issued as U.S. Pat. No. 9,225,482;
U.S. application Ser. No. 13/473,083, which was filed on May 16, 2012, issued as U.S. Pat. No. 9,037,094;
U.S. application Ser. No. 13/919,958, which was filed on Jun. 17, 2013, issued as U.S. Pat. No. 253,587;
U.S. application Ser. No. 13/919,932, which was filed on Jun. 17, 2013, issued as U.S. Pat. No. 10,020,861;
U.S. application Ser. No. 13/919,967, which was filed on Jun. 17, 2013, issued as U.S. Pat. No. 9,226,092; and
U.S. application Ser. No. 13/919,992 which was filed on Jun. 17, 2013, issued as U.S. Pat. No. 9,197,982.

Each of the above referenced application is hereby incorporated herein by reference in its entirety.

FIELD OF THE INVENTION

Certain embodiments of the invention relate to wireless communication systems. More specifically, certain embodiments of the invention relate to a method and system for optimizing communication in leaky wave distributed transceiver environments.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawing

BRIEF SUMMARY OF THE INVENTION

A system and/or method is provided for optimizing communication in leaky wave distributed transceiver environments, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
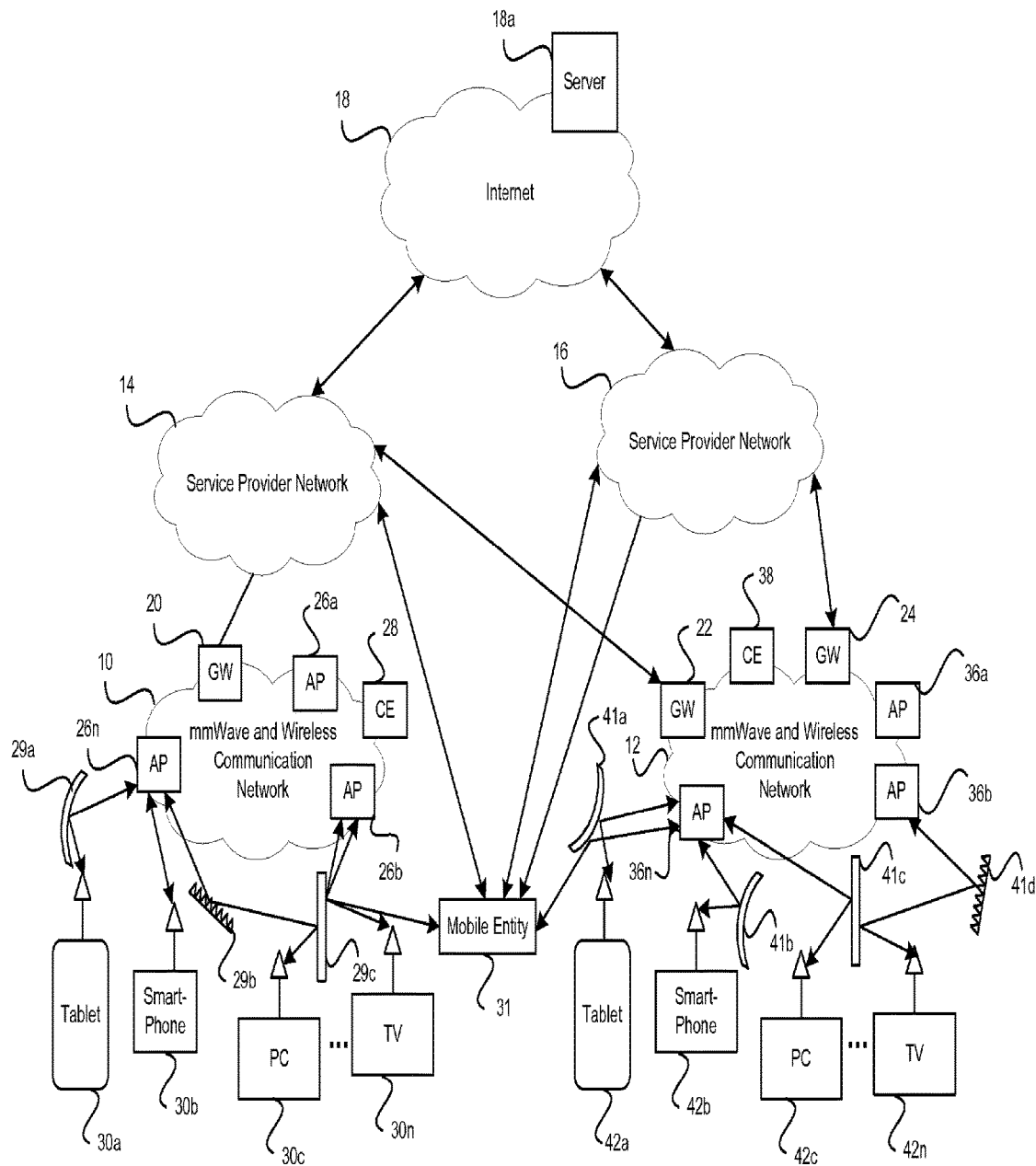
FIG. 1 is a block diagram of an exemplary system for providing connectivity to a plurality of distributed transceivers via a plurality of distributed access points, in accordance with an exemplary embodiment of the invention.

Certain embodiments of the invention may be found in a method and system for optimizing communication in leaky wave distributed transceiver environments. In various exemplary aspects of the invention, a communication device may comprise a plurality of distributed transceivers and one or more corresponding antenna arrays. A processor such as a central processor, a network management engine and/or a coordinate entity may be operable to configure a first distributed transceiver of the plurality of distributed transceivers to receive signals comprising one or more first data streams via one or more first communication links. The processor may be operable to configure a second distributed transceiver of the plurality of distributed transceivers to receive signals comprising one or more second data streams via one or more second communication links. The processor may be operable to determine a channel response matrix associated with communication of the one or more first data streams via the one or more first communication links and/or the one or more second data streams via the one or more second communication links. The processor may be operable to optimize one or both of link capacity and/or link reliability of the one or more first communication links and/or the one or more second communication links based on the determined channel response matrix.

The processor may be operable to determine a range of phase conditions over which the optimization may be acceptable. The processor may adjust a phase sum corresponding to the one or more first communication links and/or one or more of the second communication links, based on the determined range of the phase conditions over which the optimization is acceptable. The processor may be operable to adjust the determined range of the phase condition based on signal to noise ratio on the one or more first communication links and/or via the one or more second communication links. The processor may determine the range of the phase conditions over which the optimization may be acceptable based on one or more of training signals and/or pilot signals, which may be communicated via the one or more first communication links and/or via the one or more second communication links. The processor may be operable to dynamically and/or adaptively displace (mechanically through a motor or electronically in some exemplary embodiments of the invention) the first distributed transceiver, an antenna communicatively coupled to the first distributed transceiver, the second distributed transceiver and/or an antenna communicatively coupled to the second distributed transceiver to satisfy the determined range of the phase conditions over which the optimization is acceptable. The displacement of the first distributed transceiver, the antenna communicatively coupled to the first distributed transceiver, the second distributed transceiver and/or the antenna communicatively coupled to the second distributed transceiver may occur spatially in the x-coordinate, the y-coordinate and/or the z-coordinate. The processor may be operable to dynamically and/or adaptively control adjustment of a phase center of an antenna communicatively coupled to the first distributed transceiver and/or adjustment of a phase center of an antenna communicatively coupled to the second distributed transceiver to satisfy the determined range of said phase conditions over which the optimization is acceptable. In one embodiment of the invention, one or more first data streams and the one or more second data streams comprise different polarizations. In another embodiment of the invention, one or more first data streams and one or more of the second data streams may comprise similar polarizations.

FIG. 1 is a block diagram of an exemplary system for providing connectivity to a plurality of distributed transceivers via a plurality of distributed access points, in accordance with an exemplary embodiment of the invention. Referring to FIG. 1, there are shown mmWave and wireless communication networks 10, 12, service providers 14, 16 and the Internet 18. The mmWave and wireless communication network 10 may comprise a gateway 20 and a plurality of access points 26a, 26b, . . . , 26n. The mmWave and wireless communication network 12 may comprise a gateway 22, a gateway 24, a plurality of access points 36a, 36b, . . . , 36n, and a coordinating entity 28. FIG. 1 also shows a plurality of mobile communication devices 30a, 30b, 30c, . . . , 30n, a plurality of mobile communication devices 42a, 42b, 42c, . . . , 42, and a coordinating entity 38. The Internet 18 may host a plurality of resources such as the server 18a. FIG. 1 also shows a mobile entity 31, curved reflective surfaces 29a, 41a, 41b, refractive surfaces 29b, 41d and flat reflective surface 29c, 41c.

The mmWave and wireless communication network 10 may comprise a plurality of mmWave and other wireless communication enabled network devices and/or interfaces that enable communication amongst a plurality of devices utilizing wireless communication. In this regard, the mmWave and wireless communication network 10 may comprise one or more mmWave enabled network devices that enable the communication traffic and/or control data via a plurality of mobile communication devices. For example, the mmWave and wireless communication network 10 may comprise the plurality of access points 26a, 26b, . . . , 26n, which may be operable to provide access to mmWave and wireless communication network 10 and/or route communication traffic and/or control data within the mmWave and wireless communication network 10 for one or more of the plurality of mobile communication devices 30a, 30b, 30c, . . . , 30n. The mmWave and wireless communication network 10 may also be operable to provide access to the Internet 18 via the service provider network 14. The mmWave and wireless communication network 10 may also comprise devices that may be operable to communicate via wireless wide area network (WWAN), wireless medium area network (WMAN), wireless local area network (WLAN), wireless personal area network (WPAN) and/or other wireless technologies.

The mmWave and wireless communication network 12 may comprise a plurality of mmWave and other wireless communication enabled network devices and/or interfaces that enable communication amongst a plurality of devices utilizing wireless communication. In this regard, the mmWave and wireless communication network 12 may comprise one or more mmWave enabled network devices that enable the communication traffic and/or control data via a plurality of mobile communication devices. For example, the mmWave and wireless communication network 12 may comprise the plurality of access points 36a, 36b, . . . , 36n, which may be operable to provide access to the mmWave and wireless communication network 12 and/or route communication traffic and/or control data within the mmWave and wireless communication network 12 for one or more of the plurality of mobile communication devices 42a, 42b, 42c, . . . , 42n. The mmWave and wireless communication network 12 may also be operable to provide access to the Internet 18 via the service provider network 16. The mmWave and wireless communication network 12 may also comprise devices that may be operable to communicate via wireless wide area network (WWAN), wireless medium area network (WMAN), wireless local area network (WLAN), wireless personal area network (WPAN) and/or other wireless technologies.

The service provider network 14 may comprise suitable devices and/or interfaces that may enable communication devices, which are communicatively coupled to the mmWave and wireless communication network 10, to access one or more other networks such as the Internet 18 and the mmWave and wireless communication network 12. In this regard, the service provider network 14 may enable the mobile communication devices 30a, 30b, 30c, . . . , 30n to access devices and/or services on the Internet 18. The service provider network 14 may also enable the mobile communication devices 30a, 30b, 30c, . . . , 30n to access the mmWave and wireless communication network 12 and communicate with one or more of the mobile communication devices 42a, 42b, 42c, . . . , 42n. The service provider network 16 may enable the mobile communication devices 42a, 42b, 42c, . . . , 42n to access the mmWave and wireless communication network 10 and communicate with one or more of the mobile communication devices 30a, 30b, 30c, . . . , 30n via the Internet 18 and the service provider network 14 and/or via the gateway 20. The service provider network 14 may comprise, for example, a broadband connectivity (or another distributed mmWave connectivity) to the mmWave and wireless communication network 10. In this regard, for example, the service provider network 14 may comprise a cable service provider, an digital subscriber line (DSL) or variants thereof service provider, a fiber optic service provider, a hybrid fiber coaxial service provider, a WWAN service provider, a WMAN, and/or a satellite service provider The service provider network 16 may comprise suitable devices and/or interfaces that may enable communication devices, which are communicatively coupled to the mmWave and wireless communication network 12, to access one or more other network such as the Internet 18 and the mmWave and wireless communication network 10. In this regard, the service provider network 16 may enable the mobile communication devices 42a, 42b, 42c, . . . , 42n to access devices and/or services on the Internet 18. The service provider network 16 may enable the mobile communication devices 42a, 42b, 42c, . . . , 42n to access the mmWave and wireless communication network 10 and communicate with one or more of the mobile communication devices 30a, 30b, 30c, . . . , 30n via the Internet 18 and the service provider network 14. The service provider network 16 may comprise, for example, a broadband or other high speed connectivity to the mmWave and wireless communication network 12. In this regard, for example, the service provider network 16 may comprise a cable service provider, a digital subscriber line (DSL) or variants hereof service provider, a fiber optic service provider, a hybrid fiber coaxial service provider, a WWAN service provider, a WMAN, and/or a satellite service provider.

The Internet 18 may comprise suitable devices and/or interfaces that enable the interconnection of a plurality of networks and/or devices. In this regard, the Internet 18 may enable the interconnection of the service provider network 14, the service provider network 16, the mmWave and wireless communication network 10, the mmWave and wireless communication network 12.

Each of the plurality of access points 26a, 26b, . . . , 26n may comprise suitable logic, circuitry, interfaces and/or code that may be operable to provide access to the mmWave and wireless communication network 10 for one or more of the mobile communication devices 30a, 30b, 30c, . . . , 30n when they are within operating range of a corresponding one or more of the plurality of access points 26a, 26b, . . . , 26n. In this regard, each of the plurality of access points 26a, 26b, . . . , 26n may comprise a plurality of distributed transceivers such as mmWave transceivers and/or a plurality of antenna arrays that enable communication via one or more mmWave technologies and/or communication protocols. Each of the plurality of access points 26a, 26b, . . . , 26n may also be operable to handle communication of traffic and/or control data among one or more other access points in the mmWave and wireless communication network 10, the coordinating entity 28 and/or the gateway 20. In some embodiments of the invention, each of the plurality of access points 26a, 26b, . . . , 26n may communicate with the coordinating entity 28 in order to handle the routing and/or processing of data for one or more of the mobile communication devices 30a, 30b, 30c, . . . , 30n.

Each of the plurality of access points 36a, 36b, . . . , 36n may comprise suitable logic, circuitry, interfaces and/or code that may be operable to provide access to the mmWave and wireless communication network 12 for one or more of the mobile communication devices 42a, 42b, 42c, . . . , 42n when they are within operating range of a corresponding one or more of the plurality of access points 36a, 36b, . . . , 36n. In this regard, each of the plurality of access points 36a, 36b, . . . , 36n may comprise a plurality of distributed transceivers such as mmWave transceivers and/or one or more antenna arrays that enable communication via one or more mmWave technologies and/or communication protocols. Each of the plurality of access points 36a, 36b, . . . , 36n may also be operable to handle communication of traffic and/or control data among one or more other access points in the mmWave and wireless communication network 12, the coordinating entity 38 and/or the gateways 22, 24. In some embodiments of the invention, each of the plurality of access points 36a, 36b, . . . , 36n may communicate with the coordinating entity 38 in order to handle the routing and/or processing of data for one or more of the mobile communication devices 42a, 42b, 42c, . . . , 42n.

The coordinating entity 28 may comprise suitable logic, circuitry, interfaces and/or code that may be operable to control, coordinate and/or manage the handling and routing of traffic and/or control data within the mmWave and wireless communication network 10. The coordinating entity 28 may be operable to control the type and/or amount of links, the number of distributed transceivers, configuration of the distributed transceivers' interfaces and/or components including RF front ends and/or antenna arrays, which may be utilized by one or more of the access points 26a, 26b, . . . , 26n to handle traffic for one or more of the mobile communication devices 30a, 30b, 30c, . . . , 30n. The coordinating entity 28 may be operable to control the allocation and de-allocation of bandwidth to facilitate communication of traffic in order to provide and/or guarantee a particular class of service (CoS) and/or Quality of Service (QoS) for the mobile communication devices 30a, 30b, 30c, . . . , 30n. The coordinating entity 28 may be operable to coordinate amongst the gateway 20 and/or one or more of the access points 26a, 26b, . . . , 26n in order to route traffic to and from the gateway 20 and the mobile communication devices 30a, 30b, 30c, . . . , 30n. Although the coordinating entity 28 is illustrated as a separate entity from the gateway 20, and the access points 26a, 26b, . . . , 26n, the invention is not limited in this regard. Accordingly, the coordinating entity 28 may be integrated in the gateway 20 or in one of the access points 26a, 26b, . . . , 26n. In some embodiments of the invention, the functionality of the coordinating entity 28 may be split amongst a plurality of devices such as two or more of the gateway 20, and/or the access points 26a, 26b, . . . , 26n.

The coordinating entity 38 may comprise suitable logic, circuitry, interfaces and/or code that may be operable to control, coordinate and/or manage the handling and routing of traffic and/or control data within the mmWave and wireless communication network 12. The coordinating entity 38 may be operable to control the type and/or amount of links, communication protocols, the number of distributed transceivers, configuration of the distributed transceivers' interfaces and/or components including RF front ends and/or antenna arrays, which may be utilized by one or more of the access points 36a, 36b, . . . , 36n to handle traffic for one or more of the mobile communication devices 42a, 42b, 42c, . . . , 42n. The coordinating entity 38 may be operable to control the allocation and de-allocation of bandwidth to facilitate communication of traffic in order to provide and/or guarantee a particular class of service (CoS) and/or Quality of Service (QoS) for the mobile communication devices 42a, 42b, 42c, . . . , 42n. The coordinating entity 38 may be operable to coordinate amongst the gateways 22, 24 and/or one or more of the access points 36a, 36b, . . . , 36n in order to route traffic to and from the gateways 22, 24 and the mobile communication devices 42a, 42b, 42c, . . . , 42n. Although the coordinating entity 38 is illustrated as a separate entity from the gateways 22, 24, and the access points 36a, 36b, . . . , 36n, the invention is not limited in this regard. Accordingly, the coordinating entity 38 may be integrated in one of the gateways 22, 24 or in one of the access points 36a, 36b, . . . , 36n. In some embodiments of the invention, the functionality of the coordinating entity 38 may be split amongst a plurality of devices such as two or more of the gateways 20, 24 and/or the access points 36a, 36b, . . . , 36n.

Each of the plurality of mobile communication devices 30a, 30b, 30c, . . . , 30n may comprise suitable logic, circuitry, interfaces and/or code that may be operable to communicate with the service provider network 14 via the mmWave and wireless communication network 10. In this regard, each of the plurality of mobile communication devices 30a, 30b, 30c, . . . , 30n may comprise a plurality of distributed transceivers such as mmWave transceiver devices that may be operable to communicate with the access points 26a, 26b, . . . , 26n in the mmWave and wireless communication network 10. The plurality of mobile communication devices 30a, 30b, 30c, . . . , 30n may be collectively referenced as mobile communication devices 30. Each of the plurality of mobile communication devices 30a, 30b, 30c, . . . , 30n may be operable to communicate utilizing, for example, 60 GHz wireless standard, WirelessHD, WiGig, WiFi IEEE 802.11ad, and/or other mmWave technology or standard. One or more of the access points 26a, 26b, . . . , 26n, the coordinating entity 28, and/or the gateway 20 may be operable to control and/or route traffic to and/or from the one or more of the mobile communication devices 30a, 30b, 30c, . . . , 30n. In addition to communicating utilizing mmWave technologies, each of the plurality of mobile communication devices 30a, 30b, 30c, . . . , 30n may comprise one or more transmitter and/or receiver devices, which may be operable to communicate utilizing technologies such as, for example, wireless personal area network (WPAN), a wireless local area network (WLAN), wireless medium area network (WMAN) and/or wireless wide area network (WWAN) technologies. For example, one or more of the plurality of mobile communication devices 30a, 30b, 30c, . . . , 30n may comprise one or more transmitter and/or receiver devices, which may be operable to communicate utilizing WiFi, WiMax, Bluetooth, ZigBee, Bluetooth Low Energy (BLE), 3GPP, 4G LTE, WiMAX or other technologies. In this regard, radios such as mmWave radios may be utilized at very high carrier frequencies for high throughput wireless communications.

The plurality of mobile communication devices 42a, 42b, 42c, . . . , 42n may be communicatively coupled to the mmWave and wireless communication network 12. The plurality of mobile communication devices 42a, 42b, 42c, . . . , 42n may be collectively referenced as mobile communication devices 42. Each of the plurality of mobile communication devices 42a, 42b, 42c, . . . , 42n may be operable to communicate utilizing, for example, 60 GHz wireless standard, WirelessHD, WiGig, WiFi IEEE 802.11ad, and/or other mmWave technology or standard. The plurality of mobile communication devices 42a, 42b, 42c, . . . , 42n may be communicatively coupled to the mmWave and wireless communication network 12. In some exemplary embodiments of the invention, the mobile communication device 42a may comprise a tablet, the mobile communication device 42b may comprise a Smartphone, the mobile communication device 42c may comprise a personal computer PC, laptop or ultrabook, and the mobile communication device 42n may comprise a television.

The gateway 20 may comprise suitable logic, circuitry, interfaces and/or code that are operable to process and/or route traffic and/or control data between the service provider network 14 and the mmWave and wireless communication network 10. In this regard, the gateway 20 may be operable to handle the processing and/or routing of traffic and/or control data between the service provider network 14 and one or more of the access points 26a, 26b, . . . , 26n and/or the coordinating entity 28 for one or more of the plurality of mobile communication devices 30a, 30b, 30c, . . . , 30n. The gateway 20 may comprise, for example, a modulation and/or demodulation (modem) device that may be operable to provide modulation and/or demodulation of the information that is communicated between the service provider network 14 and the mmWave and wireless communication network 10. For example, the gateway 20 may comprise a cable modem, a DSL modem, a HFC modem, a cable set top box (STB), a satellite STB and/or other similar type of device. In general, the gateway 20 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 20 may comprise server functionality. The gateway 20 may also enable communication amongst one or more of the mobile communication devices 30a, 30b, 30c, . . . , 30n and one or more of the mobile communication devices 42a, 42b, 42c, . . . , 42n via the mmWave and wireless communication network 10 and the service provider network 14 and/or via the service providers 14, 16 and the Internet 18.

The gateway 22 may comprise suitable logic, circuitry, interfaces and/or code that are operable to process and/or route traffic and/or control data between the service provider network 14 and the mmWave and wireless communication network 12. In this regard, the gateway 22 may be operable to handle the processing and/or routing of traffic and/or control data between the service provider network 14 and one or more of the access points 36a, 36b, . . . , 36n and/or the coordinating entity 38 for one or more of the plurality of mobile communication devices 42a, 42b, 42c, . . . , 42n. The gateway 22 may comprise, for example, a modulation and/or demodulation (modem) device that may be operable to provide modulation and/or demodulation of the information that is communicated between the service provider network 14 and the mmWave and wireless communication network 12. For example, the gateway 22 may comprise a cable modem, a DSL modem, a HFC modem, a cable set top box (STB), a satellite STB and/or other similar type of device. In general, the gateway 22 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 22 may comprise a server functionality. The gateway 22 may also enable communication amongst one or more of the mobile communication devices 30a, 30b, 30c, . . . , 30n and one or more of the mobile communication devices 42a, 42b, 42c, . . . , 42n via the mmWave and wireless communication networks 10, 12 and the service provider network 14 and/or via the service providers 14, 16 and the Internet 18.

The gateway 24 may comprise suitable logic, circuitry, interfaces and/or code that are operable to process and/or route traffic and/or control data between the service provider network 16 and the mmWave and wireless communication network 12. In this regard, the gateway 24 may be operable to handle the processing and/or routing of traffic and/or control data between the service provider network 16 and one or more of the access points 36a, 36b, . . . , 36n and/or the coordinating entity 38 for one or more of the plurality of mobile communication devices 42a, 42b, 42c, . . . , 42n. The gateway 24 may comprise, for example, a modulation and/or demodulation (modem) device that may be operable to provide modulation and/or demodulation of the information that is communicated between the service provider network 16 and the mmWave and wireless communication network 12. For example, the gateway 24 may comprise a cable modem, a DSL modem, a HFC modem, a cable set top box (STB), a satellite STB and/or other similar type of device. In general, the gateway 24 may be operable to handle any technology that may be utilized by one or more of the cable service provider, the digital subscriber line (DSL) service provider, the fiber optic service provider, the hybrid fiber coaxial (HFC) service provider, the WWAN service provider, the WMAN, and/or the satellite service provider. In some embodiments of the invention, the gateway 24 may comprise a server functionality. The gateway 24 may also enable communication amongst one or more of the mobile communication devices 30a, 30b, 30c, . . . , 30n and one or more of the mobile communication devices 42a, 42b, 42c, . . . , 42n via the mmWave and wireless communication networks 10, 12, the service provider networks 14, 16 and the Internet 18.

The curved reflective surface 29a, the refractive surface 29b and the flat reflective surface 29c may be located within the operating environment of the mmWave and wireless communication network 10. One or more of the curved reflective surface 29a, the refractive surface 29b and/or the flat reflective surface 29c may be objects and/or portions thereof, which may exist within the environment or may be intentionally placed within the environment to be utilized to optimize communication between devices in the mmWave and wireless communication network 10 and the mobile communication devices 30a, 30b, 30c, . . . , 30n.

The curved reflective surfaces 41a, 41b, the refractive surface 41d and the flat reflective surface 41c may be located within the operating environment of the mmWave and wireless communication network 12. One or more of the curved reflective surfaces 41a, 41b, the refractive surface 41d and the flat reflective surface 41c may be objects and/or portions thereof, which may exist within the environment or may be intentionally placed within the environment to be utilized to optimize communication between devices in the mmWave and wireless communication network 12 and the mobile communication devices 42a, 42b, 42c, . . . , 42n.

The mobile entity 31 may comprise a plurality of distributed transceivers and/or one or more corresponding antenna arrays that are communicatively coupled to one or more of the plurality of distributed transceivers. The distributed transceivers may be configured to handle communication of one or more data streams among one or more of a plurality of wireless communication networks such as the mmWave and wireless communication networks 10, 12, one or more other mobile entities and/or one or more mobile communication devices 30a, 30b, 30c, . . . , 30n, 42a, 42b, 42c, . . . , 42n. The mobile entity may comprise a car, a truck, an omnibus (bus), a trailer, a mobile home, train, bus, a forklift, construction equipment, a boat, a ship, an aircraft or any other vehicle. One or more of the plurality of distributed transceivers in the mobile entity 31 may be configured to operate as a relay node and/or a repeater node. A location, speed and/or trajectory of the mobile entity 31 may be determined and one or more of the plurality of distributed transceivers and/or one or more corresponding antenna arrays may be configured based on the determined location, speed and/or trajectory. One or more of the plurality of distributed transceivers in the mobile entity 31 may be dynamically and/or adaptively controlled to utilize one or more modes of operation to communicate the one or more data streams and/or to split the communication of the one or more data streams amongst a portion of the plurality of distributed transceivers in the mobile entity 31. Exemplary modes of operation may comprise a spatial diversity mode, a frequency diversity mode, a spatial multiplexing mode, a frequency multiplexing mode and/or a MIMO mode. Traffic may be backhauled from the mobile entity 31 via one or more wireless communication links to one or more of the plurality of mmWave and wireless communication networks 10, 12. One or more of the plurality of distributed transceivers in the mobile entity 31 may be configured to utilize different types of communication links, modulation schemes, constellations, protocols, frequencies, wireless standards and/or bandwidths to handle the communication of the one or more data streams and/or to handle different types of data traffic. Additional details on mobile entities such as the mobile entity 31 may be found in U.S. application Ser. No. 13/919,932, which was filed on Jun. 17, 2013, issued as U.S. Pat. No. 10,020,861, which is hereby incorporated herein in its entirety.

In operation, each of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may be operable to dynamically configure its distributed transceivers and/or antenna arrays to operate based on various factors. Exemplary factors comprise link throughput/reliability requirements and/or budgets, spectrum availability, propagation conditions, location of reflectors or refractors in the environment, geometry of the environment, positions of the transmitter/receivers, link quality, device capabilities, device locations, usage of resources, resource availability, target throughput, application QoS requirements and/or traffic types.

The characteristics and geometry of the environment may include the presence of naturally reflective and/or refractive surfaces and/or the presence of obstructive elements in the environment. For example, the environment within the operating environment of the mmWave and wireless communication network 10 may comprise the curved reflective surface 29a, the refractive surface 29b and the flat reflective surface 29c. Similarly, the environment within the operating environment of the mmWave and wireless communication network 12 may comprise the curved reflective surfaces 41a, 41b, the refractive surface 41d and the flat reflective surface 41c. One or more of the distributed transceivers in one or more of the plurality of mobile communication devices 30a, 30b, 30c, . . . , 30n and/or the access points 26a, 26b, . . . , 26n may be operable to utilize one or more of the curved reflective surface 29a, the refractive surface 29b and/or the flat reflective surface 29c in the operating environment of the mmWave and wireless communication network 10 to optimize communication of wireless signals.

In an exemplary embodiment of the invention, the mobile communication device 30a may be operable to utilize the reflective properties of the curved reflective surface 29a to communicate with the access point 26n. The mobile communication device 30c may utilize the flat reflective surface 29c and the refractive surface 29b to communicate with the access point 26n. The mobile communication device 30n may utilize the flat reflective surface 29c to communicate with the access point 26b.

One or more of the distributed transceivers in one or more of the plurality of mobile communication devices 42a, 42b, 42c, . . . , 42n and/or the access points 36a, 36b, . . . , 36n may be operable to utilize one or more of the curved reflective surfaces 41a, 41b, the refractive surface 41d and/or the flat reflective surface 41c in the operating environment of the mmWave and wireless communication network 12 to optimize communication of wireless signals.

In an exemplary embodiment of the invention, the mobile communication device 42a may be operable to utilize the reflective properties of the curved reflective surface 41a to communicate with the access point 36n. The mobile communication device 42b may be operable to utilize the reflective properties of the curved reflective surface 41b to communicate with the access point 36n. The mobile communication device 42c may utilize the flat reflective surface 41c to communicate with the access point 36n. The mobile communication device 42n may utilize multi-hop communication which utilizes the flat reflective surface 41c and the refractive surface 41d to communicate with the access point 36b.

One or more of the distributed transceivers in mobile entity 31 may be operable to utilize (1) the curved reflective surface 29a, the refractive surface 29b and the flat reflective surface 29c within the operating environment of the mmWave and wireless communication network 10 and/or (2) the curved reflective surfaces 41a, 41b, the refractive surface 41d and the flat reflective surface 41c within the operating environment of the mmWave and wireless communication network 12, to optimize communication of wireless signals. In an exemplary embodiment of the invention, when the mobile entity 31 is within the operating environment of the mmWave and wireless communication network 10, one or more of the distributed transceivers in the mobile entity 31 may be operable to utilize the flat reflective surface 29c to communicate with the access point 26b. In another exemplary embodiment of the invention, when the mobile entity 31 is within the operating environment of the mmWave and wireless communication network 12, one or more of the distributed transceivers in the mobile entity 31 may be operable to utilize the curved reflective surface 41a to communicate with the access point 36n. In another embodiment of the invention, when the mobile entity 31 is within the operating environments of both of the mmWave and wireless communication networks 10, 12, one or more of the distributed transceivers in the mobile entity 31 may be operable to utilize the flat reflective surface 29c to communicate with the access point 26b and also utilize the curved reflective surface 41a to communicate with the access point 36n.

A processor in each of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may be operable to dynamically configure and coordinate operation of the distributed transceivers and/or antenna arrays to operate in different modes based on the different factors. Exemplary factors may comprise, for example, propagation environment conditions, link quality, device capabilities, device locations, usage of resources, resource availability, target throughput, and application QoS requirements.

In various embodiments of the invention, a mobile communication device that has data to be transmitted may dynamically sense the environment to determine the current characteristics of the environment, which may include the presence of blocking objects, reflectors, and/or refractors. The characteristics of corresponding transmitted and/or received signals communicated by one or more distributed transceivers may be analyzed by one or more distributed transceivers in order to sense the surrounding environment. For example, the analysis may determine transmitted and/or received signal strength, frequency changes, phase changes, angle of transmission, angle of arrival and/or other characteristics of the transmitted and/or received signals in order to sense the environment. Based on the sensing and/or on one or more of the factors above, the mobile communication device that has data to be transmitted may be operable to configure its transmitter and/or antenna arrays to spread and transmit a narrow beam in one or more directions, where reflectors, refractors, naturally reflecting elements and/or naturally refractive elements may create multiple paths to a receiving mobile communication device. Each communication path may comprise a different frequency, polarization, bandwidth, protocol, and/or coding thereby providing link robustness. The transmitter in a transmitting mobile communication device may be operable to use the same frequency channel or different frequency channels to transmit the same data stream or separate data streams.

In some embodiments of the invention, the coordinating entities 28, 38 may be operable to coordinate the configuration of the distributed transceivers and/or antenna arrays in one or more of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. In this regard, the coordinating entities 28, 38 may be operable to dynamically collect information from one or more of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. Based on this collected information and/or one or more environmental conditions, the coordinating entities 28, 38 may aggregate the collected information and determine an optimal configuration for transmitters, receivers and/or antenna array elements in one or more of the mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. The coordinating entities 28, 38 may communicate the determined optimal configuration for the transmitters, receivers and/or antenna array elements in the corresponding mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n. The corresponding mobile communication devices 30a, 30b, 30c, . . . , 30n, the mobile communication devices 42a, 42b, 42c, . . . , 42n, the access points 26a, 26b, . . . , 26n and/or the access points 36a, 36b, . . . , 36n may then configure their transmitters, receivers and/or antenna array elements accordingly. The coordinating entities 28, 38 may be separate dedicated hardware/software units performing the coordinating functions. Coordinating entities 28, 38 may be integrated into another entity in the network and reuse its hardware/software resources (e.g., embedded in access points 36a, 36b). Furthermore, coordinating entities 28, 38 may be implemented as all-software entities running on a generic processor or a remote processor. Furthermore, the functions of coordinating entities 28, 38 may be distributed over several entities in the network.

In various exemplary aspects of the invention, a communication device comprising a plurality of distributed transceivers and one or more corresponding antenna arrays, a first distributed transceiver is configured to receive signals comprising one or more first data streams and a second distributed transceiver is configured to receive signals comprising one or more second data streams. One or more components within a receive processing chain of the first distributed transceiver and/or one or more components within a receive processing chain of the second distributed transceiver may be adjusted to maximize beamforming gain for the one or more first data streams and/or one or more of the second data streams. A phase of the one or more first data streams and/or the one or more second data streams may be adjusted by the one or more components within the receive processing chain of the first distributed transceiver and/or one or more components within a receive processing chain of the second distributed transceiver. The one or more first data streams and/or the one or more second data streams may be combined in the RF domain. The combined one or more first data streams and/or the one or more second data streams may be converted from the RF domain to the intermediate frequency (IF) domain. The one or more first data streams and/or the one or more second data streams may be coherently combined in the IF domain.

In another exemplary embodiment of the invention, a communication device comprising a plurality of distributed transceivers and one or more corresponding antenna arrays, a first distributed transceiver of the plurality of distributed transceivers may be configured to transmit signals comprising one or more first data streams. A second distributed transceiver of the plurality of distributed transceivers may also be configured to transmit signals comprising one or more second data streams. One or more components within a transmit processing chain of the first distributed transceiver and/or one or more components within a transmit processing chain of the second distributed transceiver may be adjusted based on a determined mode of operation for the first distributed transceiver and/or the second distributed transceiver. The first distributed transceiver and/or the second distributed transceiver may be dynamically switched between a first mode of operation and a second mode of operation based on a signal to noise ratio (SNR) associated with the first distributed transceiver and/or the second distributed transceiver. One or more selectors within the first distributed transceiver and/or the second distributed transceiver may be configured to transmit one or more first data streams and one or more second data streams from the first distributed transceiver and/or the second distributed transceiver in a spatial multiplexing mode based on the determined mode of operation. The one or more selectors within the first distributed transceiver and/or the second distributed transceiver may be configured to transmit the one or more first data streams or the one or more second data streams from the first distributed transceiver and/or the second distributed transceiver in a spatial multiplexing single beam single stream operating mode. One or more phase adjustment parameters for one or more components within the first distributed transceiver and/or the second distributed transceiver may be configured based on the determined mode of operation for the first distributed transceiver and/or the second distributed transceiver. Additional details may be found in U.S. application Ser. No. 13/919,932, which was filed on Jun. 17, 2013, issued as U.S. Pat. No. 10,020,861, and is hereby incorporated herein by reference in its entirety.

The reference to 60 GHz wireless connectivity is intended to include all mmWave frequency bands (any carrier frequency above 10 GHz, e.g., 38.6-40 GHz, 59-67 GHz, 71-76 GHz, 92-95 GHz bands). Furthermore, all or a subset of embodiments are applicable to sub-10 GHz carrier frequency operations as well (e.g., 5 GHz and 2.4 GHz ISM bands and UWB 3-10 GHz bands).

Figure 2:
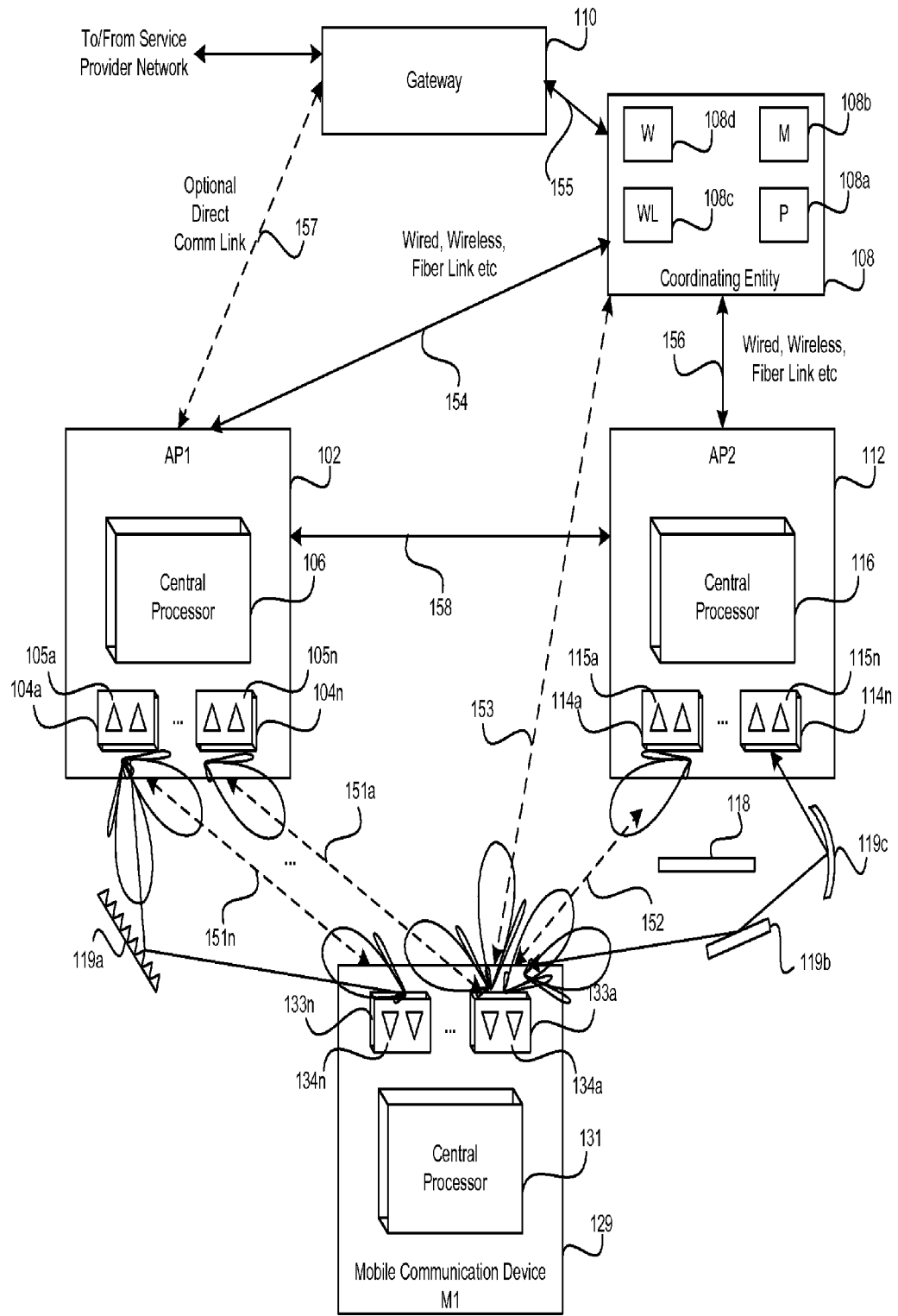
FIG. 2 is a block diagram illustrating distributed transceivers utilized for wireless communication in access points and a mobile communication device, in accordance with an exemplary embodiment of the invention.

FIG. 2 is a block diagram illustrating distributed transceivers utilized for wireless communication in access points and a mobile communication device in accordance with an exemplary embodiment of the invention. Referring to FIG. 2, there are shown access points 102, 112, a mobile communication device 129, a coordinating entity 108 and a gateway 110. The access points 102, 112 are also referenced as AP1 and AP2, respectively. The mobile communication device 129 is also referenced as M1. Although a single mobile communication device 129 is shown, the invention is not limited in this regard. Accordingly, a plurality of mobile and/or non-mobile communication devices may also be present without departing from the spirit and/or scope of the invention. FIG. 2 also shows a blocking object 118, refractive surface 119a, a flat reflective surface 119b and a curved reflective surface 119c. The blocking object 118 blocks line or sight communication between the distributed transceiver 133n in the mobile communication device 129 and the distributed transceiver 114n in the access point 112.

The refractive surface 119a may be substantially similar to the refractive surfaces 29b, 41d, which are shown and described with respect to FIG. 1, for example. The flat reflective surface 119b may be substantially similar to the flat refractive surfaces 29c, 41c, which are shown and described with respect to FIG. 1, for example. The curved reflective surface 119c may be substantially similar to the curved reflective surfaces 29a, 41a, 41b, which are shown and described with respect to FIG. 1, for example.

The access point 102 (AP1) may be substantially similar to any of the access points 26a, 26b, . . . , 26n and/or the access points 36a, 36b, . . . , 36n, which are shown and described with respect to FIG. 1, for example. Notwithstanding, as shown in FIG. 2, the access point 102 (AP1) may comprise a central processor 106 and a plurality of distributed transceiver devices 104a, . . . , 104n. The distributed transceiver devices 104a, . . . , 104n may comprise a corresponding plurality of antenna arrays 105a, . . . , 105n. The access point 102 may be communicatively coupled to the coordinating entity 108 via a communication link 154, which may comprise a wired, wireless, optical and/or other type of communication link. The access point 102 may also be communicatively coupled to the access point 112 via a communication link 158, which may comprise a wired, wireless, optical and/or other type of communication link. In accordance with some embodiments of the invention, the access point 102 may optionally be coupled to the gateway 110 via an optional direct communication link 157, which may comprise a wired, wireless, optical, HFC, and/or other type of direct communication link.

The plurality of distributed transceiver devices 104a, . . . , 104n in the access point 102 may comprise suitable logic, circuitry, interfaces and/or code that may be operable to handle communication utilizing WPAN, WLAN, WMAN, WWAN and/or mmWave technologies, standards and/or protocols.

Each of the plurality of antenna arrays 105a, . . . , 105n in the plurality of distributed transceiver devices 104a, . . . , 104n may comprise suitable logic, circuitry, interfaces and/or code that may be operable to communicate wireless signals. For example, each of the plurality of antenna arrays 105a, . . . , 105n in the plurality of distributed transceiver devices 104a, . . . , 104n may be operable to transmit and/or receive wireless signals corresponding to the WPAN, WLAN, WMAN, WWAN and/or mmWave technologies, standards and/or protocols.

The central processor 106 in the access point 102 may comprise suitable logic, circuitry, interfaces and/or code that may be operable to control and/or manage operation of the access point 102. In this regard, the central processor 106 may be operable to configure and/or manage the communication links that are handled by the access point 102. For example, the central processor 106 may be operable to configure and/or manage the communication links 154, 158, and 151a, . . . , 151n. The central processor 106 may be operable to configure and/or manage the plurality of distributed transceivers 104a, . . . , 104n and the corresponding antenna arrays 105a, . . . , 105n, which are in the access point 102. The central processor 106 may be operable to monitor and/or collect information from various devices within the access point 102 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the access points 102 and 112 and utilize the corresponding aggregated data to configure the plurality of distributed transceivers 104a, . . . , 104n and/or 114a, . . . , 114n, respectively, and/or the corresponding antenna arrays 105a, . . . , 105n and/or 115a, . . . , 115n to improve the communication links 151a, . . . , 151n and/or 152. The coordinating entity 108 may also utilized the corresponding aggregated data to inform the mobile communication device 129 how to configure, for example, its plurality of distributed transceivers 133a, . . . , 133n and/or antenna arrays 134a, . . . , 134n, respectively. The central processor 106 may operate and/or control the distributed transceivers 104a, . . . , 104n in any of the distributed modes of operation such as spatial multiplexing, spatial diversity, frequency multiplexing, frequency diversity, and MIMO processing, according to embodiments in U.S. application Ser. Nos. 13/473,096, 13/473,144, 13/473,105, 13/473,160, 13/473,180, 13/473,113, 13/473,083, each of which is hereby incorporated by reference in its entirety.

In accordance with various embodiments of the invention, the central processor 106 in the access point 102 may also be operable to control one or more of the one or more of the distributed transceivers 104a, . . . , 104n to sense the surrounding environment and determine objects that may block transmission for one or more of the distributed transceivers 104a, . . . , 104n. The characteristics of corresponding transmitted and/or received signals may be analyzed by one or more of the distributed transceivers 104a, . . . , 104n in order to sense the surrounding environment. For example, the analysis may determine transmitted and/or received signal strength, frequency changes, phase changes, angle of transmission, angle of arrival and/or other characteristics of the transmitted and/or received signals in order to sense the environment. The central processor 106 in the access point 102 may also be operable to control one or more of the one or more of the distributed transceivers 104a, . . . , 104n to sense the surrounding environment and determine objects that may possess reflective and/or refractive properties based on the characteristics of corresponding transmitted and/or received signals. The results of the sensing may be utilized to enhance and/or optimize communication by one or more of the distributed transceivers 104a, . . . , 104n. The central processor 106 in the access point 102 may be operable to receive the sensed information of the surrounding environment from one or more of the distributed transceivers 104a, . . . , 104n and communicate the corresponding sensed information of the surrounding environment to the coordinating entity 108. For example, the central processor 106 in the access point 102 may be operable to determine the presence of the refractive surface 119a based on the analysis of corresponding transmitted and/or received signals and communicate the presence of the refractive surface 119a to the coordinating entity 108. In this regard, the central processor 106 in the access point 102 may also be operable to provide spatial and/or temporal information regarding the refractive surface 119a to the coordinating entity 108.

The access point 112 (AP2) may be substantially similar to any of the access points 26a, 26b, . . . , 26n and/or the access points 36a, 36b, . . . , 36n, which are shown and described with respect to FIG. 1, for example. Notwithstanding, as shown in FIG. 2, the access point 112 (AP2) may comprise a central processor 116 and a plurality of distributed transceiver devices 114a, . . . , 114n. The plurality of distributed transceiver devices 114a, . . . , 114n may comprise a corresponding plurality of antenna arrays 115a, . . . , 115n. The access point 112 may be communicatively coupled to the coordinating entity 108 via a communication link 156, which may comprise a wired, wireless, optical and/or other type of communication link. The access point 112 may also be communicatively coupled to the access point 102 via the communication link 158, which may comprise a wired, wireless, optical and/or other type of communication link. Although not shown, the access point 112 may also be communicatively coupled to the gateway 110 via a wired, wireless, optical and/or other type of communication link.

The plurality of distributed transceiver devices 114a, . . . , 114n in the access point 112 may comprise suitable logic, circuitry, interfaces and/or code that may be operable to handle communication utilizing WPAN, WLAN, WMAN, WWAN and/or mmWave technologies, standards and/or protocols. Each of the plurality of antenna arrays 115a, . . . , 115n in the plurality of distributed transceiver devices 114a, . . . , 114n may comprise suitable logic, circuitry, interfaces and/or code that may be operable to communicate wireless signals. For example, each of the plurality of antenna arrays 115a, . . . , 115n in the plurality of distributed transceiver devices 114a, . . . , 114n may be operable to transmit and/or receive wireless signals corresponding to the WPAN, WLAN, WMAN, WWAN and/or mmWave technologies, standards and/or protocols.

The central processor 116 in the access point 112 may comprise suitable logic, circuitry, interfaces and/or code that may be operable to control and/or manage operation of the access point 112. In this regard, the central processor 116 may be operable to configure and/or manage the communication links that are handled by the access point 112. For example, the central processor 116 may be operable to configure and/or manage the communication links 156, 158, and 152. The central processor 106 may be operable to configure and/or manage the plurality of distributed transceivers 114a, . . . , 114n and the corresponding antenna arrays 115a, . . . , 115n, which are in the access point 112. The central processor 116 may be operable to monitor and/or collect information from various devices within the access point 112 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the access points 102, 112 and utilize the corresponding aggregated data to configure the plurality of distributed transceivers 114a, . . . , 114n and/or the plurality of distributed transceivers 104a, . . . , 104n, and/or the corresponding antenna arrays 115a, . . . , 115n and/or 105a, . . . , 105n, respectively, to improve the communication links 152 and/or 151a, . . . , 151n. The coordinating entity 108 may also utilize the corresponding aggregated data to inform the mobile communication device 129 how to configure, for example, its plurality of distributed transceivers 133a, . . . , 133n and/or antenna arrays 134a, . . . , 134n.

In accordance with various embodiments of the invention, the central processor 116 in the access point 112 may also be operable to control one or more of the distributed transceivers 114a, . . . , 114n to sense the surrounding environment and determine objects that may block transmission for one or more of the distributed transceivers 114a, . . . , 114n. The characteristics of corresponding transmitted and/or received signals may be analyzed by one or more of the distributed transceivers 114a, . . . , 114n in order to sense the surrounding environment. For example, the analysis may determine transmitted and/or received signal strength, frequency changes, phase changes, angle of transmission, angle of arrival and/or other characteristics of the transmitted and/or received signals in order to sense the environment. The central processor 116 in the access point 112 may also be operable to control one or more of the distributed transceivers 114a, . . . , 114n to sense the surrounding environment and determine objects that may possess reflective and/or refractive properties based on analysis of the characteristics of the corresponding transmitted and/or received signals. The results of the sensing may be utilized to enhance and/or optimize communication by one or more of the distributed transceivers 114a, . . . , 114n. The central processor 116 in the access point 112 may be operable to communicate sensed information of the surrounding environment to the coordinating entity 108. For example, the central processor 116 in the access point 112 may be operable to determined the presence of the flat reflective surface 119b and/or the curved reflective surface 119c based on the analysis of corresponding transmitted and/or received signals and communicate the presence of the flat reflective surface 119b and/or the curved reflective surface 119c to the coordinating entity 108. In this regard, the central processor 116 in the access point 112 may also be operable to provide spatial and/or temporal information regarding the flat reflective surface 119b and/or the curved reflective surface 119c to the coordinating entity 108.

The mobile communication device 129 (M1) may be substantially similar to any of the mobile communication devices 30a, 30b, 30c, . . . , 30n, the mobile communication devices 42a, 42b, 42c, . . . , 42n, which are shown and described with respect to FIG. 1, for example. Notwithstanding, as shown in FIG. 2, the mobile communication device 129 may comprise a central processor 131 and a plurality of distributed transceiver devices 133a, . . . , 133n. The plurality of distributed transceiver devices 133a, . . . , 133n may comprise a corresponding plurality of antenna arrays 134a, . . . , 134n. Although not shown, the mobile communication device 129 may comprise one or more transmitters, receivers and/or transceivers that may be operable to handle a plurality of wired and/or wireless communication technologies, standards and/or protocols. For example, the one or more transmitters, receivers and/or transceivers may be operable to handle IEEE 802.3, WPAN, WLAN, WMAN, WWAN and/or mmWave technologies, standards and/or protocols. The mobile communication device 129 may comprise a mobile entity such as the mobile entity 31 of FIG. 1.

The central processor 131 in the mobile communication device 129 may comprise suitable logic, circuitry, interfaces and/or code that may be operable to control and/or manage operation of the mobile communication device 129. In this regard, the central processor 131 may be operable to configure and/or manage the communication links for the mobile communication device 129. For example, the central processor 131 may be operable to configure and/or manage the communication links 153, 151a, . . . , 151n, and 152. The central processor 131 may be operable to configure and/or manage the plurality of distributed transceivers 133a, . . . , 133n and the corresponding antenna arrays 134a, . . . , 134n, which are in the mobile communication device 129. The central processor 131 may be operable to monitor and/or collect information from various devices, for example, other transmitters, receivers and/or transceivers, within the mobile communication device 129 and communicate data associated with the monitoring and/or collecting to the coordinating entity 108. The coordinating entity 108 may utilize the resulting communicated data to configure the operation of one or both of the access points 102 and 112. For example, the coordinating entity 108 may aggregate resulting data received from the mobile communication device 129 and/or the access points 102, 112 and utilize the corresponding aggregated data to configure the plurality of distributed transceivers 114a, . . . , 114n and/or the plurality of distributed transceivers 104a, . . . , 104n, and/or the corresponding antenna arrays 115a, . . . , 115n and/or 105a, . . . , 105n, respectively, to improve the communication links 152, 153, and/or 151a, . . . , 151n. The coordinating entity 108 may also utilize the corresponding aggregated data to inform the mobile communication device 129 how to configure, for example, its plurality of distributed transceivers 133a, . . . , 133n and/or antenna arrays 134a, . . . , 134n.

Each of the plurality of distributed transceiver devices 133a, . . . , 133n may comprise in the mobile communication device 129 may suitable logic, circuitry, interfaces and/or code that may be operable to handle WPAN, WLAN, WMAN, WWAN and/or mmWave technologies, standards and/or protocols. Each of the plurality of antenna arrays 134a, . . . , 134n in the plurality of distributed transceiver devices 133a, . . . , 133n may comprise suitable logic, circuitry, interfaces and/or code that may be operable to communicate wireless signals. For example, each of the plurality of antenna arrays 134a, . . . , 134n in the plurality of distributed transceiver devices 133a, . . . , 133n may be operable to transmit and/or receive wireless signals corresponding to the WPAN, WLAN, WMAN, WWAN and/or mmWave technologies, standards and/or protocols.

In accordance with various embodiments of the invention, the central processor 131 in the mobile communication device 129 may also be operable to sense the surrounding environment and determine objects that may block transmission for one or more of the distributed transceivers 133a, . . . , 133n. The central processor 131 in the mobile communication device 129 may also be operable to control one or more of the distributed transceivers 133a, . . . , 133n to sense the surrounding environment in order determine objects that may possess reflective and/or refractive properties, which may be utilized to enhance and/or optimize communication by one or more of the distributed transceivers 133a, . . . , 133n. In this regard, the characteristics of corresponding transmitted and/or received signals may be analyzed by one or more of the distributed transceivers 133a, . . . , 133n in order to sense the surrounding environment. For example, the analysis may determine transmitted and/or received signal strength, frequency changes, phase changes, angle of transmission, angle of arrival and/or other characteristics of the transmitted and/or received signals in order to sense the environment. The central processor 131 in the mobile communication device 129 may be operable to receive sensed information of the surrounding environment from one or more of the distributed transceivers 133a, . . . , 133n and communicate the corresponding sensed information of the surrounding environment to the coordinating entity 108. For example, the central processor 131 in the mobile communication device 129 may be operable to control one or more of the distributed transceivers 133a, . . . , 133n to sense the presence of the refractive surface 119a, the flat reflective surface 119b and/or the curved reflective surface 119c based on the analysis of the corresponding transmitted and/or received signals and communicate the presence of the refractive surface 119a, the flat reflective surface 119b and/or the curved reflective surface 119c to the coordinating entity 108. In this regard, central processor 131 in the mobile communication device 129 may also be operable to provide spatial and/or temporal information regarding the refractive surface 119a, the flat reflective surface 119b and/or the curved reflective surface 119c to the coordinating entity 108.

The coordinating entity 108 may be substantially similar to any of the coordinating entities 28, 38, which are shown and described with respect to FIG. 1, for example. Notwithstanding, as shown in FIG. 2, the coordinating entity 108 may comprise a processor 108a, memory 108b, a wireless interface 108c and a wired interface 108d. Although not shown, the coordinating entity 108 may comprise other interfaces such as an optical interface, a HFC interface and/or other communication interfaces. The coordinating entity 108 may be communicatively coupled to the access points 102 (AP1), 112 (AP2) via the communication links 154, 156, respectively. The communication links 154, 156 may comprise wired, wireless (cellular, WLAN, WiMax, LTE), optical, HFC, point-to-point, and/or other types of communication links. The link between the coordinating entity 108 and access points 102, 112 may be utilized to transport both control data (settings, reports, configurations) as well as traffic comprising data streams intended for the user of mobile communication device 129.

The coordinating entity 108 may utilize the communication links 154, 156 to handle different data traffic categories. For example, the communication links 154 and/or 156 may be utilized to transport control information and/or commands between the coordinating entity 108 and the access point 102 and/or access point 112, respectively. The communication links 154 and/or 156 may be utilized to transport information bits intended for and/or generated by the mobile communication device 129. The communication links 154 and/or 156 may be utilized to transport raw analog to digital conversion (ADC) and/or digital to analog conversion (DAC) data between the access points 102, 112 and the central processors 106, 116 in the access points 102, 112, respectively. In this mode of operation, in order to enhance performance, communication and/or signal processing operations required to decode data (e.g., equalization, MIMO processing, demodulation, channel decoding) may be performed jointly at coordinating entity 108 on the combination of ADC samples received from access points 102 and 112.

The coordinating entity 108 may comprise suitable logic, circuitry, interfaces and/or code that may be operable to coordinate and/or manage operation of the access points 102, 112, the gateway 110 and/or the mobile communication device 129. For example, the coordinating entity 108 may be operable to coordinate operation of the access points 102, 112 in order to maximize and/or optimize the system performance within a mmWave and wireless communication network such as the mmWave and wireless communication networks 10, 12. The coordinating entity may be located in the access point 102, the access point 112, the gateway 110, or in a separate device location. In some embodiments of the invention, the functions performed by the access point 112 may be split among a plurality of devices. For example, one or more of the functions performed by the coordinating entity 108 may be split amongst two or more of the access point 102, the access point 112 and/or the gateway 110. In some embodiments of the invention, the coordinating entity 108 may reside in a remote location and/or may be hosted remotely.

The coordinating entity 108 may be operable to manage the combination of transceiver resources within the access points 102, 112 and maximize or optimize the performance of the corresponding wireless links 151a, . . . , 151n and 152 from the combination of the plurality of distributed transceivers 104a, . . . , 104n and 114a, . . . , 114n in the access points 102, 112, respectively, to the mobile communication device 129. In accordance with various embodiments of the invention, the coordinating entity 108 may be operable to provide coordinate operation of the plurality of distributed transceivers 104a, . . . , 104n and 114a, . . . , 114n in the access points 102, 112, respectively, to provide, for example, spatial multiplexing, spatial diversity, frequency diversity, frequency multiplexing, multiple input multiple output (MIMO) processing. In this regard, the coordinating entity 108 may be operable to combine or aggregate transceiver resources in the access points 102, 112 in order to program or configure the resulting pooled transceiver resources to provide better performance over the communication links 151a, . . . , 151n and 152. The coordinating entity 108 may be operable to program or configure the resulting pooled transceiver resources to provide different levels of coordination based on system restrictions and/or capabilities and/or based on channel characteristics, QoS, CoS, traffic type and so on.

U.S. application Ser. No. 13/473,160, which was filed May 16, 2012 discloses details of a method and system for providing diversity in a network of distributed transceivers with array processing and is hereby incorporated herein by reference in its entirely.

U.S. application Ser. No. 13/473,180, which was filed May 16, 2012 discloses details of a method and system that utilizes multiplexing in a network of distributed transceivers with array processing and is hereby incorporated herein by reference in its entirely.

U.S. application Ser. No. 13/473,113, which was filed May 16, 2012 discloses details of a method and system that utilizes MIMO communication in a network of distributed transceivers with array processing and is hereby incorporated herein by reference in its entirely.

The coordinating entity 108 may be operable to receive surrounding environment information from one or more of the access points 102, 112 and/or the mobile communication device 129. The coordinating entity 108 may be operable to utilize the process and/or aggregate the surrounding environment information from one or more of the access points 102, 112 and/or the mobile communication device 129 and utilize the resulting information to configure one or more of the distributed transceivers in one or more of the access points 102, 112 and/or the mobile communication device 129.

In an exemplary embodiment of the invention, the coordinating entity 108 may be operable to receive sensed information of the surrounding environment of the access point 102 from the central processor 106. The coordinating entity 108 may be operable to utilize the received sensed information of the surrounding environment of the access point 102, as well as information associated with the surrounding environment of the access point 112 and/or the surrounding environment of the mobile communication device 129 to configure one or more of the distributed transceivers in one or more of the access points 102, 112 and/or the mobile communication device 129 in order to optimize communication by one or more of the transceivers 104a, . . . , 104n and/or one or more of the antenna arrays 105a, . . . , 105n, which are in access point 102.

In another exemplary embodiment of the invention, the coordinating entity 108 may be operable to receive sensed information of the surrounding environment of the access point 112 from the central processor 116. The coordinating entity 108 may be operable to utilize the received sensed information of the surrounding environment of the access point 112, as well as information associated with the surrounding environment of the access point 102 and/or the surrounding environment of the mobile communication device 129 to configure one or more of the distributed transceivers in one or more of the access points 102, 112 and/or the mobile communication device 129 in order to optimize communication by one or more of the transceivers 114a, . . . , 114n and/or one or more of the antenna arrays 115a, . . . , 115n, which are in access point 112.

In another exemplary embodiment of the invention, the coordinating entity 108 may be operable to receive sensed information of the surrounding environment of the mobile communication device 129 from the central processor 131. The coordinating entity 108 may be operable to utilize the received sensed information of the surrounding environment of the mobile communication device 129, as well as information associated with the surrounding environment of the access point 102 and/or the surrounding environment of the access point 112 to configure one or more of the distributed transceivers in one or more of the access points 102, 112 and/or the mobile communication device 129 in order to optimize communication by one or more of the transceivers 133a, . . . , 133n and/or one or more of the antenna arrays 134a, . . . , 134n, which are in mobile communication device 129.

The coordinating entity 108 may be operable to determine the optimal beamforming patterns and modes of operation, which may be best for the access point 102, the access point 112 and/or the mobile communication device 129. Exemplary modes of operation may comprise spatial multiplexing, spatial diversity and frequency diversity. Once the coordinating entity 108 determines the beamforming patterns and/or modes of operation, the coordinating entity 108 may be operable to communicate corresponding information to the access point 102, the access point 112 and/or the mobile communication device 129. The access point 102, the access point 112 and/or the mobile communication device 129 may utilize the corresponding information to configure its plurality of distributed transceivers and/or antenna arrays accordingly. The coordinating entity 108 may be operable to configure the beam patterns for the access point 102 by taking into account the beam patterns that may be utilized by the access point 112 and/or the mobile communication device 129 in order to mitigate cross interference between the data streams for the access point 102 and the access point 112.

The processor 108a in the coordinating entity 108 may comprise suitable logic, circuitry, interfaces and/or code that may be operable to execute the operations of the coordinating entity 108.

The memory 108b in the coordinating entity 108 may comprise suitable logic, circuitry, interfaces and/or code that may be operable to store operating data, control information and/or data, which may be utilized by the coordinating entity 108.

The wireless interface 108c in the coordinating entity 108 may comprise suitable logic, circuitry, interfaces and/or code that may be operable to handle communication between the coordinating entity 108 and the gateway 110, the access point 102 and/or the access point 112. In some embodiments of the invention, in instances where the mobile communication device 129 may be within operating range of the coordinating entity 108, the mobile communication device 129 may be operable to communicate with the coordinating entity 108 via, for example, the wireless interface 108c.

The wired interface 108d in the coordinating entity 108 may comprise suitable logic, circuitry, interfaces and/or code that may be operable to handle communication between the coordinating entity 108 and the gateway 110, the access point 102 and/or the access point 112.

The gateway 110 may be substantially similar to any of the gateways 20, 22, 24, which are shown and described with respect to FIG. 1, for example.

Notwithstanding, as shown in FIG. 2, the gateway 110 may be communicatively coupled to the coordinating entity 108 via the link 155. The link 155 may comprise a wired and/or wireless communication link. In this regard, the wired interface 108d and/or the wireless interface 108c may be operable to handle communication via the communication link 155. The gateway 110 may be coupled to one or more service provider networks, for example, the service provider networks 14, 16, which are illustrated in and described with respect to FIG. 1, for example. In accordance with some embodiments of the invention, the gateway 110 may optionally be coupled to the access point 102 via an optional direct communication link 157. The optional direct communication link 157 may comprise a wired, wireless, optical, HFC, and/or other type of direct communication link.

As illustrated in FIG. 2, the distributed transceiver devices 104a, . . . , 104n and 114a, . . . , 114n are integrated in separate physical devices such as the access points 102, 112, respectively. The access point 102 comprises a plurality of distributed transceivers 104a, . . . , 104n and the access point 112 comprises a plurality of access points 114a, . . . , 114n. Although the plurality of distributed transceiver devices 104a, . . . , 104n and 114a, . . . , 114n are shown integrated in separate physical devices such as the access points 102, 112, respectively, the invention is not limited in this regard, accordingly, in some embodiments of the invention, the plurality of distributed transceiver devices 104a, . . . , 104n and 114a, . . . , 114n may be integrated in a single physical device such as the access point 102 or the access point 112.

In some embodiments of the invention, the coordinating entity 108 may be operable to coordinate the operation of the access point 102 and the access point 112 as a single virtual access point entity. In other words, the coordinating entity 108 may combine the plurality of distributed transceiver devices 104a, . . . , 104n and 114a, . . . , 114n and treat the combined plurality of distributed transceiver devices 104a, . . . , 104n and 114a, . . . , 114n as the single virtual access point entity. In this regard, the mobile communication device 129 may be operable to access one or more of the combined plurality of distributed transceiver devices 104a, . . . , 104n and 114a, . . . , 114n in the single virtual access point entity without knowledge that the combined plurality of distributed transceiver devices 104a, . . . , 104n and 114a, . . . , 114n are in separate physical access points, namely, access points 102, 112. The combined plurality of distributed transceiver devices 104a, . . . , 104n and 114a, . . . , 114n in the single virtual access point entity may provide, for example, more reliable service and higher throughput or bandwidth to the mobile communication device 129 than one or both of the access points 102, 112 since the resulting communication resources are coordinated as one by the coordinating entity 108.

The coordinating entity 108 may be operable to dynamically monitor and/or analyze the link quality (e.g., SNR or capacity) between the different transceivers within the access points 102, 112 and the mobile communication device 129. The link quality may be determined based on the signal to noise ratio (SNR), signal to interference noise ratio (SINR), carrier to noise interference ratio (CINR), link capacity, throughput, bit error rate (BER), packet error rate (PER) and/or other parameters. The coordinating entity 108 may be operable to allocate, de-allocate, reallocate, distribute and/or redistribute the overall capacity and/or throughput target to optimize communication by the access points 102, the access point 112 and/or the mobile communication device 129. In this regard, the coordinating entity 108 may be operable to communicate information to the central processors 106, 116 and the central processors 106, 116 may utilize this information to configure the corresponding plurality of distributed transceivers 104a, . . . , 104n and/or 114a, . . . , 114n and/or the antenna arrays 105a, . . . , 105n and/or 115a, . . . , 115n in the access point 102 and access point 112, respectively.

In an exemplary embodiment of the invention, in instances where a transceiver, for example, transceiver 104a, within the access point 102 may experience a good channel condition (high SNR), a higher throughput data stream may be passed through the transceiver 104a for communication with the mobile mmWave enable communication device 129.

In various embodiments of the invention, capacity distribution techniques such as water filling may also be utilized to optimize communication. In the water filling method, overall throughput to mobile mmWave enable communication device 129 may be partitioned and/or distributed over a plurality of different communication paths or communication links via the access points 102, 112 and/or one or more of the corresponding plurality of distributed transceivers 104a, ..., 104n and/or 114a, ..., 114n. The coordinating entity 108 and/or the central processors 106, 116 in the access points 102, 112, respectively, may be operable to determine the quality of each of the communication paths or communication links. The communication paths or communication links with higher SNR may be configured by the coordinating entity 108 and/or the central processors 106, 116 to carry a higher portion of the overall throughput while the communication paths or communication links with poorer SNR may be configured to carry a smaller portion of the overall traffic. The coordinating entity 108 may be operable to determine that the one or more of the plurality of distributed transceivers 104a, ..., 104n and/or 114a, ..., 114n and/or the antenna arrays 105a, ..., 105n and/or 115a, ..., 115n should be configured to operate in a multiplexing mode and that one or more remaining ones of the plurality of distributed transceivers 104a, ..., 104n and/or 114a, ..., 114n and/or the antenna arrays 105a, ..., 105n and/or 115a, ..., 115n should be configured to operate in a spatial and/or frequency diversity mode. In the multiplexing mode of operation, each of the plurality of distributed transceivers 104a, ..., 104n and/or 114a, ..., 114n in the access points 102, 112, respectively, may be configured to transmit a different data stream to the mobile communication device 129. In the spatial diversity mode and/or the frequency diversity mode of operation, each of the plurality of distributed transceivers 104a, ..., 104n and/or 114a, ..., 114n in the access points 102, 112, respectively, may be configured to transmit the same data stream in order to achieve better reliability and/or quality of transmission. With no loss of generality, the following depicts an example for rate distribution over multiple access points. The coordinating entity realizes effective SNR values of a1×P1, a2×P2, a3×P3 corresponding to links 151n, 151a, and 152, respectively. P1, P2, and P3 represent the transmit power used for links 151n, 151a, and 152, respectively. Finally, a1, a2, a3 are scaling factors that are functions of the propagation environment (path loss, antenna pattern gains, etc). A larger scaling factor represents a link with higher quality. Now, different rate distribution policies may be used by the coordinating entity 108 to provide a total combined capacity or throughput C0 to mobile device 129. If C1, C2, C3 represent the partial throughput over links 151n, 151a, and 152 respectively, then C0=C1+C2+C3 where partial capacities may be modeled (or approximated) as C1=K×log(1+a1×P1), C2=K×log(1+a2×P2), C3=K×log(1+a3×P3), where K is a constant factor. Then the optimization problem is to find a combination of P1, P2, P3 that optimize a cost/merit function (e.g., minimize sum power P1+P2+P3) for a given total achieved capacity C0. The above is one exemplary policy and other policies may be employed or adopted without departing from the spirit and scope of the invention. Other variations may also be adopted.

The coordinating entity 108 may be operable to determine whether different beamforming methodologies may be utilized for different ones of the plurality of distributed transceivers 104a, ..., 104n and/or 114a, ..., 114n in the access points 102, 112, respectively. In this regard, the coordinating entity 108 may be operable to determine that a narrower or a sharper beam pattern may be utilized by distributed transceivers with higher throughput streams, and a wider beam pattern may be utilized by transceivers with lower throughput data streams and/or data streams that may require higher fidelity. For example, the coordinating entity 108 may determine that the access point 102 should configure the distributed transceiver 104a with a wide beam pattern to accommodate a low throughput stream (but with higher fidelity) and configure the distributed transceiver 104n with a narrow sharp beam pattern to accommodate a high throughput stream.

The backhaul connection from the access points 102, 112 may comprise a wired, wireless, optical and/or other type of connection. For example, the communication links 154, 156, 157 are backhaul communication links that provide access to resources and/or services on the Internet 18 (FIG. 1) via the gateway 110. In an exemplary embodiment of the invention, the mobile communication device 129 may want to download data from an external resource such as a database in the server 18a on the Internet 18. The coordinating entity 108 may be operable to split the corresponding traffic from the server 18a to the mobile communication device 129 into a plurality of data streams. The coordinating entity 108 may be operable to route a portion of the corresponding data stream from the server 18a to the access point 102 while a remaining portion of the corresponding data stream may be routed from the server 18a to the access point 112 via the gateway 110 and one or more of the backhaul communication links 154, 156, 157. In this regard, the mobile communication device 129 may be operable to reconstruct the original downloaded data stream by aggregating the different portions of the corresponding data streams that are received via the access points 102, 112.

The coordinating entity 108 may be operable to control various operations, functions and/or resources of the access points 102, 112. In this regard, the coordinating entity 108 may be operable to control and/or manage the configuration and/or reconfiguration of the various operations, functions and/or resources of the access points 102, 112. The coordinating entity 108 may be operable to control and/or manage, for example, the various modes of operation, beam patterns, and/or the data splitting ratio between a plurality of access points such as the access points 102, 112. The coordinating entity 108 may be operable to control various operations, functions and/or resources of the access points 102, 112 in a static manner and/or in a dynamic manner as, for example, the channel conditions and/or throughput demands change. The static and/or dynamic control of the various operations, functions and/or resources of the access points 102, 112 may be applied on, for example, a packet-by-packet, frame-by-frame, and/or session-by-session basis.

In an exemplary embodiment of the invention, for a frame-by-frame operation, for a current frame, the coordinating entity 108 may configure the access point 102 to communicate data to the mobile communication device 129 utilizing a first carrier frequency and modulation scheme such as LTE over a 2 GHz carrier frequency. For the subsequent frame, the coordinating entity 108 may reconfigure the access point 102 to communicate data to the mobile communication device 129 utilizing a second carrier frequency and modulation scheme such as, OFDM over a 60 GHz carrier frequency.

In an exemplary embodiment of the invention, for a frame-by-frame operation, for a current frame, the coordinating entity 108 may configure the access point 102 to communicate data to the mobile communication device 129 utilizing a first carrier frequency and modulation scheme such as LTE over a 2 GHz carrier frequency. For the subsequent frame, the coordinating entity 108 may configure the access point 112 to communicate data to the mobile communication device 129 utilizing a second carrier frequency and modulation scheme such as, OFDM over a 60 GHz carrier frequency.

In another exemplary embodiment of the invention, for a session-by-session operation, for a current communication session, the coordinating entity 108 may configure the access point 102 to communicate data to the mobile communication device 129 utilizing a first carrier frequency and modulation scheme such as LTE over a 2 GHz carrier frequency. For the subsequent communication session, the coordinating entity 108 may reconfigure the access point 102 to communicate data to the mobile communication device 129 utilizing a second carrier frequency and modulation scheme such as, OFDM over a 60 GHz carrier frequency.

In another exemplary another embodiment of the invention, for a session-by-session operation, for a current communication session, the coordinating entity 108 may configure the access point 102 to communicate data to the mobile communication device 129 utilizing a first carrier frequency and modulation scheme such as, LTE over a 2 GHz carrier frequency. For the subsequent communication session, the coordinating entity 108 may configure the access point 112 to communicate data to the mobile communication device 129 utilizing a second carrier frequency and modulation scheme such as, OFDM over a 60 GHz carrier frequency.

The point at which the session may be transferred from one access point to another access point may be determined by the coordinating entity 108 based on, for example, location information of mobile communication device 129 and/or the access points 102, 112. In some embodiments of the invention, the location of one or more reflecting and/or refracting objects and/or structures within the communication environment may be utilized by the coordinating entity 108 to determine the characteristics of the beams and/or the transceiver settings that should be utilized in order to optimize communication.

The coordinating entity 108 may be operable to utilize the locations of the mobile communication device 129, the access point 102 and/or the access point 112 in order to provide an initial configuration of network parameters and/or settings for the distributed transceivers beam patterns and directions, power levels, individual stream data rates, and so on. The coordinating entity 108 may also operate in an adaptive manner in which it may be trained over time as it builds up a history of good settings for different locations, different devices, different environment conditions and so on, as more users connect to the communication network.

In an exemplary embodiment of the invention, it may be assumed that the mobile communication device 129 is located at a position specified by the coordinates (x1, y1, z1) and/or its spatial orientation. The coordinating entity 108 may be operable to utilize various positioning techniques such as triangulation in order to estimate the position and/or orientation of the mobile communication device 129. The coordinating entity 108 may be operable to utilize various training and estimation/optimization methods to determine the optimal configuration and/or settings for the plurality of distributed transceivers 104a, . . . , 104n, 114a, . . . , 114n, and/or the antenna arrays 105a, . . . , 105n, 115a, . . . , 115n in the network that may deliver the best capacity and/or performance to the mobile communication device 129. These settings may comprise, for example, activate access points, activate transceivers, beam-forming settings, transmit power levels for each of the plurality of distributed transceivers, orientation of the antenna arrays and/or corresponding antenna array elements, and so on. The coordinating entity 108 may be operable to store these optimal settings along with the location data (eg x1, y1, z1) in a database within the memory 108b. The next time that the coordinating entity 108 is establishing a connection with another mobile communication device, which may be located at or near (x1, y1, z1), it uses the optimal settings stored from previous connections as a good starting point to greatly speed up the connection setup and its optimization. The database, which may be stored in the memory 108b, may also be utilized by the system to improve the accuracy of location finding algorithms over time. In this case, the reverse of the above procedure may be utilized for positioning improvement. The coordinating entity 108 utilizes the close correlation between location and optimal settings to map optimal settings to a location value. For example, the coordinating entity 108 may be operable to store, in the database in the memory 108b, information, which indicates that for the mobile communication device 129 at location (x1, y1, z1), the optimal network settings (eg S1) leads to the best link performance. In instances where the coordinating entity 108 establishes a link with another mobile communication device, and after iterations of settings, for example, optimizing beam patterns, power levels, antenna array orientation, and so on, the optimal settings converge to the value S1 in the database, the coordinating entity 108 may be operable to conclude that the mobile communication device is within the vicinity of location (x1, y1, z1). The information stored in the database in the memory 108b may be based on ongoing measurements and analysis of current and/or stored data.

Different location techniques may be utilized by the system for the above purpose. Exemplary location techniques may comprise global navigation satellite system (GNSS) such as global positioning system (GPS), triangulation, and/or a known location of a neighboring device such as a WiFi access point. Additionally, the location data may be utilized by the coordinating entity 108 to identify a possible set of distributed transceivers that may be better suited for multi-stream operations, such as multiplexing in the same frequency channel, by demonstrating good phase condition properties.

The role of the coordinating entity 108 in configuring resources, for example the initial settings and/or carrier frequencies, may be shared or combined with the role of a medium access controller (MAC). In other words, the information collected and/or utilized by the coordinating entity 108 may also be used by the MAC controller to improve other MAC functionalities.

In one embodiment of the invention, the data demodulation (digital processing of sampled data by analog-to-digital converters) may be performed by each central baseband processors 106, 116, which may be located within the access points 102, 112, respectively. The final information data streams, after signal processing and decoding are done, may be communicated from the access points 102, 112. This may minimize the backhaul throughput out of the access points 102, 112.

In another embodiment of the invention, the raw data out of analog-digital converters corresponding to different distributed transceivers within the access points 102, 112 or the data after some partial digital signal processing, may be transported to the coordinating entity 108 for processing. The coordinating entity 108 may be operable to complete the remaining digital and/or baseband processing on the samples collected from one or more of the distributed transceivers 104a, . . . , 104n, 114a, . . . , 114n within access points 102, 112, respectively. This configuration may require a higher throughput for the backhaul communication links 154, 156 from access points 102, 112 to the coordinating entity 108 as raw data is being communication over the backhaul links 154, 156. This may be suitable in instances when the backhaul communication links 154, 156 between the access points 102, 112 and the coordinating entity 108 comprise a very high throughput such as optical links and/or high throughput Ethernet connections. In return, the coordinating entity 108 may be operable to perform joint processing and/or decoding of the streams that are captured by the various spatially-separated plurality of distributed transceivers 104a, . . . , 104n, 114a, . . . , 114n within access points 102, 112, respectively. This access to raw samples may be exploited to achieve a higher link performance. For example, in the distributed transceiver 104a in the access point 102 and the distributed transceiver 114a in the access point 112 are configured to receive the same data stream from mobile communication device 129, the coordinating entity 108 may process the captured samples from the plurality of distributed transceivers 104a, 114a jointly in an optimal fashion, for example, maximal ratio combining (MRC) after co-phasing the two corresponding sequence of samples. The joint processing may be extended to other modes of operation such as spatial multiplexing, spatial diversity, frequency diversity, multiple input multiple output (MIMO) processing, and so on.

In accordance with various embodiments of the invention, phase condition optimization (e.g., $\theta_{12}-\theta_{11}+\theta_{21}-\theta_{22}=(2n+1)\times 180°$) may be performed over a plurality of distributed transceivers such as the distributed transceivers 104a, 114a in the access points 102, 112. This may be useful when attempts to achieve the phase condition between the distributed transceivers within a single access point becomes difficult due to the particular spatial separation of the distributed transceivers within the single access point. In such instances, the coordinating entity 108 may be operable to identify distributed transceivers across a plurality of devices such as the access points 102, 112, which may be operable to better to meet the optimal phase condition requirements. The coordinating entity 108 is operable to collect the samples from the corresponding distributed transceivers, for example distributed transceivers 104a, 114a, in different access points 102, 112 and performs the joint processing of the corresponding sequences in order to maximize the multiplexed capacity and/or throughput.

In some embodiments of the invention, the mobile communication device 129 may be operable to receive its overall target data stream through aggregation of partial streams, which may be transmitted concurrently over a plurality of different access-points. For example, the mobile communication device 129 may be operable to receive the overall target data stream through aggregation of partial streams, which may be transmitted concurrently from the access point 102 and the access point 112. The mobile communication device 129 may be operable to receive its overall target data stream from the same distributed transceivers within the access point 102 and the access point 112 and/or from different distributed transceivers within the access point 102 and the access point 112. In instances where the spatial multiplexing mode is utilized, the corresponding partial data streams may be communicated over the same frequency by relying on the spatial separation of the access points 102, 112 and/or the beam pattern separations associated with antenna arrays for the corresponding distributed transceivers. In spatial multiplexing mode, the coordinating entity may monitor the cross-interference between all these concurrent co-channel links 151n, 151a, 152, 153 (due to cross-leakage between the antenna patterns). As long as antenna patterns can be adjusted to keep the cross-interference below a threshold, the coordinating entity 108 continues operating the network in spatial multiplexing mode (for maximal frequency reuse). If cross-interference is no longer avoidable (due to position of devices and directions of arrival), the coordinating entity 108 may decide to switch to frequency multiplexing to prevent a drop in throughput. If the frequency multiplexing mode is used, those partial data streams are sent over different carrier frequencies (at the same time). As another example, a hybrid combination may be configured by the coordinating entity 108 where links 151a and 152 are operated in the same frequency (since spatial separation is sufficiently large due to angles of arrival difference), but link 151n is operated at a different frequency than link 151a (since the cross-interference is expected to be large given the positions of the devices). Similarly, methods and policies may be adopted to operate the distributed transceivers in the modes of spatial multiplexing, spatial diversity, frequency multiplexing, frequency diversity, and MIMO processing, according to embodiments in U.S. application Ser. Nos. 13/473,096, 13/473,144, 13/473,105, 13/473,160, 13/473,180, 13/473,113, 13/473,083, which are hereby incorporated herein by reference in its entirety.

Various aspects of the invention may comprise a coordinating entity 108, which is operable to communicate with a plurality of network devices such as the access points 102, 112. Each of the plurality of network devices such as the access points 102, 112 may comprise a plurality of distributed transceivers 104a, . . . , 104n, 114a, . . . , 114n and one or more corresponding antenna arrays 105a, . . . , 105n, 115a, . . . , 115n, respectively. The coordinating entity 108 may be operable to receive information from one or more of the plurality of network devices such as the access points 102, 112 and/or from one or more communication devices such as the mobile communication device 129, which are communicatively coupled to the one or more of the plurality of network devices such as the access points 102, 112. Exemplary received information comprises location information, propagation environment characteristics, physical environment characteristics and/or link quality.

The coordinating entity 108 may be operable to coordinate communication of data streams for one or more of the plurality of distributed transceivers 104a, . . . , 104n, 114a, . . . , 114n and one or more corresponding antenna arrays 105a, . . . , 105n, 115a, . . . , 115n, respectively, for the plurality of network devices such as the access points 102, 112 based on the received information. Exemplary network devices may comprise access points, routers, switching devices, gateways, and/or set top boxes. The coordinating entity 108 may be integrated within one of the plurality of network devices such as the access points 102, 112 or may be located external to the plurality of network devices. In some embodiments of the invention, one or more functions performed by the coordinating entity 108 are split between the coordinating entity and one or more of the plurality of network devices such as the access points 102, 112.

The coordinating entity 108 may be operable to dynamically and/or adaptively control adjustment of one or more configuration settings for the one or more of the plurality of distributed transceivers 104a, ..., 104n, 114a, ..., 114n and one or more corresponding antenna arrays 105a, ..., 105n, 115a, ..., 115n, respectively, for one or more of the plurality of network devices such as the access points 102, 112, based on the received information. The coordinating entity 108 may also be operable to store the received information to generate a history of received information. The coordinating entity 108 may aggregate the history of the received information with current information that may be received from one or more of the plurality of network devices such as the access points 102, 112, and/or from the one or more communication devices such as the mobile communication device 129. The coordinating entity 108 may also be operable to dynamically and/or adaptively control adjustment of one or more configuration settings for the one or more of the plurality of distributed transceivers 104a, ..., 104n, 114a, ..., 114n and one or more corresponding antenna arrays 105a, ..., 105n, 115a, ..., 115n, respectively, for one or more of the plurality of network devices such as the access points 102, 112 based on the aggregated history of received information and current received information.

The coordinating entity 108 may also be operable to dynamically and/or adaptively control two or more of the plurality of distributed transceivers in a network device such as the access point 102 to utilize different modes of operation and/or to split the communication of the data streams amongst one or more of the plurality of distributed transceivers 104a, ..., 104n in a corresponding plurality of network devices. Exemplary modes of operation may comprise a spatial diversity mode, a frequency diversity mode, a spatial multiplexing mode, a frequency multiplexing mode and a multiple-input-multiple-output (MIMO) mode of operation. The coordinating entity 108 may be operable to backhauling traffic from one or more of the network devices via one or more wired and/or wireless communication links. In an exemplary embodiment of the invention, the distributed transceivers 104a, ..., 104n, 114a, ..., 114n may be configured to switch between spatial diversity mode, frequency diversity mode, multiplexing mode and MIMO mode based on, for example corresponding propagation environment conditions, link quality, device capabilities, device locations, resource availability and/or usage, latency requirements, target throughput and/or link budgets, application QoS requirements, class of service, and/or traffic type. The coordinating entity may also be operable to control two or more of the plurality of distributed transceivers 104a, ..., 104n, 114a, ..., 114n in a network device such as the access points 102, 112 to utilize different modulation schemes, constellations, protocols, frequencies, wireless standards and/or bandwidths to handle different types of data traffic and/or control traffic based on the received information.

In various aspects of the invention, a communication device such as the mobile communication device 129, which comprises a plurality of distributed transceivers 133a, ..., 133n and one or more corresponding antenna arrays 134a, ..., 134n may be operable to determine characteristics of one or more objects such as the object 118, 119a, 119b, 119c that are sensed within surrounding communication environment of the communication device 129. The communication device 129 may configure one or more of the plurality of distributed transceivers distributed transceivers 133a, ..., 133n and/or one or more corresponding antenna arrays 134a, ..., 134n to handle communication of one or more data streams based on the determined characteristics. Exemplary characteristics may comprise reflective property and/or refractive property of the sensed one or more objects within the surrounding communication environment of the communication device. The communication device 129 may be operable to store the determined characteristics, corresponding temporal information and/or spatial information for the sensed one or more objects, and/or signal propagation characteristics within the surrounding communication environment of the communication device. A map of the surrounding communication environment of the communication device 129 may also be generated based on the stored determined characteristics, corresponding temporal information and/or spatial information, and/or signal propagation characteristics. The communication device 129 may be operable to dynamically update the stored determined characteristics, corresponding temporal information and/or spatial information, and/or signal propagation characteristics, and/or the map based on additional information acquired by the communication device 129, information received from one or more other communication devices such as the access points 102, 112, and/or information received from one or more network devices such as the coordinating entity 108. The communication device 129 may be operable to communicate surrounding communication environment data comprising the determined characteristics, the corresponding temporal information and/or spatial information for the sensed one or more objects, and/or the signal propagation characteristics, from the communication device 129 to a coordinating device such as the coordinating entity 108. The coordinating device such as the coordinating entity 108 may be operable to process and/or aggregate the communicated surrounding communication environment data with other corresponding data for the communication environment, which is received from one or more other communication devices and/or one or more network devices to generate resulting data for the surrounding communication environment. The coordinating device such as the coordinating entity 108 may also communicate the resulting data for the surrounding communication environment from the coordinating device such as the coordinating entity 108 to the communication device 129, the one or more other communication devices such as the access points 102, 112, and/or the one or more network devices.

The communication device 129 may be operable to receive the communicated resulting data for the surrounding communication environment from the coordinating device such as the coordinating entity 108. The communication device 129 may be operable to adjust configuration of one or more of the plurality of distributed transceivers 133a, ..., 133n and/or one or more corresponding antenna arrays 134a, ..., 134n based on the received resulting data for the surrounding communication environment. The communication device 129 may be operable to determine one or more communication paths for communicating one or more of the data streams within the surrounding communication environment. The communication device 129 may be operable to configure one or more of the plurality of distributed transceivers 133a, ..., 133n and/or one or more corresponding antenna arrays 134a, ..., 134n to communicate one or more of the data streams via the determined one or more communication paths. One or more of the determined communication paths, which may be utilized for communicating the one or more data streams within the surrounding communication environment, may utilize a reflective surface and/or a refractive surface of the sensed one or more objects within the surrounding communication environment.

Figure 3:
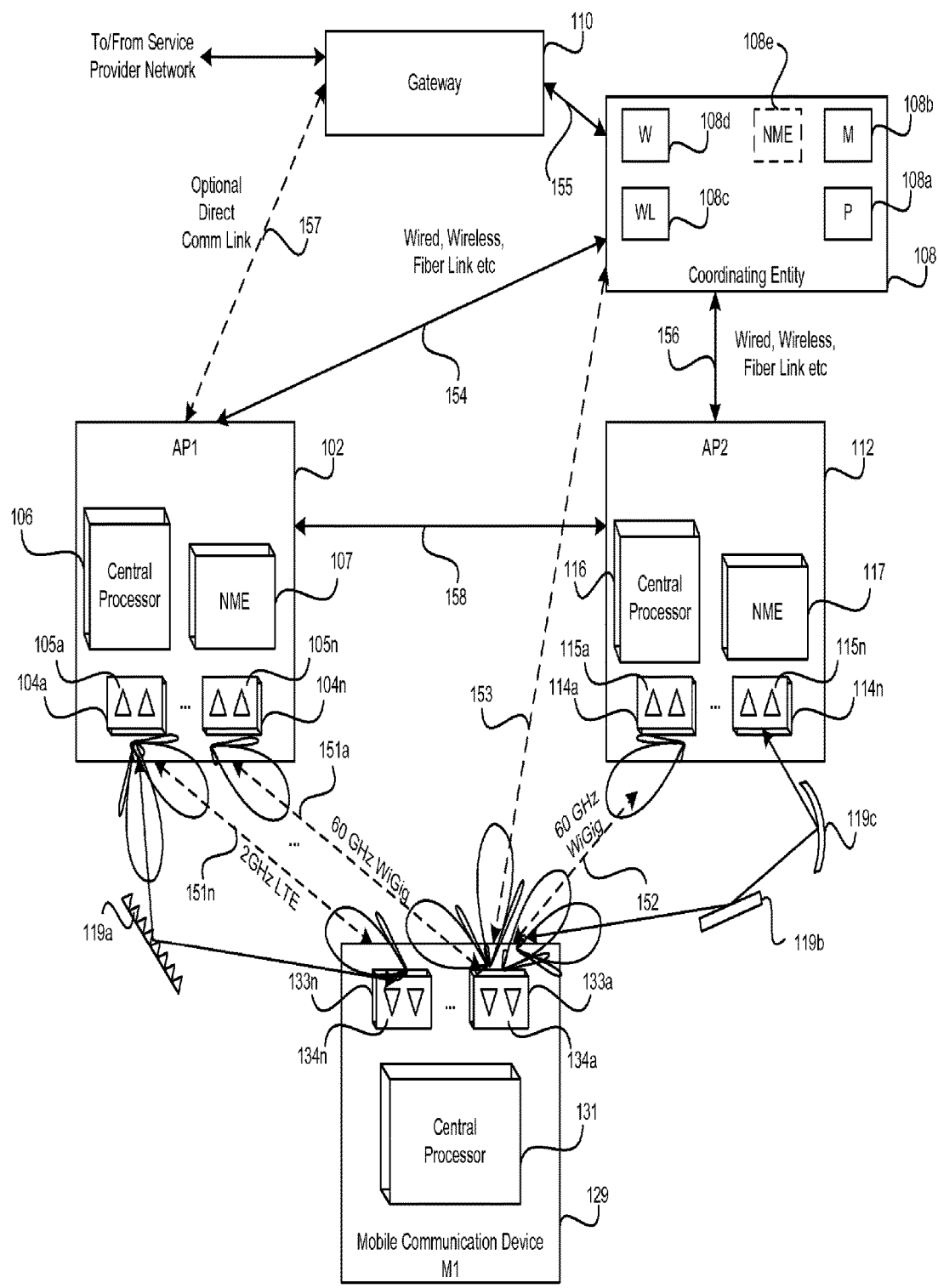
FIG. 3 is a block diagram illustrating distributed transceivers utilized for wireless communication in access points in which the access points utilize different link protocols and/or operating modes, in accordance with an exemplary embodiment of the invention.

FIG. 3 is a block diagram illustrating distributed transceivers utilized for wireless communication in access points in which the access points utilize different link protocols and/or operating modes, in accordance with an exemplary embodiment of the invention. FIG. 3, there are shown access points 102, 112, a mobile communication device 129, a coordinating entity 108 and a gateway 110. The access points 102, 112, the mobile communication device 129, the coordinating entity 108 and the gateway 110 may be substantially similar to the corresponding components, which are shown in and described with respect to FIG. 2, for example. The components within each of the access points 102, 112, the mobile communication device 129 and the coordinating entity 108 may be substantially similar to the corresponding components, which are shown in and described with respect to FIG. 2, for example. The communication links 151a, . . . , 151n, 152, 153, 154, 155, 156, 157 and 158 may be substantially similar to the corresponding components, which are shown in and described with respect to FIG. 2, for example. FIG. 3 also shows a refractive surface 119a, a flat reflective surface 119b and a curved reflective surface 119c.

The refractive surface 119a may be substantially similar to the refractive surfaces 29b, 41d, which are shown and described with respect to FIG. 1, for example. The flat reflective surface 119b may be substantially similar to the flat refractive surfaces 29c, 41c, which are shown and described with respect to FIG. 1, for example. The curved reflective surface 119c may be substantially similar to the curved reflective surfaces 29a, 41a, 41b, which are shown and described with respect to FIG. 1, for example.

The access point 102 may also comprise a network management engine (NME) 107. The network management engine 107 may be operable to manage communication resources within the access point 102. The network management engine 107 may be operable to coordinate managing of the communication resources for the access point 102 with the coordinating entity 108 and/or the network management engine 117 in the access point 112. The network management engine 107 may be operable to communicate surrounding environment information for the access point 102 to the network management engine 108e in the coordinating entity 108. The network management engine 108e in the coordinating entity 108 may be operable to process and analyze the surrounding environment information and utilize the resulting information to coordinate, oversee and/or manage the operation of one or more of the network management engines 107, 117 in order to configure one or more of the distributed transceivers in one or more of the access points 102, 112 and/or the mobile communication device 129.

The access point 112 may also comprise a network management engine 117. The network management engine 117 may be operable to manage communication resources within the access point 112. The network management engine 117 may be operable to coordinate managing of the communication resources for the access point 112 with the coordinating entity 108 and/or the network management engine 107 in the access point 102. The network management engine 117 may be operable to communicate surrounding environment information for the access point 112 to the network management engine 108e in the coordinating entity 108. The network management engine 108e in the coordinating entity 108 may be operable to process and analyze the surrounding environment information and utilize the resulting information to coordinate, oversee and/or manage the operation of one or more of the network management engines 107, 117 in order to configure one or more of the distributed transceivers in one or more of the access points 102, 112 and/or the mobile communication device 129.

The coordinating entity 108 may also comprise an optional network management engine 108e. The network management engine 108e, which may be optional, may be operable to coordinate, oversee and/or manage the operation of one or more of the network management engines in the network. For example, the optional network management engine 108e may be operable to coordinate, oversee and/or manage operation of the network management engine 107 in the access point 102 and/or the network management engine 117 in the access point 112. In this regard, the optional network management engine 108e may be operable to coordinate operation of the communication resources within the access points 102, 112. In general, some or all of the functions that are handled by the network management engines 107, 117 may be coordinated by the network management engine 108e. The optional network management engine 108e may be operable to utilize information from the gateway 110, the access point 102, the access point 112, the mobile communication device 129, and/or from within the coordinating entity 108 to coordinate, oversee and/or manage the operation of one or more of the network management engines in the network. The network management engine 108e in the coordinating entity 108 may be operable to utilize process and/or aggregate the surrounding environment information from one or more of the network management engines 107, 117 in the access points 102, 112, respectively, and/or from the mobile communication device 129. The network management engine 108e in the coordinating entity 108 may be operable to utilize the resulting information to coordinate, oversee and/or manage the operation of one or more of the network management engines in network in order to configure one or more of the distributed transceivers in one or more of the access points 102, 112 and/or the mobile communication device 129. Methods of operating distributed transceivers in spatial multiplexing, frequency multiplexing, spatial diversity, and frequency diversity, are disclosed in U.S. application Ser. Nos. 13/473,096, 13/473,144, 13/473,105, 13/473,160, 13/473,180, 13/473,113, 13/473,083, which are incorporated herein by reference in there entirety, and may be utilized to optimize the links between 102, 121 and between 108, 121.

In an exemplary embodiment of the invention, the network management engine 108e in the coordinating entity 108 may be operable to receive sensed information for the surrounding environments of the access points 102, 112 from the central processors 106, 116, respectively. The network management engine 108e in the coordinating entity 108 may be operable to utilize the received sensed information of the surrounding environment of the access points 102, 112, as well as information associated with the surrounding environment of the mobile communication device 129 to determine configuration information for one or more of the distributed transceivers in one or more of the access points 102, 112 and/or the mobile communication device 129. The network management engine 108e in the coordinating entity 108 may be operable to communicate the determined configuration information to the access points 102, 112 and/or the mobile communication device 129. The central processors 106, 116 and/or the 131 in the access points 102, 112 and/or the mobile communication device 129 may utilize the determined information to configure one or more of the transceivers 104a, ..., 104n and/or one or more of the antenna arrays 105a, ..., 105n, which are in access point 102, one or more of the transceivers 114a, ..., 114n and/or one or more of the antenna arrays 115a, ..., 115n, which are in access point 112 and/or one or more of the transceivers 133a, ..., 133n and/or one or more of the antenna arrays 134a, ..., 134n, which are in the mobile communication device 129, respectively. In this regard, the determined information may be utilized to configure the corresponding transceivers and/or antenna arrays to utilize one or more of the refractive surface 119a, the flat reflective surface 119b and/or the curved reflective surface 119c in order to optimize communication. The determined information may also be utilized to configure the corresponding transceivers and/or antenna arrays to avoid any objects that may block the communication of signals from one or more of the corresponding transceivers and/or antenna arrays.

In accordance with various embodiments of the invention, the distributed transceivers within a unit or device such as the access points 102, 112 and/or the mobile communication device 129 may be operable to support different carrier frequencies and/or modulation schemes through the same distributed transceiver implementation. In some embodiments of the invention, some of the distributed transceivers within a unit or device such as the access points 102, 112 and/or the mobile communication device 129 may be enabled to operate at certain carrier frequency ranges and/or utilize certain modulation schemes, while other distributed transceivers within the unit or device may be enabled to operate at other carrier frequency ranges and/or utilize different modulation schemes. In various embodiments of the invention, information associated with the environment surrounding the access points 102, 112 and/or the mobile communication device 129 may be utilized to determine the carrier frequency ranges and/or the modulation schemes, which are employed.

In various exemplary embodiment of the invention, the distributed transceiver 104a and the distributed transceiver 104n, which are both within the access point 102 may be operable to utilize different carrier frequencies and/or modulation schemes. As illustrated in FIG. 2, the distributed transceiver 104a may be operable to utilize a lower carrier frequency such as 2 GHz based on cellular, such as LTE, or WLAN modulation and/or constellations and protocols such as code division multiple access (CDMA) and variants thereof, orthogonal frequency division multiplexing (OFDM) in 2 GHz carrier frequency with different channel bandwidths, for example, 5 MHz, 10 MHz and/or 20 MHz. Other distributed transceivers in the access point 102 or the access point 112 may be operable to utilize higher carrier frequencies such as 60 GHz based on WiGig, 802.11ad modulations, constellations, and/or protocols, for example, single-carrier modulation or OFDM. In an exemplary embodiment of the invention, the distributed transceiver 114a in the access point 112 may be operable to utilize a 60 GHz WiGig modulation, constellations, and/or protocols. In some embodiments of the invention, the access points 102, 112 may comprise reconfigurable and/or programmable components, which may be reconfigured and/or programmed to support higher and/or lower carrier frequencies and/or different modulation, constellations, and/or protocols over the same distributed transceivers. Different multi-mode management schemes may also be utilized. In various embodiments of the invention, information received from the access points 102, 112 and/or the mobile communication device 129 associated with their corresponding surrounding environment may be utilized to determine the frequencies, modulation, constellations, and/or protocols, which are utilized by the distributed transceivers.

Each of the network management engines 107, 117 in the access points 102, 112, respectively, may be operable to manage the resources within each of the corresponding access points 102, 112. For example, the network management engine 107 in the access point 102 may be operable to manage, for example, the carrier frequencies, beam patterns, protocols and/or modulation schemes that are utilized by the plurality of distributed transceivers 104a, ..., 104n, which are located in the access point 102. Similarly, the network management engine 117 in the access point 112 may be operable to manage, for example, the carrier frequencies, beam patterns, protocols and/or modulation schemes that are utilized by the plurality of distributed transceivers 114a, ..., 114n, which are located in the access point 112. Although network management engines are shown only in the access points 102, 112, and the coordinating entity 108, the invention is not limited in this regard. Accordingly, a network management engine may reside in other components within the network. For example, a network management engine may be located in the gateway 110. In cases where a close coordination is desired or required between the network management engines 107, 117, the optional network management engine 108e may be operable to coordinate operation of the distributed network management engines 107, 117, which may be located in the access points 102, 112, respectively. The network management engines 107, 117 and/or the optional network management engine 108e may be operable to dynamically and/or adaptively reassign and/or reactivate transceiver resources in the access points 102, 112 to different carrier frequencies, modulation schemes and/or protocol schemes. Based on propagation conditions, environment conditions and throughput demands, the network management engines 107, 117 and/or the optional network management engine 108e may be operable to reconfigure the plurality of distributed transceivers 104a, ..., 104n and/or 114a, ..., 114n, which are located in the access points 102, 112, respectively.

In some cases, one or more of the network management engines 107, 117 and/or the optional network management engine 108e may be operable to configure and/or activate some of the plurality of distributed transceivers of the transceivers 104a, ..., 104n and 114a, ..., 114n, which are located in the access points 102, 112, respectively, to operate at lower carrier frequencies while others of the plurality of distributed transceivers 104a, ..., 104n and 114a, ..., 114n may be configured and/or activated to operate at higher carrier frequencies. Accordingly, one or more of the network management engines 107, 117 and/or the optional network management engine 108e may be operable to optimize the overall link throughput and/or performance for the data being transported and/or aggregated over the plurality of carrier frequencies.

In instances when one or more of the network management engines 107, 117 and/or the optional network management engine 108e may configure one or more the plurality of distributed transceivers 104a, ..., 104n and 114a, ..., 114n to operate at, for example, a 2 GHz carrier frequency and there may be a request for higher capacity and/or throughput, one or more of the network management engines, 107, 117 and/or the optional network management engine 108e may be operable to establish additional streams over, for example, a 60 GHz carrier frequency, in parallel, utilizing additional available transceiver resources. In some instances, one or more of the network management engines, for example, the network management engines 107, 117 and/or the optional network management engine 108e may be operable to reassign at least a portion of the resources used for 2 GHz carrier frequency to the 60 GHz carrier frequency and provide the requested capacity over at least a portion of the 60 GHz carrier frequencies. In this regard, there may be instances when one or more of the network management engines, for example, the network management engines 107, 117 and/or the optional network management engine 108e may be operable to reassign all of the resources used for 2 GHz carrier frequency to the 60 GHz carrier frequency and provide the requested capacity over only the 60 GHz carrier frequencies.

In some embodiments of the invention, the network management engine 107, the network management engine 117 and/or the optional network management engine 108e may be operable to assign different traffic types and/or class of traffic for transporting over different carrier frequencies depending on the requirements of each traffic type and/or class. For example, critical but low throughput control traffic may be assigned to be transported over lower carrier frequencies, for example, LTE in the 2 GHz carrier frequency range, while high throughput video streaming traffic may be assigned to be transported concurrently over higher carrier frequencies such as one or more mmWave links in the 60 GHz carrier frequency range. Similarly, in order to provide a particular QoS (latency for voice/video over IP) to the mobile communication device 129 and/or to handle specific CoS traffic (voice, browsing data, video, etc), the network management engine 107, the network management engine 117 and/or the optional network management engine 108e may be operable to assign corresponding traffic for transporting over different carrier frequencies.

In a location-based allocation of resources mode of operation, the network management engine 107, the network management engine 117 and/or the optional network management engine 108e may be operable to utilize the location and/or orientation of the mobile communication device 129 and/or the locations of one or more of the access points 102, 112 to determine the carrier frequencies to activate and/or utilize to provide the requested link throughput. The network management engine 107, the network management engine 117 and/or the optional network management engine 108e may be operable to utilize past history of link quality per carrier frequency versus the corresponding location of a mobile communication device such as the mobile communication device 129 to determine the carrier frequencies to activate and/or utilize the requested link throughput. Locations with history of good 60 GHz propagation conditions may utilize one or more of 60 GHz carrier frequencies. Locations with poorer 60 GHz propagation properties may rely more on lower carrier frequencies such as LTE at 2 GHz carrier frequency. In some embodiments of the invention, additional sensors may be used to sense and/or acquire other data from the environment and that other data may be utilized to establish the link from better initial settings for the plurality of distributed transceivers 104a, . . . , 104n, and 114a, . . . , 114n. The sensed and/or acquired data may comprise, for example, time, date, temperature, atmospheric conditions, and so on. The history and location information may be stored in the memory 108b of the coordinating entity 108. A combination of coarse and fine positioning methods may be utilized. A coarse method (e.g., based on WiFi signal) may be used for quick initialization of settings, followed by a finer method (e.g., based on mmWave signal) for tuning the settings.

In a price-based allocation of resources mode of operation, the network management engine 107, the network management engine 117, the optional network management engine 108e and/or network operator may utilize a pricing scheme for allocation of carrier frequencies. While certain carrier frequencies can be allocated and/or utilized for users requesting free service, other carrier frequencies, for example, carrier frequencies with better quality, throughput, latency and/or capacity characteristics, may be allocated for premium users or users that are paying a fee. In some embodiments of the invention, the activation of higher quality services, for example, through certain carrier frequencies may be done by users on a per-demand basis. In such cases, the user may activate an application running on a communication device such as one of the communication devices 30a, 30b, 30c, . . . , 30n, 42a, 42b, 42c, . . . , 42n to enable a higher quality service. The higher quality service may require a higher payment by the user.

Figure 4:
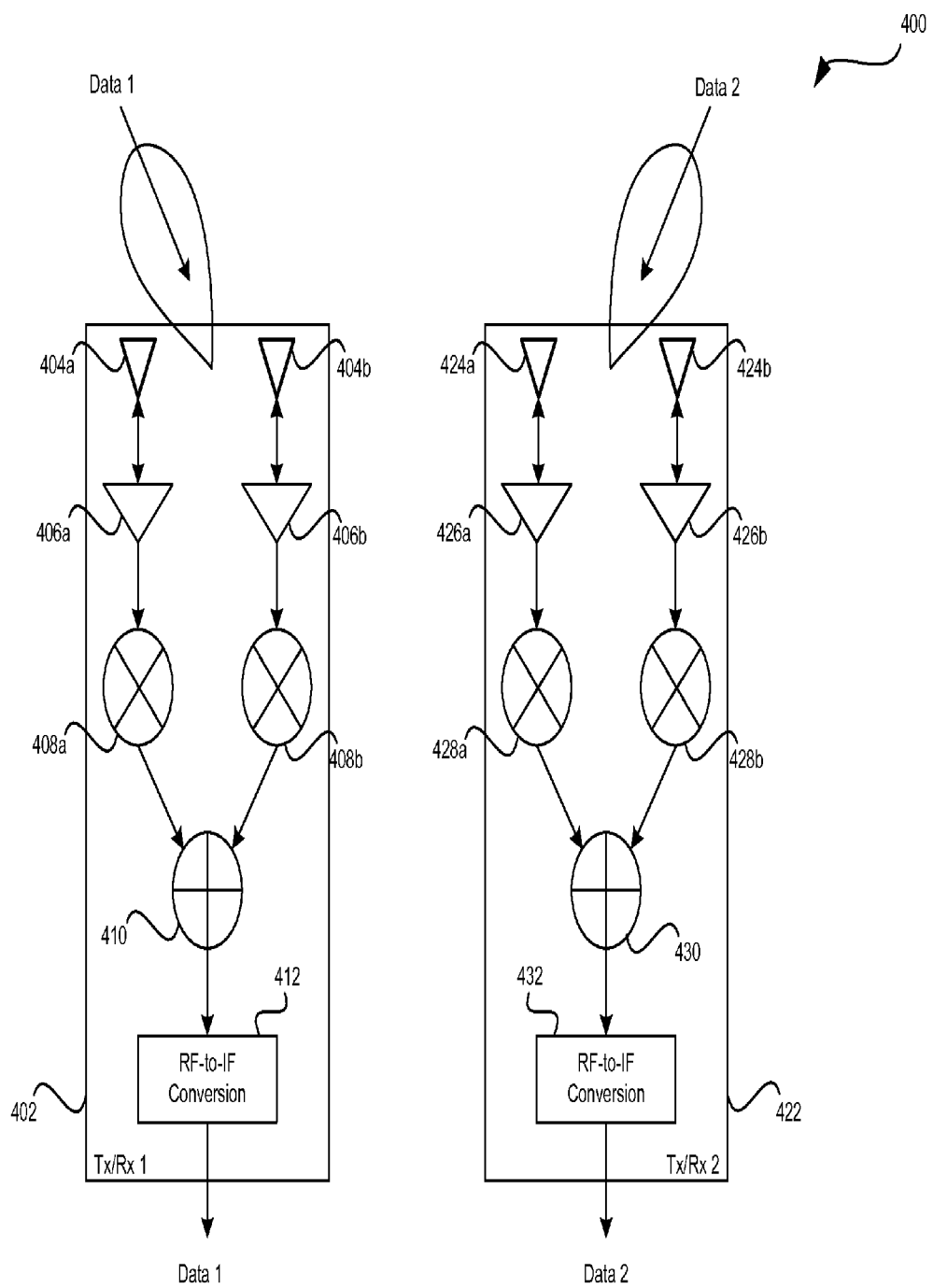
FIG. 4 is a block diagram of an exemplary beamforming implementation of a distributed transceiver device comprising corresponding receive portions of two transceivers, each of which receives the same data stream, in accordance with an exemplary embodiment of the invention.

FIG. 4 is a block diagram of an exemplary beamforming implementation of a distributed transceiver device comprising corresponding receive portions of two transceivers, each of which receives the same data stream, in accordance with an exemplary embodiment of the invention. Referring to FIG. 4, there are shown a distributed transceiver device 400 comprising receiver portions 402, 422 of distributed transceivers Tx/Rx 1, TX/Rx 2.

The receiver portion 402 of the transceiver Tx/Rx 1 may comprise antennas 404a, 404b, low noise amplifiers (LNAs) 406a, 406b, phase shifters 408a, 408b, a radio frequency (RF) combiner 410 and a RF to intermediate frequency (IF) conversion module 412. The path comprising the antenna 404a, the low noise amplifier 406a, the phase shifter 408a, the radio frequency (RF) combiner 410 and the RF to intermediate frequency (IF) conversion module 412 may comprise a first receive processing path or chain within the receiver portion 402 of the distributed transceiver Tx/Rx 1. The path comprising the antenna 404b, the low noise amplifier 406b, the phase shifter 408b, the radio frequency (RF) combiner 410 and the RF to intermediate frequency (IF) conversion module 412 may comprise a second receive processing path or chain within the receiver portion 402 of the distributed transceiver Tx/Rx 1. Although two antennas 404a, 404b, two low noise amplifiers (LNAs) 406a, 406b, and two phase shifters 408a, 408b are illustrated in FIG. 4, the invention is not necessarily limited in this regard. Accordingly, the number of antennas, low noise amplifiers, phase shifters, RF combiners and/or RF-to-IF conversion modules may vary depending on, for example, implementation and/or other factors, without departing from the spirit and/or scope of the invention.

The receiver portion 422 of the transceiver Tx/Rx 2 may comprise antennas 424a, 424b, low noise amplifiers (LNAs) 426a, 426b, phase shifters 428a, 428b, a radio frequency (RF) combiner 430 and a RF to intermediate frequency (IF) conversion module 432. The path comprising the antenna 424a, the low noise amplifier 426a, the phase shifter 428a, the radio frequency (RF) combiner 430 and the RF to intermediate frequency (IF) conversion module 432 may comprise a first receive processing path or chain within the receiver portion 422 of the distributed transceiver Tx/Rx 2. The path comprising the antenna 424b, the low noise amplifier 426b, the phase shifter 428b, the radio frequency (RF) combiner 430 and the RF to intermediate frequency (IF) conversion module 432 may comprise a second receive processing path or chain within the receiver portion 422 of the distributed transceiver Tx/Rx 2. Although two antennas 424a, 424b, two low noise amplifiers (LNAs) 426a, 426b, and two phase shifters 428a, 428b are illustrated in FIG. 4, the invention is not necessarily limited in this regard. Accordingly, the number of antennas, low noise amplifiers, phase shifters, RF combiners and/or RF-to-IF conversion modules may vary depending on, for example, implementation and/or other factors, without departing from the spirit and/or scope of the invention.

Each of the antennas 404a, 404b within the receiver portion 402 of the distributed transceiver Tx/Rx 1 may comprise suitable logic, circuitry, interfaces and/or code that may be operable to receive and/or transmit wireless signals. In this regard, each of the antennas 404a, 404b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 4, each of the antennas 404a, 404b may be operable to receive a data stream, namely, data 1 from a first direction.

Each of the low noise amplifiers (LNAs) 406a, 406b within the receiver portion 402 of the distributed transceiver Tx/Rx 1 may comprise suitable logic, circuitry, interfaces and/or code that may be operable to provide low noise amplification of the signals that are received by the antennas 404a, 404b, respectively.

Each of the phase shifters 408a, 408b within the receiver portion 402 of the distributed transceiver Tx/Rx 1 may comprise suitable logic, circuitry, interfaces and/or code that may be operable to adjust the phase of the signals that are output by the low noise amplifiers (LNAs) 406a, 406b, respectively.

The radio frequency (RF) combiner 410 within the receiver portion 402 of the distributed transceiver Tx/Rx 1 may comprise suitable logic, circuitry, interfaces and/or code that may be operable to combine the resulting phase shifted signals that may be received from the phase shifters 408a, 408b, respectively.

The RF to intermediate frequency (IF) conversion module 412 within the receiver portion 402 of the distributed transceiver Tx/Rx 1 may comprise suitable logic, circuitry, interfaces and/or code that may be operable to convert the output combined RF signals, which are generated by the RF combiner 410. In this regard, the RF-to-IF conversion module 412 may comprise, for example, one or more mixers, synthesizers and/or local oscillator generators, which may be operable to mix and/or otherwise convert the combined RF signals, which are generated by the RF combiner 410, to corresponding IF signals. The corresponding IF signals may comprise an intermediate frequency representation of the data stream, namely, data 2.

Each of the antennas 424a, 424b within the receiver portion 422 of the distributed transceiver Tx/Rx 2 may comprise suitable logic, circuitry, interfaces and/or code that may be operable to receive and/or transmit wireless signals. In this regard, each of the antennas 424a, 424b may comprise, for example, one or more antenna arrays that may be operable to receive and/or transmit the wireless signals. The one or more antenna arrays may comprise one or more antenna array elements that may be configured and/or adjusted to transmit and/or receive the wireless signals. In accordance with various embodiments of the invention, one or more of the antenna arrays and/or antenna array elements may be dynamically and/or adaptively adjusted to provide beamforming of the signals, to adjust directionality and/or various characteristics of the signals. As illustrated in FIG. 4, each of the antennas 424a, 424b may be operable to receive a data stream, namely, data 2 from a second direction, which may be different from the first direction.

Each of the low noise amplifiers (LNAs) 426a, 426b within the receiver portion 422 of the distributed transceiver Tx/Rx 2 may comprise suitable logic, circuitry, interfaces and/or code that may be operable to provide low noise amplification of the signals that are received by the antennas 424a, 424b, respectively.

Each of the phase shifters 428a, 428b within the receiver portion 422 of the distributed transceiver Tx/Rx 2 may comprise suitable logic, circuitry, interfaces and/or code that may be operable to adjust the phase of the signals that are output by the low noise amplifiers (LNAs) 426a, 426b, respectively.

The radio frequency (RF) combiner 430 within the receiver portion 422 of the distributed transceiver Tx/Rx 2 may comprise suitable logic, circuitry, interfaces and/or code that may be operable to combine the resulting phase shifted signals that may be received from the phase shifters 428a, 428b, respectively.

The RF to intermediate frequency (IF) conversion module 432 within the receiver portion 422 of the distributed transceiver Tx/Rx 2 may comprise suitable logic, circuitry, interfaces and/or code that may be operable to convert the output combined RF signals, which are generated by the RF combiner 430. In this regard, the RF-to-IF conversion module 432 may comprise, for example, one or more mixers, synthesizers and/or local oscillator generators, which may be operable to mix and/or otherwise convert the combined RF signals, which are generated by the RF combiner 430, to corresponding IF signals. The corresponding IF signals may comprise an intermediate frequency representation of the data stream, namely, data 2.

In accordance with various embodiments of the invention, for the beamforming implementation shown in FIG. 4, a plurality of phase shifters may be utilized by each of the receiver portion 402 of the distributed transceiver Tx/Rx 1 and the receiver portion 422 of the distributed transceiver Tx/Rx 2. The plurality of phase shifters may be operable to improve receiver beamforming gain for the plurality of antennas in the distributed transceivers. For example, the phase shifters 408a, 408b in the receiver portion 402 of the distributed transceiver Tx/Rx 1 and the phase shifters 428a, 428b in the receiver portion 422 of the distributed transceiver Tx/Rx 2 are operable to improve the beamforming gain for the plurality of antennas 404a, 404b and the plurality of antennas 424a, 424b in the distributed transceiver Tx/Rx 1 and the distributed transceiver Tx/Rx 2, respectively. The phase shifters 408a, 408b, in the receiver portion 402 of the distributed transceiver Tx/Rx 1 may be dynamically and/or adaptively configured or adjusted to maximize beamforming gain on the data stream, namely, data 1. Similarly, the phase shifters 428a, 428b, in the receiver portion 422 of the distributed transceiver Tx/Rx 2 may be dynamically and/or adaptively configured or adjusted to maximize beamforming gain on the data stream, namely, data 2. The receive beamforming gain for each of the receiver portion 402 of the distributed transceiver Tx/Rx 1 and the receiver portion 422 of the distributed transceiver Tx/Rx 2 may be equivalent to the beamforming gain for the combined antennas.

Additional details on other exemplary distributed transceiver architectures may be found in U.S. application Ser.

No. 13/919,932, which was filed on Jun. 17, 2013, issued as U.S. Pat. No. 10,020,861, which is hereby incorporated herein in its entirety.

Figure 5:
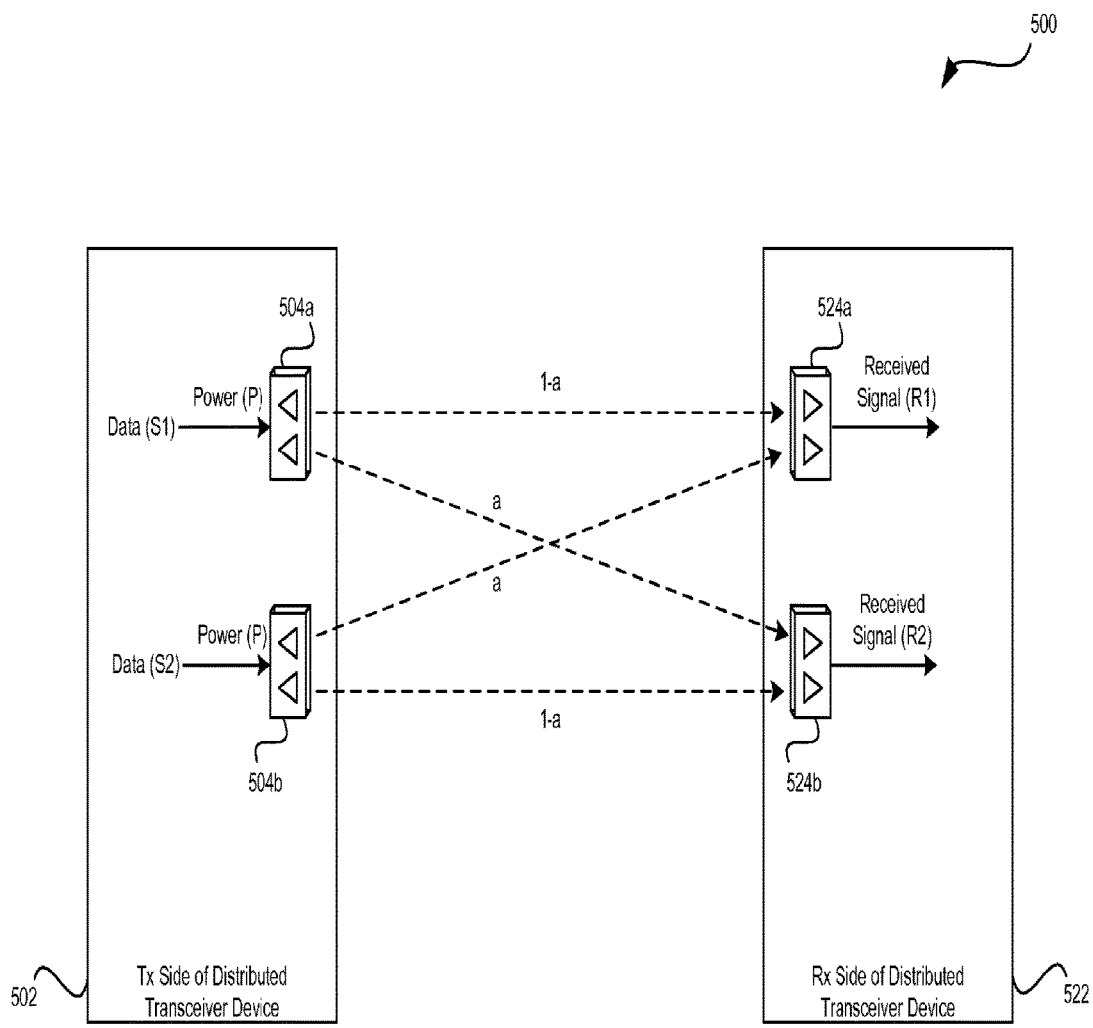
FIG. 5 is a block diagram of an exemplary propagation model for a leaky wave distributed transceiver environment, in accordance with an exemplary embodiment of the invention.

FIG. 5 is a block diagram of an exemplary propagation model for a leaky wave distributed transceiver environment, in accordance with an exemplary embodiment of the invention. Referring to FIG. 5, there is shown a propagation model 500 comprising a transmit side of a distributed transceiver device 502 and a receive side of a distributed transceiver device 522. The transmit side of the distributed transceiver device 502 comprises distributed transmitter portions 504a, 504b. The receive side of the distributed transceiver device 522 comprises distributed receiver portions 524a, 524b. The transceivers 504a, 504b, 524a, 524b may each deploy a programmable phased antenna array or directional single antenna (e.g., horn-shaped antenna). Although a 2×2 system of distributed transceivers is illustrated, the invention is not necessarily limited in this regard.

In the spatial multiplexing mode of operation, each distributed transceiver may be operable to transmit a different data stream. In this regard, the distributed transmitter portion 504a in the transmit side of the distributed transceiver device 502 may be operable to transmit data stream samples, namely S1 and the distributed transmitter portion 504b in the transmit side of the distributed transceiver device 502 may be operable to transmit data stream samples, namely S2. The distributed transmitter portion 504a may be operable to transmit the data stream samples, S1, at a power level P, where they are received by the distributed receiver portions 524a, 524b in the receive side of the distributed transceiver device 522. The distributed transmitter portion 504b may be operable to transmit the data stream samples, S2, at a power level P, where they are received by the distributed receiver portions 524a, 524b in the receive side of the distributed transceiver device 522. In some embodiments of the invention, the streams S1 and S2 may carry independent information bits (no inter-coding). In other embodiments of the invention, a coding scheme (e.g., space-time-block coding, Alamouti coding, channel coding such as LDPC, turbo coding) may be applied on original information bits before splitting into streams S1 and S2. The interdependency and/or redundancy between the streams S1 and S2 may be used for additional reliability and robustness and/or coding/diversity gain. Furthermore, the transmitted streams S1 and S2 may be generated based on single-carrier (SC) modulation or orthogonal-frequency-division-multiplexing (OFDM) before feeding into antennas.

In general, a central processor such as the central processor 106, a network management engine such as the NME 107 and/or a coordinating entity such as the coordinating entity 108 may be operable to determine and/or identify beamforming patterns through one or more reflectors and/or refractors or through line-of-sight, which may be utilized to mitigate or minimize any leakage and/or interference between the different data streams samples S1, S2 during transmission by the distributed transmitter portions 504a, 504b and/or reception by the distributed receiver portions 524a, 524b. In this regard, the central processor, the network management engine and/or the coordinating entity may be operable to determine line-of-sight paths, reflective paths and/or refractive paths, which may be utilized to mitigate or minimize the leakage and/or interference between the data stream samples S1, S2. In instances where there may be residual interference, one or more of the central processor, the network management engine and/or the coordinating entity may be operable to utilize various methods to optimize system performance and/or throughput in order to mitigate the residual interference.

As illustrated in FIG. 5, the factor "a" is a non-zero parameter that is utilized to model cross interference between the two data stream samples S1, S2. In an exemplary embodiment of the invention, the distributed transceivers may be operable to utilize training and/or pilot sequences to estimate the factor "a" as part of a channel estimation process. The estimated channel and the factor "a" may be available at both the transmit side of the distributed transceiver device 502 and at the receive side of the distributed transceiver device 522. The channel gain for a communication path between the distributed transmitter portion 504a and the distributed receiver portion 524a for the data stream samples S1 may be represented as 1-a. The channel gain for a communication path between the distributed transmitter portion 504a and the distributed receiver portion 524b for the data stream samples S1 may be represented as a. Similarly, the channel gain for a communication path between the distributed transmitter portion 504b and the distributed receiver portion 524a for the data stream samples S2 may be represented as a. The channel gain for a communication path between the distributed transmitter portion 504b and the distributed receiver portion 524b for the data stream samples S2 may be represented as 1-a. The signal received by the distributed receiver portion 524a may be represented as R1 and the signal received by the distributed receiver portion 524b may be represented as R2. Although the system formulation below is provided for a 2×2 distributed transceiver system, the results may be generalized to any number of transceivers.

The transfer function for the exemplary propagation model for the leaky wave distributed transceiver environment may be represented by the following exemplary expression:

$$\begin{bmatrix} R1 \\ R2 \end{bmatrix} = H \begin{bmatrix} S1 \\ S2 \end{bmatrix} + \begin{bmatrix} n1 \\ n2 \end{bmatrix}$$

where (S1, S2) represent the data stream samples that are transmitted from the transmit side of the distributed transceiver device 502, (R1, R2) represent the data stream samples that are received at receive side of the distributed transceiver device 522, and H is the 2×2 channel matrix with complex elements. The data stream samples S1, S2 may be selected from constellation points for the data streams to be transmitted and data stream samples R1, R2 may correspond to the transmitted constellation points that are received at the receive side of the distributed transceiver device 522. In some embodiments of the invention, the samples S1, S2 may be selected from an OFDM modulator output and be repeated for all subcarriers at the OFDM modulator output. In such cases, the corresponding receive samples R1, R2 may be taken from an OFDM demodulator output.

The channel matrix H may be represented by the following exemplary expression:

$$H = h \begin{bmatrix} (1-a)e^{j\theta 11} & (a)e^{j\theta 12} \\ (a)e^{j\theta 21} & (1-a)e^{j\theta 22} \end{bmatrix}$$

where the scalar h represents the channel gain, which may be a real number with no phase component (in general, a complex number), and (n1, n2) may represent the receiver noise sources, which are added at the receive side of the distributed transceiver device 522.

The MIMO channel capacity, C, of the above system may be represented by the following exemplary expression:

$$C = B \times \log\left(\det\left(I + \frac{h^2}{\sigma_n^2} AA^*\right)\right)$$

where B represents the spectrum that is utilized, $\sigma_n^2$ represents the noise variance at each receiver, and matrix A represents:

$$A = \begin{bmatrix} (1-a)e^{j\theta 11} & (a)e^{j\theta 12} \\ (a)e^{j\theta 21} & (1-a)e^{j\theta 22} \end{bmatrix}$$

The capacity C may be represented by the following exemplary expression:

$$C = B \times \log\left[\left(1 + \frac{h^2}{\sigma_n^2}(a^2 + (1-a)^2)\right)^2 - 2(1+\cos\theta)\left(\frac{h^2}{\sigma_n^2}a(1-a)\right)^2\right]$$

where $\theta = \theta_{12} - \theta_{11} + \theta_{21} - \theta_{22}$.

In accordance with various exemplary embodiments of the invention, the capacity C may be maximized by adjusting the phases such that the effective $\theta$ becomes an odd multiple of 180° in order to make the term (1+cos $\theta$)=0. under this condition, the total capacity may be represented by the following expression:

$$C = 2 \times B \times \log\left[\left(1 + \frac{h^2}{\sigma_n^2}(a^2 + (1-a)^2)\right)\right]$$

where the factor of 2 before the log function represents a multiplexing gain, which indicates that two streams may be effectively transported over this system. The invention is not limited to two (2) data streams and transceivers and various generalizations may be applicable to three (3) or more data streams and/or transceivers. In cases where h is a complex number, then the term h^2 may be replaced by magnitude (h)^2 or |h|^2.

In instances where the above condition on relative phases is satisfied, a pre-coding scheme at the transmitter side of the distributed transceiver and a post-processing scheme at the receiver side of the distributed transceiver may be utilized to achieve the above optimal capacity. The corresponding singular value decomposition (SVD) of channel matrix H may be represented by the following exemplary expression:

$$H = hU \begin{bmatrix} \sqrt{a^2 + (1-a)^2} & 0 \\ 0 & \sqrt{a^2 + (1-a)^2} \end{bmatrix} V^*$$

where matrices U and V are unitary matrices. Using the above structure, the transmitted symbols $$\begin{bmatrix} S1 \\ S2 \end{bmatrix}$$

are generated from two independent symbols $$\begin{bmatrix} S'1 \\ S'2 \end{bmatrix}$$

through the following pre-coding before being transmitted over the two transmit antennas:

$$\begin{bmatrix} S1 \\ S2 \end{bmatrix} = V \begin{bmatrix} S'1 \\ S'2 \end{bmatrix}$$

At the receiver side, the received symbols $$\begin{bmatrix} R1 \\ R2 \end{bmatrix}$$

may be processed to generate two new symbols $$\begin{bmatrix} R'1 \\ R'2 \end{bmatrix},$$

which may be represented by the following exemplary expression:

$$\begin{bmatrix} R'1 \\ R'2 \end{bmatrix} = U^* \begin{bmatrix} R1 \\ R2 \end{bmatrix}$$

The matrices U and V are available at both the transmitter and the receiver sides. Both matrices are calculated using the channel matrix H (using various matrix operation techniques such as singular-value-decomposition or eigenvalue decomposition). Different channel estimation methods may be used to estimate (or track and fine-tune) the channel response matrix H by means of pilot training. If the channel is estimated at the receiver side, the receiver would then feedback the estimated channel values (or the singular value decomposition values) back to the transmitter. The channel elements of H may be updated periodically based on the rate of variation in the environment. With the above pre-coding and post-processing, the system model reduces to the following exemplary expression (using the fact that matrices U and V are unitary matrices, i.e., products UU'=U'U=I, VV'=V'V=I reduce to identity matrix):

$$\begin{bmatrix} R'1 \\ R'2 \end{bmatrix} = h \begin{bmatrix} \sqrt{a^2 + (1-a)^2} & 0 \\ 0 & \sqrt{a^2 + (1-a)^2} \end{bmatrix} \begin{bmatrix} S'1 \\ S'2 \end{bmatrix} + \begin{bmatrix} n'1 \\ n'2 \end{bmatrix}$$

Consequently, the symbol S'1 may be decoded from R'1 (with no interference from S'2) and the symbol S'2 may be decoded from R'2 (with no interference from S'1). This enables the system to transport two streams of data with no cross-interference with no loss in SNR (since noise terms n'1/n'2 have the same variance as the original noise terms n1/n2.

Although the above singular-value decomposition method may be utilized to extract and achieve the maximum capacity of the channel, other MIMO techniques may be applied to the above 2×2 system without departing from the spirit and scope of the various embodiments of the invention. For example, a central processor such as the central processor 106, a network management engine such as the NME 107 and/or a coordinating entity such as the coordinating entity 108 may be operable to determine that the above 2×2 system may be utilized to improve diversity and consequently link reliability instead of channel capacity. In this regard, techniques such as space-timing block codes (STBC), Alamouti codes and/or beamforming at the maximum eigenvector direction may be utilized. In such cases, dependency and/or redundancy between symbols $$\begin{bmatrix} S'1 \\ S'2 \end{bmatrix}$$

may be applied to translate this capacity improvement into a diversity improvement.

In some embodiments of the invention, mechanical movement and/or dithering of one of the antenna elements and/or the transceiver modules that are communicatively coupled to the antenna elements may be used to enforce the condition $\theta_{12}-\theta_{11}+\theta_{21}-\theta_{22}=(2n+1)\times180°$ or make it as close as possible to 180°. Each phase element $\theta_{ij}$ may be proportional to the distance between the corresponding transmitter side of the distributed transceiver and receiver side of the distributed transceiver. The corresponding wavelength difference in distance between the transmitter side of the distributed transceiver and the receiver side of the distributed transceiver translates to a phase rotation of 360°. Ideally, a phase sum exactly equal to $(2n+1)\times180°$ may be preferred for maximum capacity. Notwithstanding, a phase condition sufficiently close to $(2n+1)\times180°$ may realize most of the capacity improvement. For example, in some embodiments of the invention, a phase sum between $(2n+1)\times180°-45°$ and $(2n+1)\times180°+45°$ may be considered sufficient. In other words, as long as the phase condition is sufficiently good (within ±45° of the best condition), the system optimization through displacement of transceivers may be considered complete.

Figure 6A:
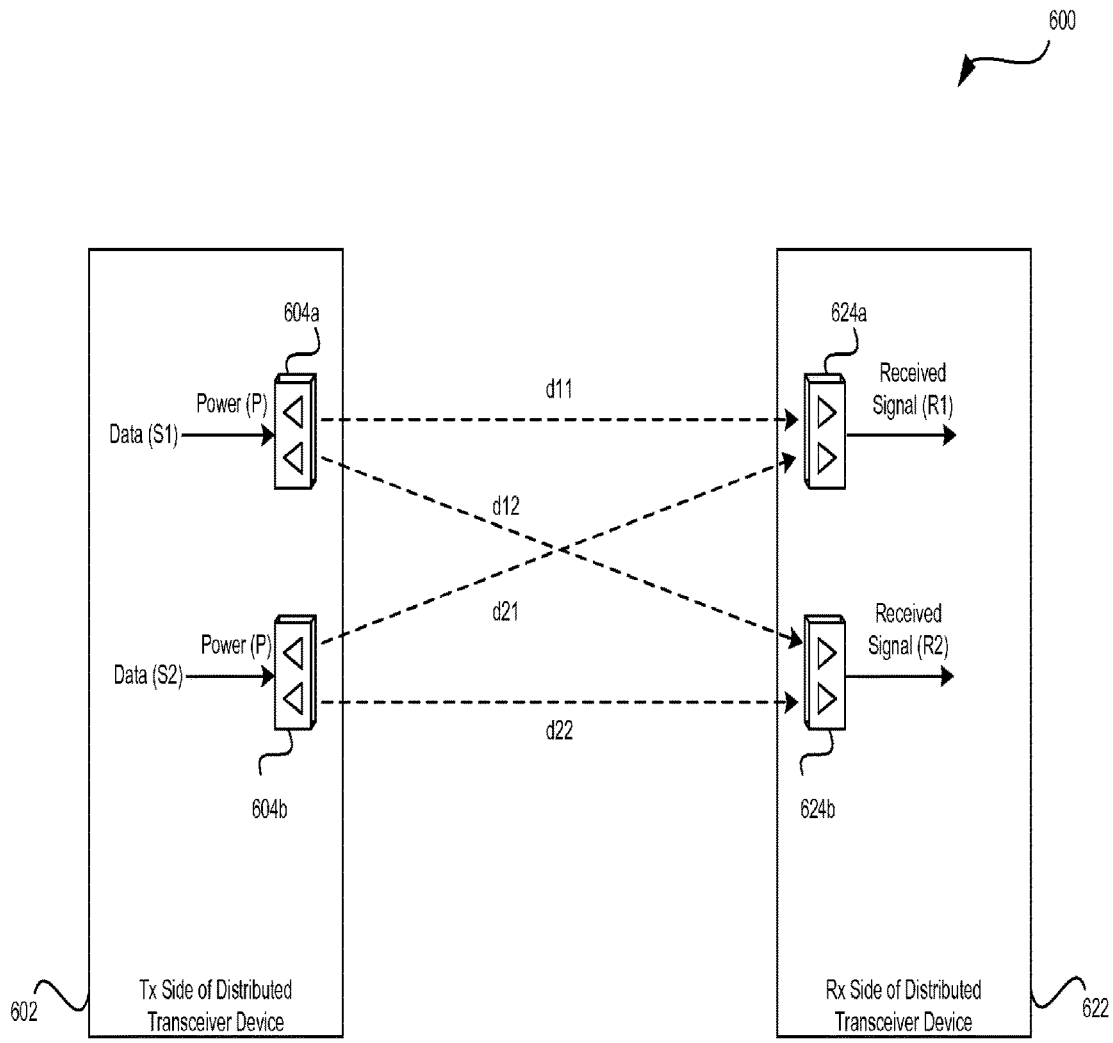
FIG. 6A is a block diagram of an exemplary propagation model for a leaky wave distributed transceiver environment with poor phase condition prior to displacement of transceivers and/or antenna elements, in accordance with an exemplary embodiment of the invention.

FIG. 6A is a block diagram of an exemplary propagation model for a leaky wave distributed transceiver environment with poor phase condition prior to displacement of transceivers and/or antenna elements, in accordance with an exemplary embodiment of the invention. Referring to FIG. 6A, there is shown a propagation model 600 comprising a transmit side of a distributed transceiver device 602 and a receive side of a distributed transceiver device 622. The transmit side of the distributed transceiver device 602 comprises distributed transmitter portions 604a, 604b. The receive side of the distributed transceiver device 622 comprises distributed receiver portions 624a, 624b. Although a 2×2 system of distributed transceivers is illustrated, the invention is not limited in this regard.

In the spatial multiplexing mode of operation, each distributed transceiver may be operable to transmit a different data stream. In this regard, the distributed transmitter portion 604a in the transmit side of the distributed transceiver device 602 may be operable to transmit data stream samples, namely S1, at a power level P over a distance d11, where they are received by the distributed receiver portion 624a in the receive side of the distributed transceiver device 622. The distributed transmitter portion 604a in the transmit side of the distributed transceiver device 602 may also be operable to transmit data stream samples, namely S1, at a power level P over a distance d12, where they are received by the distributed receiver portion 624b in the receive side of the distributed transceiver device 622.

The distributed transmitter portion 604b in the transmit side of the distributed transceiver device 602 may be operable to transmit data stream samples, namely S2, at a power level P over a distance d21, where they are received by the distributed receiver portion 624a in the receive side of the distributed transceiver device 622. The distributed transmitter portion 604b in the transmit side of the distributed transceiver device 602 may also be operable to transmit data stream samples, namely S2, at a power level P over a distance d22, where they are received by the distributed receiver portion 624b in the receive side of the distributed transceiver device 622.

For illustration purposes, it is assumed that the placement of the distributed transmitter portions 604a, 604b in the transmit side of the distributed transceiver device 602 and the distributed receiver portions 624a, 624b in the receive side of the distributed transceiver device 622 results in poor phase condition. Accordingly, one or more of the distributed transmitter portions 604a, 604b and/or the distributed receiver portions 624a, 624b may be dithered or displaced to improve the phase condition.

Figure 6B:
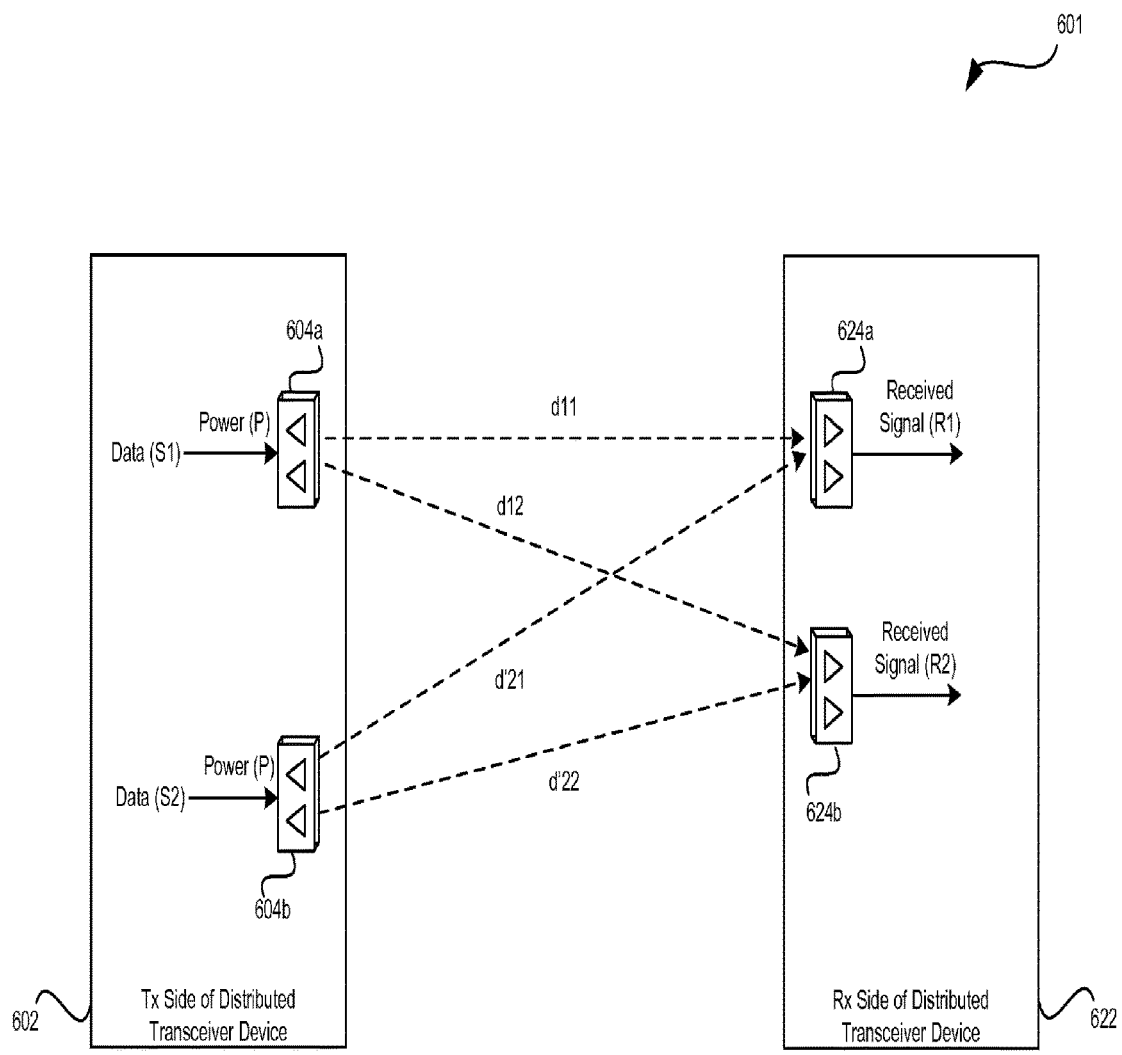
FIG. 6B is a block diagram of an exemplary propagation model for a leaky wave distributed transceiver environment with improved phase condition subsequent to displacement of transceivers and/or antenna elements, in accordance with an exemplary embodiment of the invention.

FIG. 6B is a block diagram of an exemplary propagation model for a leaky wave distributed transceiver environment with improved phase condition subsequent to displacement of transceivers and/or antenna elements, in accordance with an exemplary embodiment of the invention. Referring to FIG. 6B, there is shown a propagation model 601 comprising a transmit side of a distributed transceiver device 602 and a receive side of a distributed transceiver device 622. The transmit side of the distributed transceiver device 602 comprises distributed transmitter portions 604a, 604b. The receive side of the distributed transceiver device 622 comprises distributed receiver portions 624a, 624b. Although a 2×2 system of distributed transceivers is illustrated, the invention is not necessarily limited in this regard.

In the spatial multiplexing mode of operation, each distributed transceiver may be operable to transmit a different data stream. In this regard, the distributed transmitter portion 604a in the transmit side of the distributed transceiver device 602 may be operable to transmit data stream samples, namely S1, at a power level P over a distance d11, where they are received by the distributed receiver portion 624a in the receive side of the distributed transceiver device 622. The distributed transmitter portion 604a in the transmit side of the distributed transceiver device 602 may also be operable to transmit data stream samples, namely S1, at a power level P over a distance d12, where they are received by the distributed receiver portion 624b in the receive side of the distributed transceiver device 622.

In order to correct the poor phase condition that is experienced in FIG. 6A, one or more of a central processor (such as for example the central processor 106), a network management engine (such as for example the NME 107) and/or a coordinating entity (such as for example the coordinating entity 108) may be operable to determine that the distributed transmitter portion 604b in the transmit side of the distributed transceiver device 602 should be dithered or displaced to provide an improved phase condition. Accordingly, as shown in FIG. 6B, the distributed transmitter portion 604*b* in the transmit side of the distributed transceiver device 602 is moved so that the distances d'21 and d'22 are achieved. In this regard, the distributed transmitter portion 604*b* in the transmit side of the distributed transceiver device 602 may be operable to transmit data stream samples, namely S2, at a power level P over a distance d'21, where they are received by the distributed receiver portion 624*a* in the receive side of the distributed transceiver device 622. The distributed transmitter portion 604*b* in the transmit side of the distributed transceiver device 602 may also be operable to transmit data stream samples, namely S2, at a power level P over a distance d'22, where they are received by the distributed receiver portion 624*b* in the receive side of the distributed transceiver device 622.

It should be noted that the dimensions in FIG. 6A and FIG. 6B are exaggerated for ease of demonstration.

In FIG. 6A, the following may be assumed:

$$d11=k11.\lambda, d12=k12.\lambda, d21=k21.\lambda, d22=k22.\lambda,$$

where $\lambda$ represents the wavelength of the carrier wave and the scaling factors may be any real number, not necessarily an integer. The corresponding phases may be represented by the following exemplary expression:

$$\theta 11=k11.360°, \theta 12=k12.360°, \theta 21=k21.360°,\\ \theta 22=k22.360°.$$

The phase condition may be represented by the following expression:

$$\theta_{12}-\theta_{11}+\theta_{21}-\theta_{22}=(K12-K11+K21-K22)360°,$$

where it is not an odd integer multiple of 180°. One or more of the distributed transceivers or distributed transmitter portions may be physically moved or displaced in order to meet the phase condition. For example, assume that the distributed transmitter portion 604*b* transporting the data stream S2 is dithered or displaced to result in new distances d'21, d'22 to distributed received portion 624*a*, 624*b*, respectively, as illustrated in FIG. 6B. In this case, the distances represented by d11, d12 are maintained and remains the same while the distances d21, d22 are changed and now becomes d'21, d'22, respectively. In this regard, the phase condition changes and may now be represented by the following exemplary expression:

$$\theta_{12}-\theta_{21}+\theta_{21}-\theta_{22}=(K12-K11+K'21-K'22)360°.$$

Although (K12−K11+K21−K22)360° was not an odd integer multiple of 180°, by new values for K'21, K'22, the new phase sum (K12−K11+K'21−K'22)360° attempts to become an odd integer multiple of 180°. The dithering or displacement of transceivers may be done in one or more spatial directions, namely X, Y and/or Z directions. In general, any of the 4 entities 604*a*, 604*b*, 624*a*, 624*b* (or a combination of them) may be displaced to satisfy the optimal phase condition.

In some embodiments of the invention, the phase condition may not be strictly targeted and/or optimized to be exactly equal to (2n+1)×180°. Accordingly, it may be shown that within a range around this value, the distributed capacity may be substantially higher than the corresponding non-distributed case. Therefore, a value Δ may be utilized by the central processor 106, the network management engine 107 and/or the coordinating entity 108 to define a range for the phase sum in phase condition equation. In this regard, the central processor 106, the network management engine 107 and/or the coordinating entity 108 attempts to only bring the phase sum $\theta_{12}-\theta_{11}+\theta_{21}-\theta_{22}$ within the range of {(2n+1)× 180°−Δ, (2n+1)×180°+Δ}. This may simplify the phase sum optimization process while concurrently providing a reasonable gain. In an exemplary embodiment of the invention, a typical value for Δ may be 90°. However, the invention is not limited in this regard. Accordingly, for instances with higher signal to noise ratio, smaller values for Δ may be utilized to maximize the corresponding link capacity. Therefore, in some embodiments of the invention, the central processor 106, the network management engine 107 and/or the coordinating entity 108 may utilize a signal to noise ratio, which may be dependent on Δ to define the optimal range for the phase sum. For example, a look-up table (LUT), which may comprise smaller/tighter values for Δ, which may map to higher signal to noise ratio values.

In accordance with various embodiments of the invention, the dithering or displacement of distributed transceivers and/corresponding antennas in order to satisfy a particular phase condition may be done statically or dynamically. For lower carrier frequencies, for example, 2.0 GHz, where the phase condition may not change with small position variations, a static configuration and/or placement may be sufficient. In this case, dithering or displacement of the distributed transceivers and/or antennas may not degrade the phase condition substantially. However, in the cases with higher carrier frequencies, for example, 60 GHz, dithering or displacement of the distributed transceivers and/or antennas on the order of a millimeter due to, for example, temperature and/or wind which may degrade the phase condition significantly. In such high carrier frequency cases, the central processor 106, the network management engine 107 and/or the coordinating entity 108 may be operable to utilize adaptive and/or dynamic adjustment of antenna placements to provide a particular phase condition.

In accordance with some embodiments of the invention, training and/or pilot sequences such as symbols and/or packets may be communicated between the distributed transmitter portions 604*a*, 604*b* and the receiver portions 624*a*, 624*b*, sequentially or in parallel, in order to estimate the channel phases $\theta_{12}, \theta_{11}, \theta_{21}, \theta_{22}$ and evaluate and/or optimize the phase condition. The training may be done during the initial stages of communication and/or dynamically during communication. In some embodiments of the invention, for measuring the phase values, the receivers 624*a*, 624*b* may be used to measure a phase difference rather than absolute phases. For example, this is a possible training sequence (with no loss of generality): transmitter 604*a* transmits a training sequence (while transmitter 604*b* is inactive). Two receivers 624*a* and 624*b* receive two corresponding sequences. Instead of measuring absolute frequencies, the two received signals are used to measure the phase difference theta 11–theta 12 directly. The above process may be repeated with transmitter 604*b* sending data and 604*a* being inactive. Then phase difference theta 21–theta 22 is measured. The sum or subtraction of the above two phase differences leads to the overall target phase condition.

In the above referenced model, if the phase condition is severely violated, the capacity may be degraded significantly due to the cross-interference that may be caused by the cross links with gains of a. In some embodiments of the invention, different antenna polarizations may be utilized by the pairs of (1) distributed transmitter portions 604*a* and distributed receiver portions 624*a*, and (2) distributed transmitter portions 604*b* and distributed receiver portions 624*b*. The polarization switching may occur dynamically and/or adaptively. In instances where the phase condition may be satisfied, then the same polarization may be used by both distributed transmitter portions 604*a*, 604*b* in order to take advantage of cross leaking power between the corresponding transmission paths. In instances where the phase condition is very poor or less than desirable, for example, where $\theta_{12}-\theta_{11}+\theta_{21}-\theta_{22}$ may be close to 0, then the distributed transmitter portions 604a, 604b may switch to orthogonal polarizations to mitigate the effects of the cross leaking power.

In accordance with various embodiments of the invention, the phase condition, namely the combination of $\theta_{12},\theta_{11},\theta_{21}, \theta_{22}$, which may be defined as $\theta_{12}-\theta_{11}+\theta_{21}-\theta_{22}$, may be shifted or improved by moving the effective location of the antenna elements in order to meet the sum-phase condition. While FIG. 6B illustrates the mechanical movement of an antenna array to implement phase adjustments, FIGS. 7A-7D provide electronic adjustment of the phase center, namely, the phase combination condition $\theta_{12}-\theta_{11}+\theta_{21}-\theta_{22}$. The adjustment of the antenna and/or antenna arrays may comprise electronic adjustment of the phase center of the antenna array and/or mechanical movement of an antenna array. The electronic adjustment of the phase center of the antenna array and/or mechanical movement of an antenna array may occur dynamically and/or adaptively in response to changing conditions. In some embodiments of the invention, an antenna array may comprise a larger number of antenna array elements and the effective phase center of the antenna may be moved by selecting different sets of active antenna array elements for transmission or reception.

In accordance with various embodiments of the invention, different sets of antenna array elements may be selected and/or activated in order to electronically or virtually move the phase center or equivalent location of the antenna array. Effectively, the different sets of antenna array elements may comprise a different phase condition $(\theta_{12}-\theta_{21}+\theta_{21}-\theta_{22})$. The configuration with the closest phase condition to $(2n+1)\times 180°$ may be selected and utilized for the communication link.

Figure 7A:
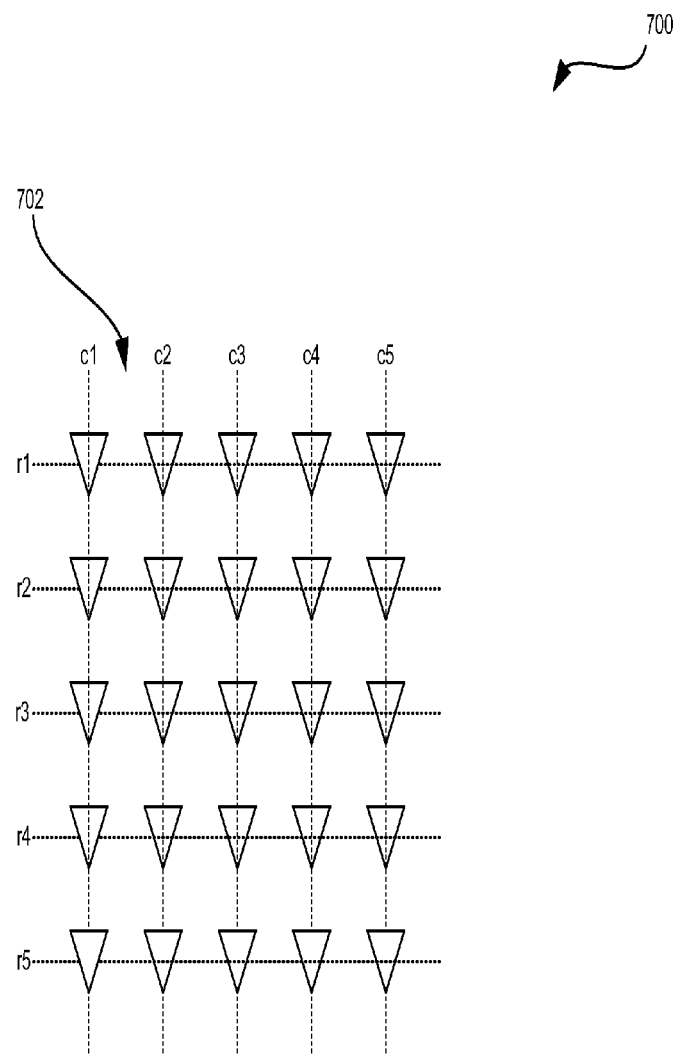
FIG. 7A is a diagram that illustrates a two-dimensional (2D) 5×5 antenna element array deployed at a transceiver in a 2×2 distributed transceiver system, in accordance with an exemplary embodiment of the invention.

FIG. 7A is a diagram that illustrates a two-dimensional (2D) 5×5 antenna element array deployed at a transceiver in a 2×2 distributed transceiver system, in accordance with an exemplary embodiment of the invention. Referring to FIG. 7A, there is shown a 2D antenna array 700 comprising a set of antenna elements 702. The set of antenna array elements 702 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The element 700 may substitute the antenna arrays used at any of the transceivers 604a, 604b, 624a, 624b in FIG. 6B.

In accordance with various embodiments of the invention, each of the antenna array elements in set of antenna elements 702 in the 2D antenna array 700 may be electronically selected or activated or may be electronically deselected or deactivated. In this regard, one or more of the antenna array elements in set of antenna elements 702 may be activated or deactivated in order to electronically move the phase center or equivalent location of the array in the 2D space.

Figure 7B:
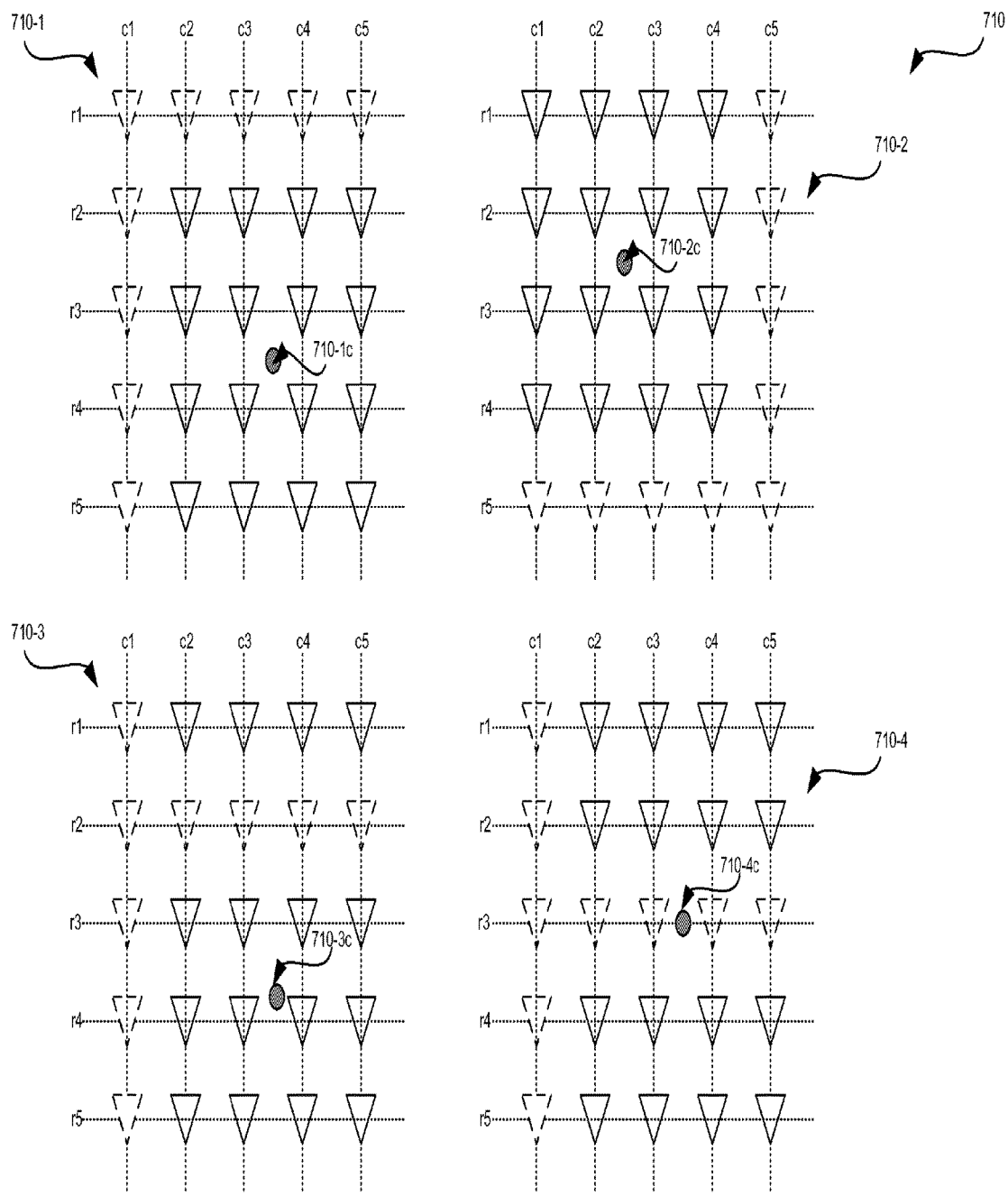
FIG. 7B is a diagram that illustrates electronic movement of the phase center a two-dimensional 5×5 antenna element array deployed at a transceiver in a 2×2 distributed transceiver system, in accordance with an exemplary embodiment of the invention.

FIG. 7B is a diagram that illustrates electronic movement of the phase center a two-dimensional 5×5 antenna element array deployed at a transceiver in a 2×2 distributed transceiver system, in accordance with an exemplary embodiment of the invention. Referring to FIG. 7B, there is shown a 2D antenna array 710 comprising a set of antenna elements 710-1.

The set of antenna array elements 710-1 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in row r1 and the antenna array elements in column c1 are deselected and/or deactivated and the remaining antenna array elements in the set of antenna elements 710-1 are selected and/or activated. In this regard, the antenna array elements (r1,c1), (r1,c2), (r1,c3), (r1,c4), (r1,c5), (r2,c1), (r3,c1), (r4,c1) and (r5,c1) are deselected and/or deactivated. The antenna array elements (r2,c2), (r2,c3), (r2,c4), (r2,c5), (r3,c2), (r3,c3), (r3,c4), (r3,c5), (r4,c2), (r4,c3), (r4,c4), (r4,c5), (r5,c2), (r5,c3), (r5,c4), and (r5,c5) are selected and/or activated. The corresponding phase center is referenced as 710-1c.

The set of antenna array elements 710-2 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in row r5 and the antenna array elements in column c5 are deselected and/or deactivated and the remaining antenna array elements in the set of antenna elements 710-2 are selected and/or activated. In this regard, the antenna array elements (r1,c5), (r2,c5), (r3,c5), (r4,c5), (r5,c5), (r5,c1), (r5,c2), (r5,c3) and (r5,c4) are deselected and/or deactivated. The antenna array elements (r1,c1), (r1,c2), (r1, c3), (r1,c4), (r2,c1), (r2,c2), (r2,c3), (r2,c4), (r3,c1), (r3,c2), (r3,c3), (r3,c4), (r4,c1), (r4,c2), (r4,c3) and (r4,c4) are selected and/or activated. The corresponding phase center is referenced as 710-2c.

The set of antenna array elements 710-3 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in row r2 and the antenna array elements in column c1 are deselected and/or deactivated and the remaining antenna array elements in the set of antenna elements 710-3 are selected and/or activated. In this regard, the antenna array elements (r1,c1), (r2,c1), (r3,c1), (r4,c1), (r5,c1) (r2,c2), (r2,c3), (r2,c4), and (r2,c5), are deselected and/or deactivated. The antenna array elements (r1,c2), (r1,c3), (r1,c4), (r1,c5), (r3,c2), (r3,c3), (r3,c4), (r3,c5), (r4,c2), (r4,c3), (r4,c4), (r4,c5), (r5,c2), (r5,c3), (r5,c4), and (r5,c5) are selected and/or activated. The corresponding phase center is referenced as 710-3c.

The set of antenna array elements 710-4 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in row r3 and the antenna array elements in column c1 are deselected and/or deactivated and the remaining antenna array elements in the set of antenna elements 710-4 are selected and/or activated. In this regard, the antenna array elements (r1,c1), (r2,c1), (r3,c1), (r4,c1), (r5,c1), (r3,c2), (r3,c3), (r3,c4), and (r3,c5), are deselected and/or deactivated. The antenna array elements (r1,c2), (r1,c3), (r1,c4), (r1,c5), (r2,c2), (r2,c3), (r2,c4), (r2,c5), (r4,c2), (r4,c3), (r4,c4), (r4,c5), (r5,c2), (r5,c3), (r5,c4), and (r5,c5) are selected and/or activated. The corresponding phase center is referenced as 710-4c.

Other selections and/or de-selections of the antenna array elements in the sets of antenna array elements 710-1, 710-2, 710-3 and 710-4 may be done in order to electronically or virtually move the phase center for the 2D antenna array 710 without departing from the spirit and scope of the various embodiments of the invention.

In some embodiments of the invention, two or more sets of antenna elements may be placed in different planes at different depth levels. In the general case, the antenna array may comprise a three-dimensional (3D) configuration where the antenna elements are placed on a 3D grid. In this regard, depending on the selection of antenna array elements from the two planes, the phase center may be moved and adjusted in the depth direction. Each set of antenna array configuration may result in a different value for $(\theta_{12}-\theta_{11}+\theta_{21}-\theta_{22})$. The configuration with the closest phase condition to $(2n+1)\times180°$ may be selected and utilized for the communication link.

Figure 7C:
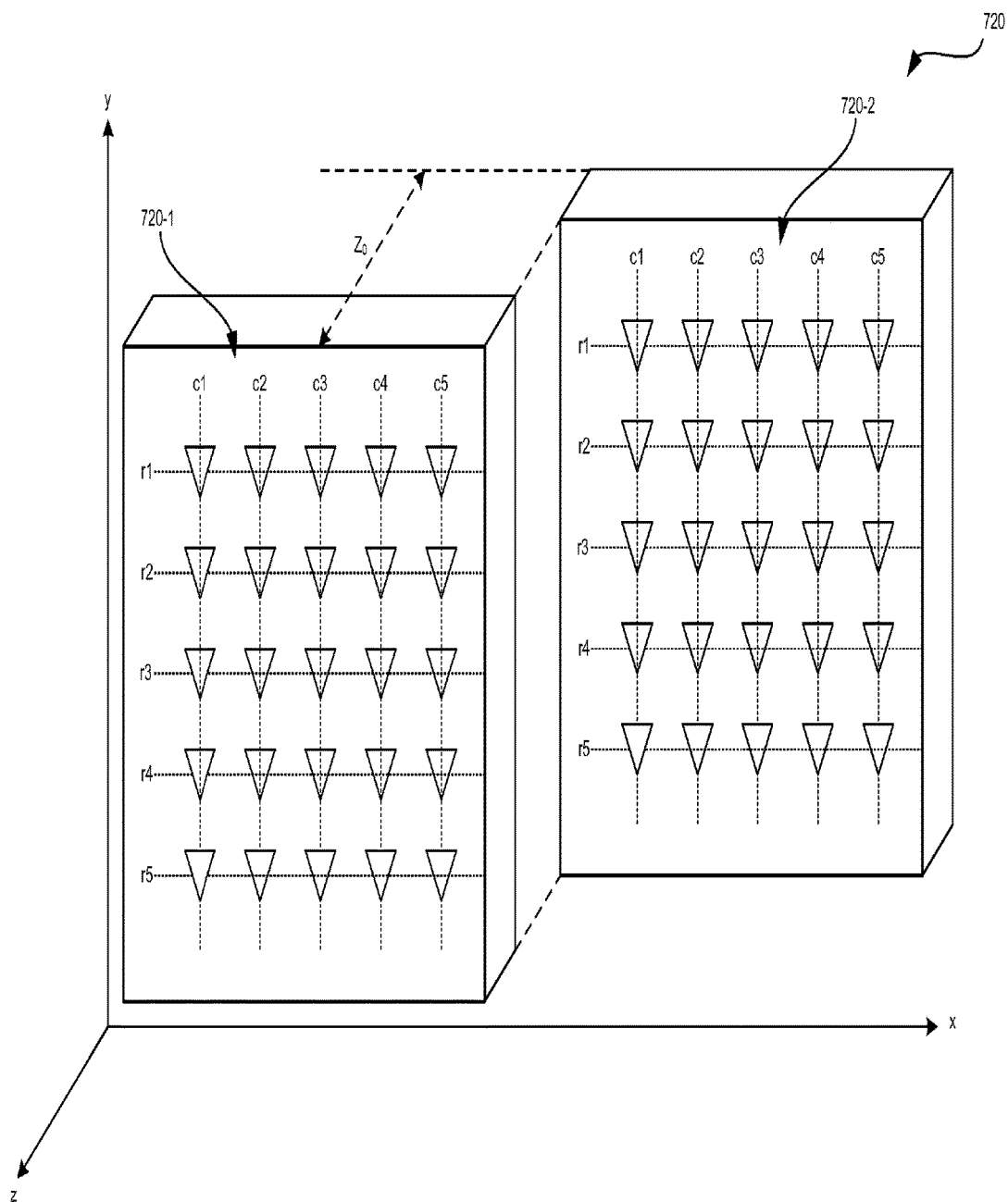
FIG. 7C is a diagram that illustrates a three-dimensional (3D) 5×5 antenna element array deployed at a transceiver in a 2×2 distributed transceiver system, in accordance with an exemplary embodiment of the invention.

FIG. 7C is a diagram that illustrates a three-dimensional (3D) 5×5 antenna element array deployed at a transceiver in a 2×2 distributed transceiver system, in accordance with an exemplary embodiment of the invention. Referring to FIG. 7C, there is shown a 3D antenna array 720 comprising a plurality of sets of antenna elements 720-1, 720-2. Each of the sets of antenna array elements 720-1, 720-2 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The set of antenna array 720-2 is placed at a plane in the z coordinate. In this regard, the set of antenna array 720-2 is placed at different depth level in the z plane or coordinate.

In accordance with various embodiments of the invention, each of the antenna array elements in sets of antenna elements 720-1, 720-2 in the 3D antenna array 720 may be electronically selected or activated or may be electronically deselected or deactivated. In this regard, one or more of the antenna array elements in sets of antenna elements 720-1, 720-2 may be activated or deactivated in order to electronically move the phase center or equivalent location of the array in the 3D space or x,y,z coordinates.

Figure 7D:
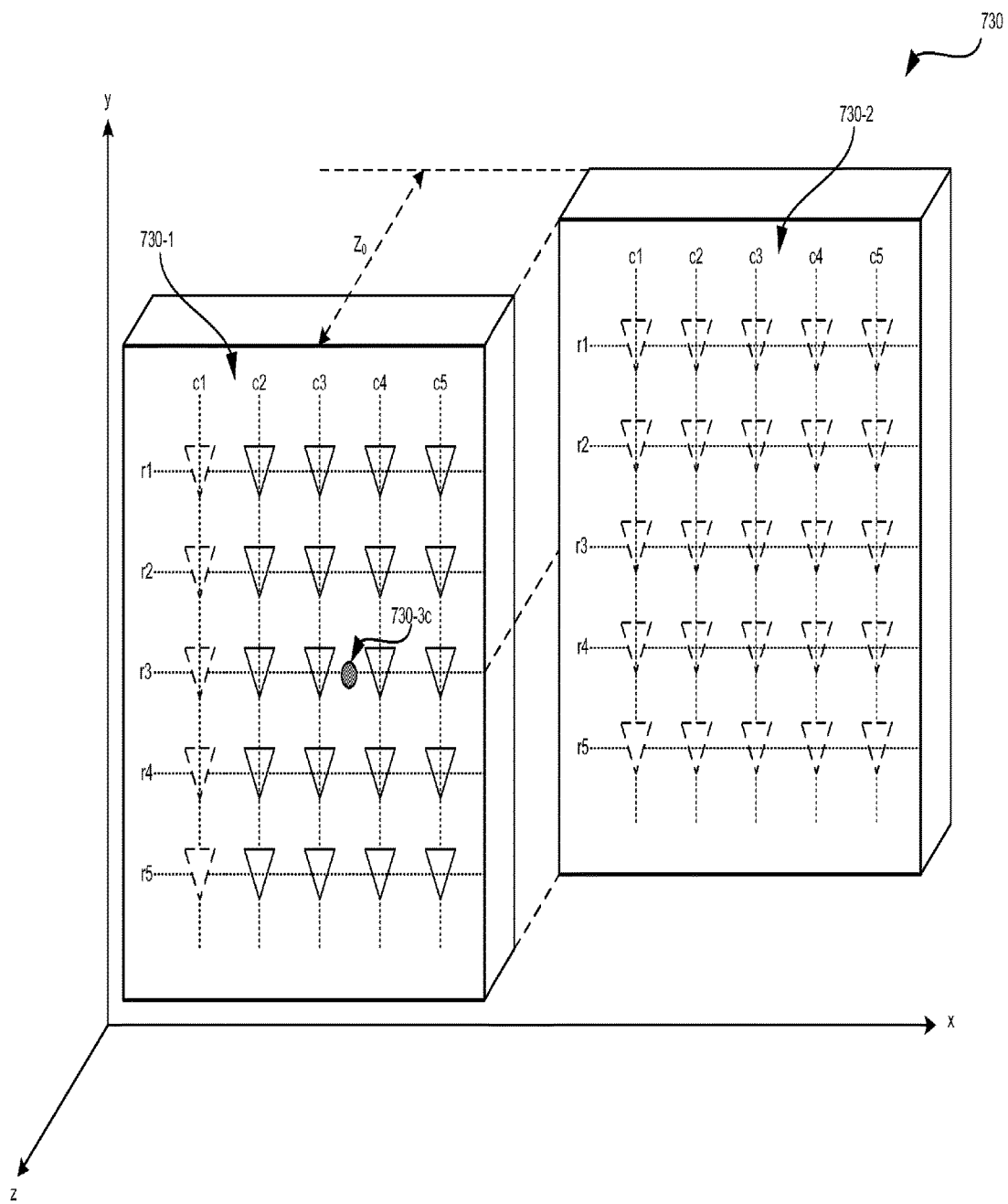
FIG. 7D is a diagram that illustrates electronic movement of the phase center of a three-dimensional 5×5 antenna element array deployed at a transceiver in a 2×2 distributed transceiver system, in accordance with an exemplary embodiment of the invention.

FIG. 7D is a diagram that illustrates electronic movement of the phase center of a three-dimensional 5×5 antenna element array deployed at a transceiver in a 2×2 distributed transceiver system, in accordance with an exemplary embodiment of the invention. Referring to FIG. 7D, there is shown a 3D antenna array 730 comprising a plurality of sets of antenna elements 730-1, 730-2.

The set of antenna array elements 730-1 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in column c1 are deselected and/or deactivated and the remaining antenna array elements in the set of antenna elements 730-1 are selected and/or activated. In this regard, the antenna array elements (r1,c1), (r2,c1), (r3,c1), (r4,c1) and (r5,c1) are deselected and/or deactivated. The antenna array elements (r1,c2), (r1,c3), (r1,c4), (r1,c5), (r2,c2), (r2,c3), (r2,c4), (r2,c5), (r3,c2), (r3,c3), (r3,c4), (r3,c5), (r4,c2), (r4,c3), (r4,c4), (r4,c5), (r5,c2), (r5,c3), (r5,c4), and (r5,c5) are selected and/or activated.

The set of antenna array elements 730-2 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in set of antenna array elements 730-2 are deselected and/or deactivated.

The corresponding phase center for the 3D antenna array 730 is referenced as 730-3c. Other selections and/or de-selections of the antenna array elements in the plurality of sets of antenna array elements 730-1, 730-2 may be done in order to electronically or virtually move the phase center for the 3D antenna array 730 without departing from the spirit and scope of the various embodiments of the invention.

Figure 7E:
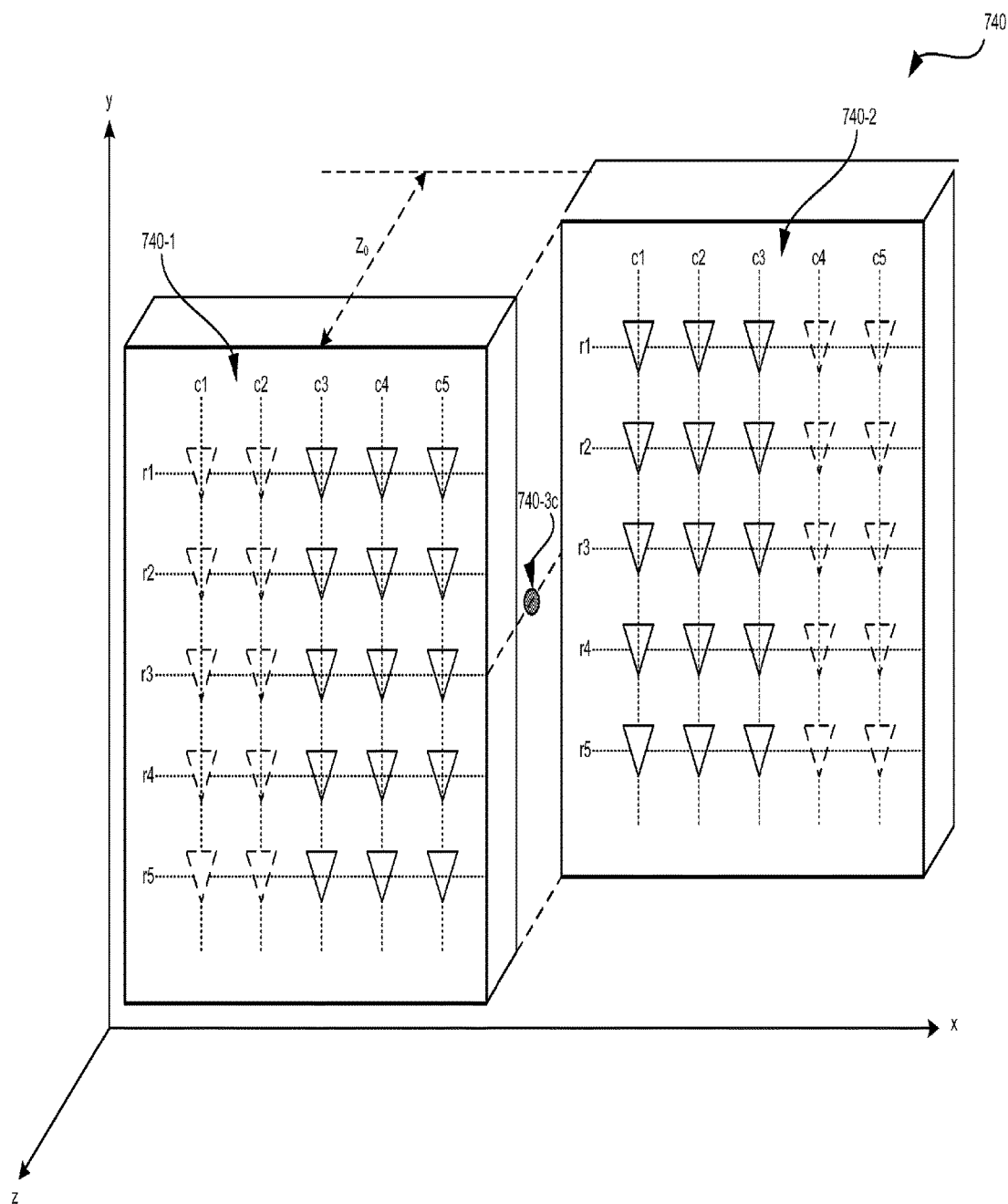
FIG. 7E is a diagram that illustrates electronic movement of the phase center of a three-dimensional 5×5 antenna element array deployed at a transceiver in a 2×2 distributed transceiver system, in accordance with an exemplary embodiment of the invention.

FIG. 7E is a diagram that illustrates electronic movement of the phase center of a three-dimensional 5×5 antenna element array deployed at a transceiver in a 2×2 distributed transceiver system, in accordance with an exemplary embodiment of the invention. Referring to FIG. 7E, there is shown a 3D antenna array 740 comprising a plurality of sets of antenna elements 740-1, 740-2.

The set of antenna array elements 740-1 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in column c1 and column c2 are deselected and/or deactivated and the remaining antenna array elements in the set of antenna elements 740-1 are selected and/or activated. In this regard, the antenna array elements (r1,c1), (r2,c1), (r3,c1), (r4,c1), (r5,c1), (r1,c2), (r2,c2), (r3,c2), (r4,c2), and (r5,c2) are deselected and/or deactivated. The antenna array elements (r1,c3), (r1,c4), (r1,c5), (r2,c3), (r2,c4), (r2,c5), (r3,c3), (r3,c4), (r3,c5), (r4,c3), (r4,c4), (r4,c5), (r5,c3), (r5,c4), and (r5,c5) are selected and/or activated.

The set of antenna array elements 740-2 comprises five (5) rows of antenna array elements and five (5) columns of antenna array elements. The columns of antenna array elements are referenced as c1, c2, c3, c4 and c5. The rows of antenna array elements are referenced as r1, r2, r3, r4 and r5. The antenna array elements in column c4 and column c5 are deselected and/or deactivated and the remaining antenna array elements in the set of antenna elements 740-2 are selected and/or activated. In this regard, the antenna array elements (r1,c4), (r2,c4), (r3,c4), (r4,c4), (r5,c4), (r1,c5), (r2,c5), (r3,c5), (r4,c5), and (r5,c5) are deselected and/or deactivated. The antenna array elements (r1,c1), (r1,c2), (r1,c3), (r2,c1), (r2,c2), (r2,c3), (r3,c1), (r3,c2), (r3,c3), (r4,c1), (r4,c2), (r4,c3), (r5,c1), (r5,c2), and (r5,c3) are selected and/or activated.

The corresponding phase center for the 3D antenna array 740 is referenced as 740-3c. Other selections and/or de-selections of the antenna array elements in the plurality of sets of antenna array elements 740-1, 740-2 may be done in order to electronically or virtually move the phase center for the 3D antenna array 740 without departing from the spirit and scope of the various embodiments of the invention.

Figure 8A:
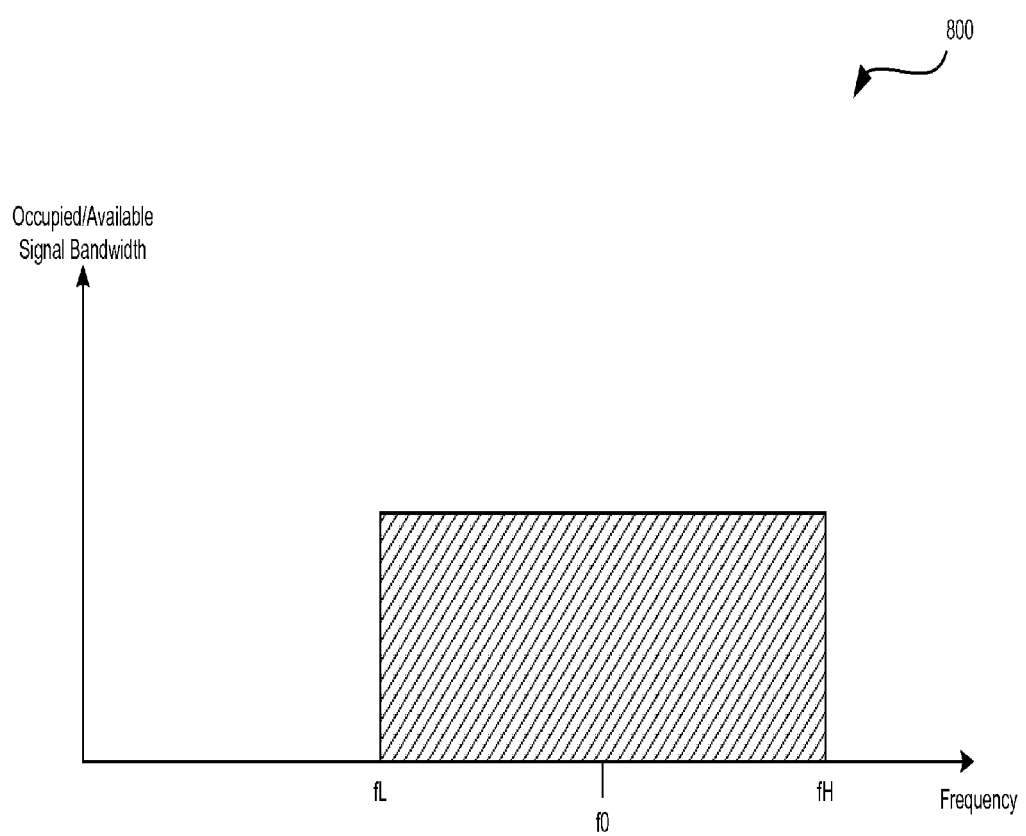
FIG. 8A is a diagram that illustrates a plot of the occupied/available signal bandwidth versus the frequency, in accordance with an exemplary embodiment of the invention.
Figure 8B:
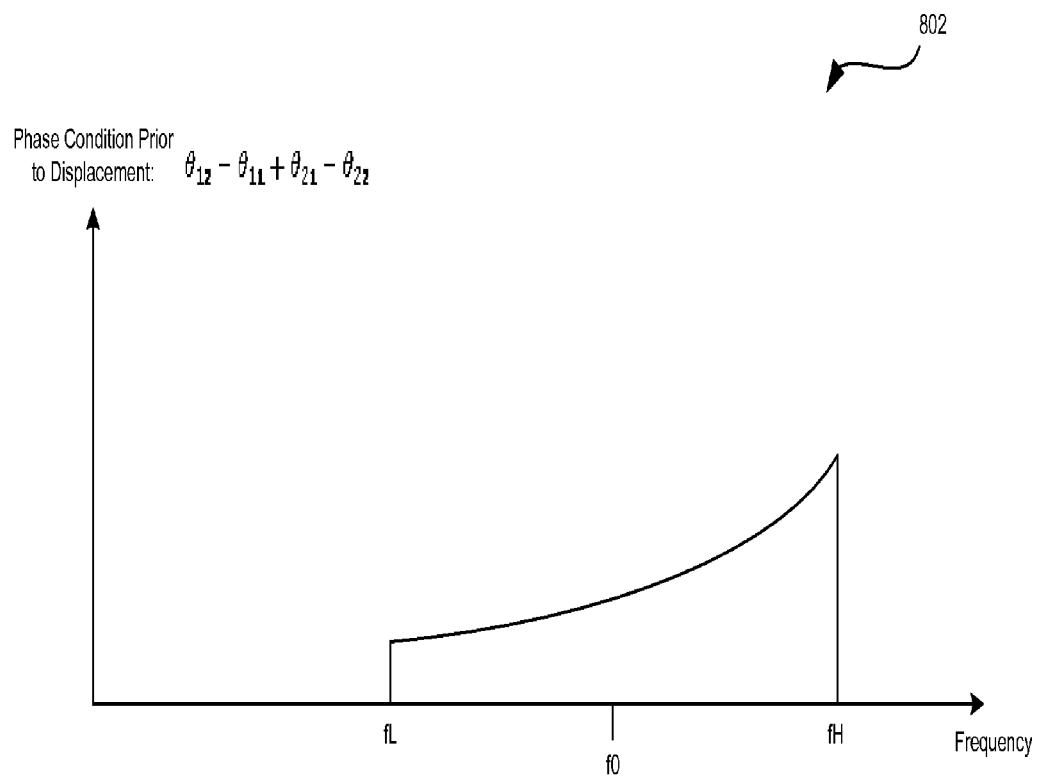
FIG. 8B is a diagram that illustrates a plot of the phase condition versus the frequency prior to displacement of the transceiver, in accordance with an exemplary embodiment of the invention.
Figure 8C:
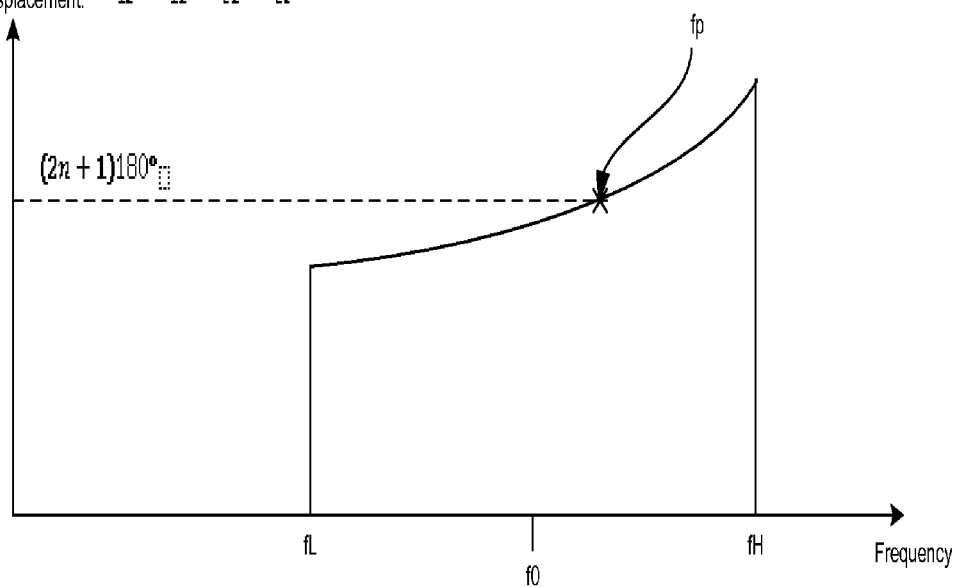
FIG. 8C is a diagram that illustrates a plot of the phase condition versus the frequency after displacement of the transceiver, in accordance with an exemplary embodiment of the invention.

The phase condition $\theta_{12}-\theta_{11}+\theta_{21}-\theta_{22}$ may be a function of carrier frequency due to its dependency on the wavelength. Therefore, for a wideband waveform, the optimum value of $(2n+1)\times180°$ may not be guaranteed for all frequencies across the occupied/utilized bandwidth. FIGS. 8A-8C illustrate a wideband scenario and the process of phase condition optimization and consequently capacity optimization.

FIG. 8A is a diagram that illustrates a plot of the occupied/available signal bandwidth versus the frequency, in accordance with an exemplary embodiment of the invention. Referring to FIG. 8A, there is shown a plot 800 of the occupied/available signal bandwidth versus the frequency. The bandwidth occupies a frequency between fL and fH with a center frequency of f0. In this regard, the bandwidth that may be available for transmission may cover the spectrum between the frequency fL and frequency fH and is centered at the frequency f0.

FIG. 8B is a diagram that illustrates a plot of the phase condition versus the frequency prior to displacement of the transceiver, in accordance with an exemplary embodiment of the invention. Referring to FIG. 8B, there is shown a plot 802 of the phase condition versus the frequency prior to displacement of the transceiver. The bandwidth available for transmission occupies a frequency between fL and fH with a center frequency of f0 as shown in FIG. 8A. In this regard, the phase condition $\theta_{12}-\theta_{11}+\theta_{21}-\theta_{22}$ may generally be a function of frequency and varies across the spectrum between the frequency fL and the frequency fH. For this wideband usage scenario, the phase condition may be optimized and brought as close as possible to $(2n+1)\times 180°$ through displacement of transceivers. Only one frequency point between fL and fH will be able to meet the phase condition perfectly.

FIG. 8C is a diagram that illustrates a plot of the phase condition versus the frequency after displacement of the transceiver, in accordance with an exemplary embodiment of the invention. Referring to FIG. 8C, there is shown a plot 804 of the phase condition versus the frequency after displacement of the transceiver. The bandwidth available for transmission occupies a frequency between fL and fH with a center frequency of f0 as shown in FIGS. 8A-8B. The phase condition $\theta_{12}-\theta_{11}+\theta_{21}-\theta_{22}$ may be a function of frequency and may vary across the spectrum between the frequency fL and the frequency fH. For this wideband usage scenario, the phase condition may be optimized and brought as close as possible to $(2n+1)\times 180°$ through displacement of transceivers. Only one frequency point, namely fp, between fL and fH will be able to meet the phase condition perfectly.

The position of the frequency point, namely fp, in the range of frequency {fL,fH} is an optimization parameter and may be selected to maximize the overall capacity of the wideband channel. In an exemplary embodiment of the invention, the frequency point fp may be selected to be the midpoint between fL and fH. In this regard, the frequency point may be represented by the expression fp=(fL+fH)/2. Then the spectrum of fL to fH may be split and partitioned into several smaller sub-channels where each sub-channel may be considered a narrow-band waveform. The corresponding 2×2 leaky formulation and previously discussed embodiments of the invention may be applied to each of the narrow-band sub-channels. As a result, while the frequency point fp results in the highest capacity per unit of spectrum (normalized capacity) since it perfectly meets the phase condition, the other frequency points between fL and fH will have a lower capacity than fp since they won't meet the phase condition perfectly.

Figure 8D:
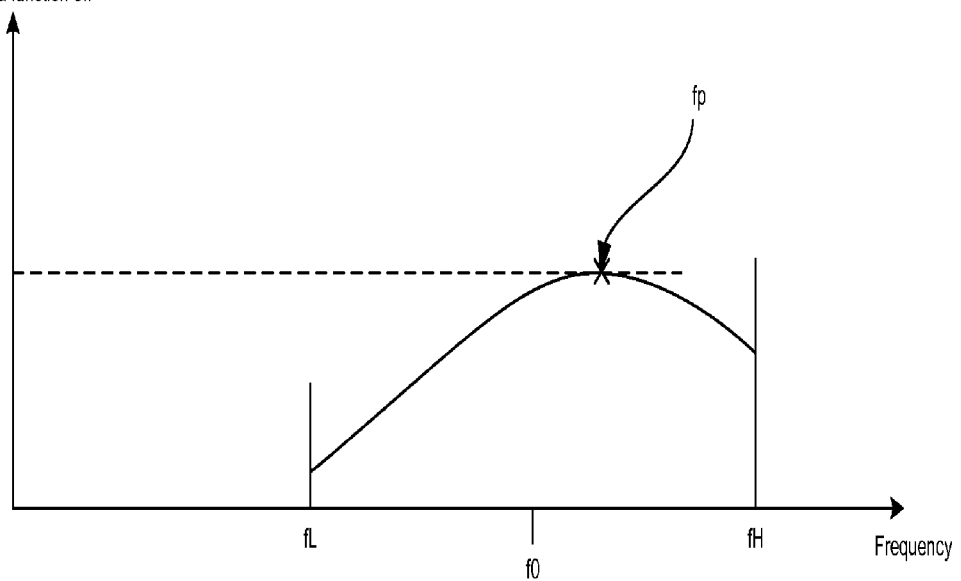
FIG. 8D is a diagram that illustrates a plot of the normalized capacity versus the frequency after displacement of the transceiver, in accordance with an exemplary embodiment of the invention.

FIG. 8D is a diagram that illustrates a plot of the normalized capacity versus the frequency after displacement of the transceiver, in accordance with an exemplary embodiment of the invention. Referring to FIG. 8D, there is shown a plot 806 of the normalized capacity versus the frequency after displacement of the transceiver. The normalized capacity is a function of the phase condition $\theta_{12}-\theta_{11}+\theta_{21}-\theta_{22}$. The normalized capacity, per sub-channel, as a function of frequency will peak at the frequency point fp. The system may be configured to shift the frequency point fp in the range {fL,fH}, effectively moving the frequency point with highest normalized capacity in that range based on other system parameters and requirements. The total link capacity comprises the aggregation of all individual capacities of these narrow-band sub-channels. Since the capacity per sub-channel may not be the same for different sub-channels in the band, in some embodiments, the central processor 106, the network management engine 107 and/or the coordinating entity 108 may be operable to allocate unequal transmit power per sub-channel to maximize the total aggregated capacity given the same total transmit power budget over all sub-channels. Various methods and/or techniques such a water-filling or any other distribution of power over the sub-channels may be used by the system. The implementation of sub-channelization may be performed through frequency-domain-multiplexing (FDM) or orthogonal-frequency-domain-multiplexing (OFDM).

Figure 9:
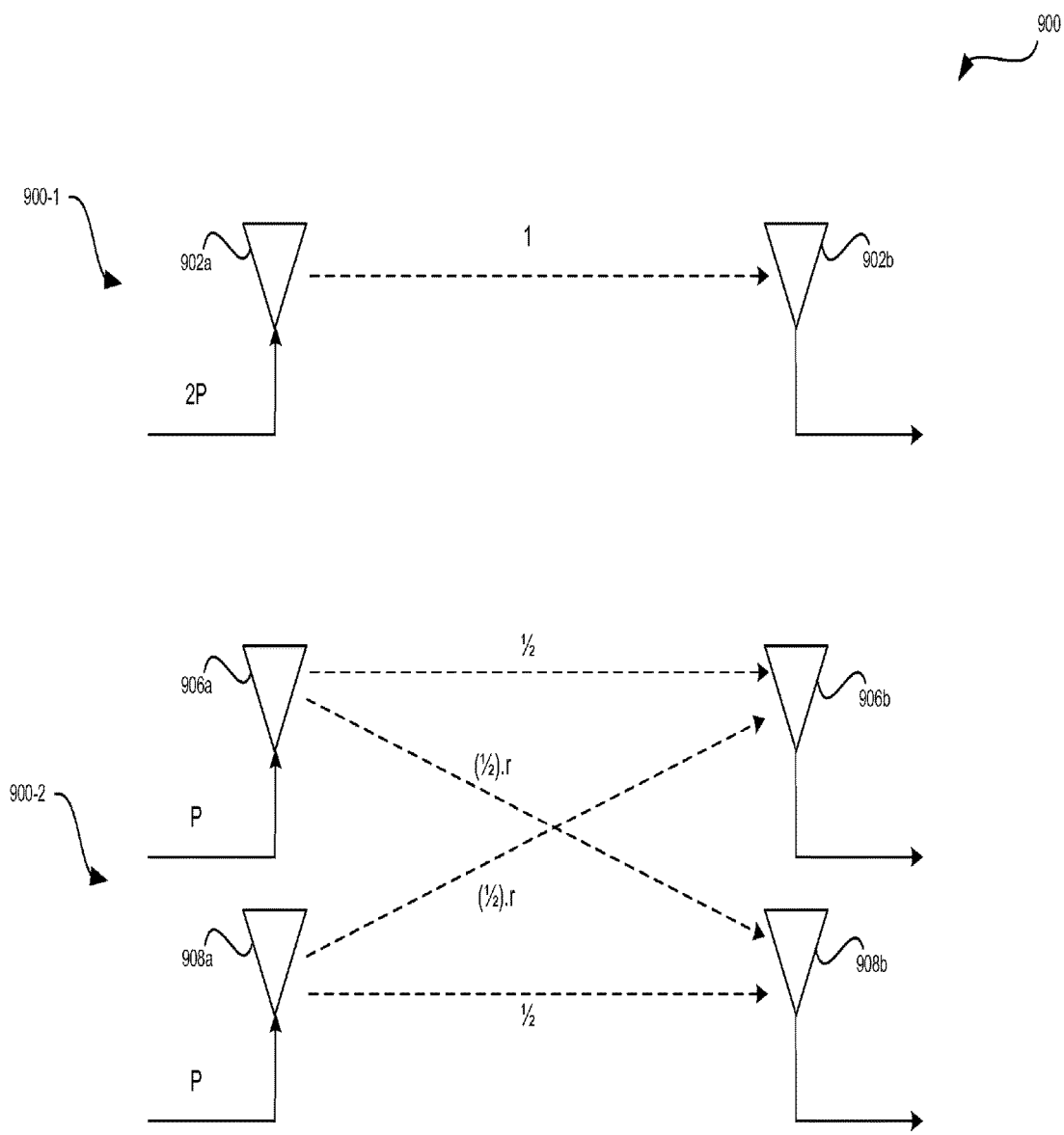
FIG. 9 is a diagram illustrating an exemplary model for utilizing distributed transceivers for communication links that utilizes dishes, in accordance with an exemplary embodiment of the invention.

FIG. 9 is a diagram illustrating an exemplary model for utilizing distributed transceivers for communication links that utilizes dishes, in accordance with an exemplary embodiment of the invention. Referring to FIG. 9, there is shown a model 900 for utilizing distributed transceivers for communication links that utilizes dishes. The model 900 comprises a portion 900-1 and a portion 900-2. Referring to portion 900-1 of FIG. 9, there is shown a dish at a transmitter portion of a transceiver 902a and a dish at a receiver portion of a transceiver 902b. The dish at the transmitter portion of the transceiver 902a is operable to transmit signals at a power level 2P. The dish at the transmitter portion of the transceiver 902a may represent a dish with an antenna array placed at its focal point for transmission. The dish at the receiver portion of the transceiver 902b may represent a dish with an antenna array placed its focal point for reception. The main difference between FIG. 9 and FIG. 5 models is that in FIG. 5, the cross leakage of 504a at 524b reduces the received power at 524a. Alternatively, in FIG. 9, the cross leakage of 906a at 908b doesn't degrade the received power at 906b. Depending on the specific usage and implementation, one of these models may be more applicable (e.g., antenna array implementation vs. dish implementation). Although the models are slightly different, all embodiments of the invention are applicable to both models.

The dish at the transmitter portion of a transceiver 902a may be replaced by two smaller dishes and two input feeds. The dish at the receiver portion of a transceiver 902b may also be replaced by two smaller dishes each with a corresponding output. This is illustrated in the portion 900-2 of FIG. 9.

Referring to portion 900-2 of FIG. 9, there is shown a first dish at a transmitter portion of a transceiver 906a, a second dish at a transmitter portion of a transceiver 908a, a first dish at a receiver portion of a transceiver 906b and a second dish at a receiver portion of a transceiver 908b. The first dish at the transmitter portion of a transceiver 906a is operable to transmit signals at a power level P and the second dish at the transmitter portion of the transceiver 906a is operable to transmit signals at a power level P. The total transmit power may be kept the same or it may be different (e.g., still transmit P from each dish). The number next to each of the communication link denotes the corresponding channel gain in absolute/linear terms. The factor r may be close to 1 but may typically be less than 1 in instances when the transmitter and receiver sides are spaced sufficiently far apart.

Figure 10:
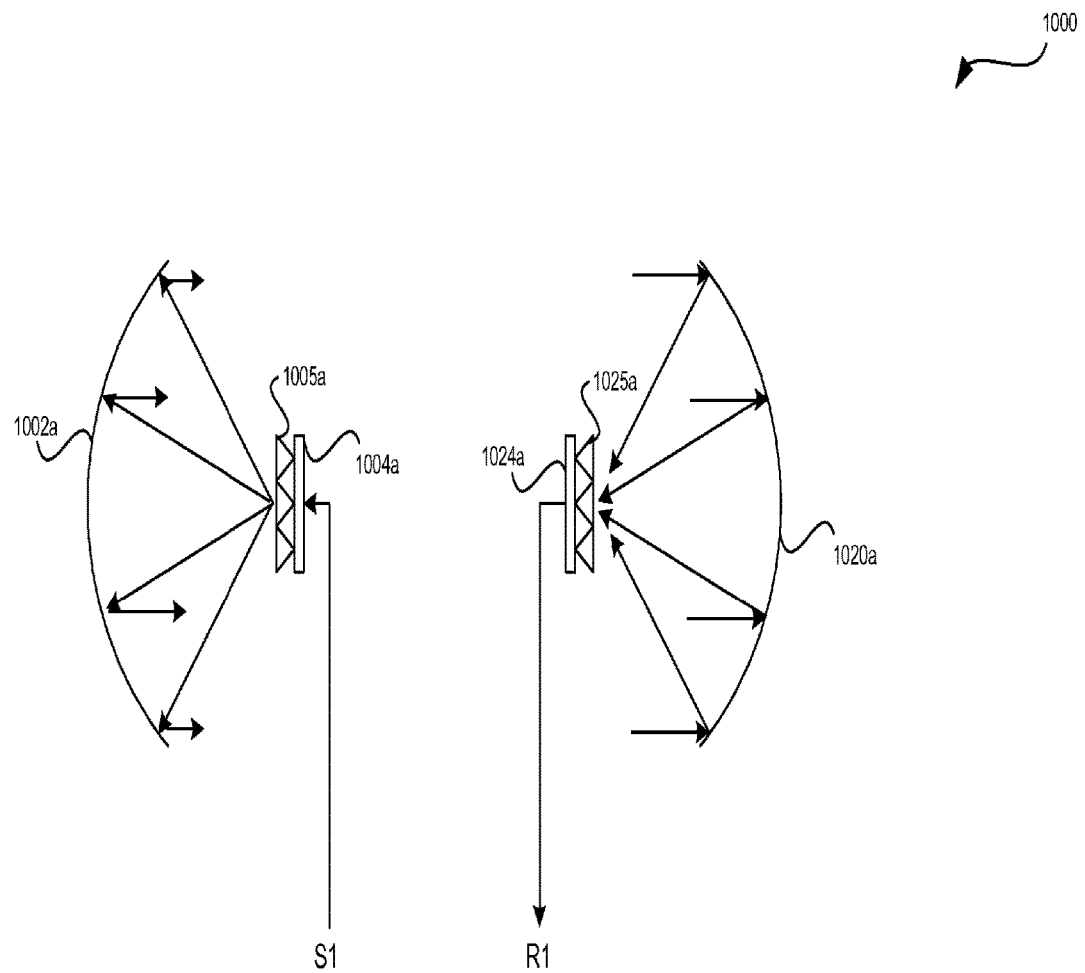
FIG. 10 is a diagram illustrating exemplary use of transceivers for communication links that utilize dishes, in accordance with an exemplary embodiment of the invention.

FIG. 10 is a diagram illustrating exemplary use of transceivers for communication links that utilize dishes, in accordance with an exemplary embodiment of the invention. Referring to FIG. 10, there is shown a communication system 1000 comprising a dish 1002a, a transmitter portion of a transceiver 1004a, an antenna array 1005a, a dish 1020a, a receiver portion of a transceiver 1024a and an antenna array 1025a. The antenna array 1005a may be located at the focal point of the dish 1002a. The antenna array 1025a may be located at the focal point of the dish 1020a.

Referring to FIG. 10, a non-distributed single-stream scenario is illustrated. The various embodiments described above for leaky distributed transceivers may also be applied to this dish scenario since the system model governing both scenarios are fundamentally similar. In an exemplary embodiment of the invention, for illustrative purposes, assume the area of each dish in a 2-dish scenario is half the size of the 1-dish scenario. In this regard, the effective gain of the path between the receiver and the transmitter for the 2× dish scenario may be ½ the single dish scenario, which is 6 dB less than the gain for the single-dish scenario.

The capacity of the single dish setup illustrated in FIG. 8, C_1D, may be given by the following exemplary expression:

$$C\_1D\{P, \sigma_n^2\} = B \times \log\left(1 + \frac{2P}{\sigma_n^2}\right)$$

where $\sigma_n^2$ may represent the noise power at the receiving dish. It may be shown that the MIMO capacity of the 2-dish scenario illustrated in FIG. 8, _2D, may be given by the following exemplary expression:

$$C\_2D\{P, \sigma_n^2, r\} = B \times \log\left(\det\left(I + \frac{P}{\sigma_n^2} AA^*\right)\right)$$

where (P may represent the transmit power to each dish to keep the total transmit power the same for the single-dish and the 2-dish scenarios, and where $$A = 1/2 \begin{bmatrix} 1e^{j\theta 11} & re^{j\theta 12} \\ re^{j\theta 21} & 1e^{j\theta 22} \end{bmatrix}_{2\times 2}$$

(factor of ½ times the 2×2 matrix) where θij is the propagation phase between ith transmitter and jth receiver.

For illustrative purposes, assume that $\theta_{ij}$ represents the channel response phase between transmitter i and receiver j, and define θ as $\theta_{12}-\theta_{11}+\theta_{21}-\theta_{22}$. It may be shown that the MIMO capacity may be given by the following exemplary expression:

$$C\_2D\{P, \sigma_n^2, r\} = B \times \log\left[\left(1 + \frac{P}{4\sigma_n^2}(1 + r^2)\right)^2 - 2(1 + \cos\theta)\left(\frac{P}{4\sigma_n^2}r\right)^2\right]$$

where θ may be defined as $\theta_{12}-\theta_{11}+\theta_{21}-\theta_{22}$ assuming $\theta_{ij}$ represents the channel response phase between transmitter i and receiver j. Then the maximum capacity occurs at θ=180° and may be given by the following exemplary expression:

$$C\_2D\{P, \sigma_n^2, r\} = 2 \times B \times \log\left[\left(1 + \frac{P}{4\sigma_n^2}(1 + r^2)\right)\right]$$

Based on this model, the techniques utilized herein for leaky distributed transceivers may also be applied to the distributed dish scenario. In particular, embodiments of the phase condition and the singular-value-decomposition method may be applied to this distributed dish scenario. Various embodiments of the mechanical movement of the phase center may be applied to the dish itself and/or the antenna array at the dish's focal point. Various embodiments of the electronic movement of the phase center may also be applied to the antenna array at the focal point of the dish.

In some embodiments of the invention, a single larger dish may be utilized for both data streams, thereby maximizing the dish's transmit and/or receive antenna gain. Different polarizations may be utilized by each feed to eliminate cross interference and avoid the need for meeting the phase condition.

Figure 11:
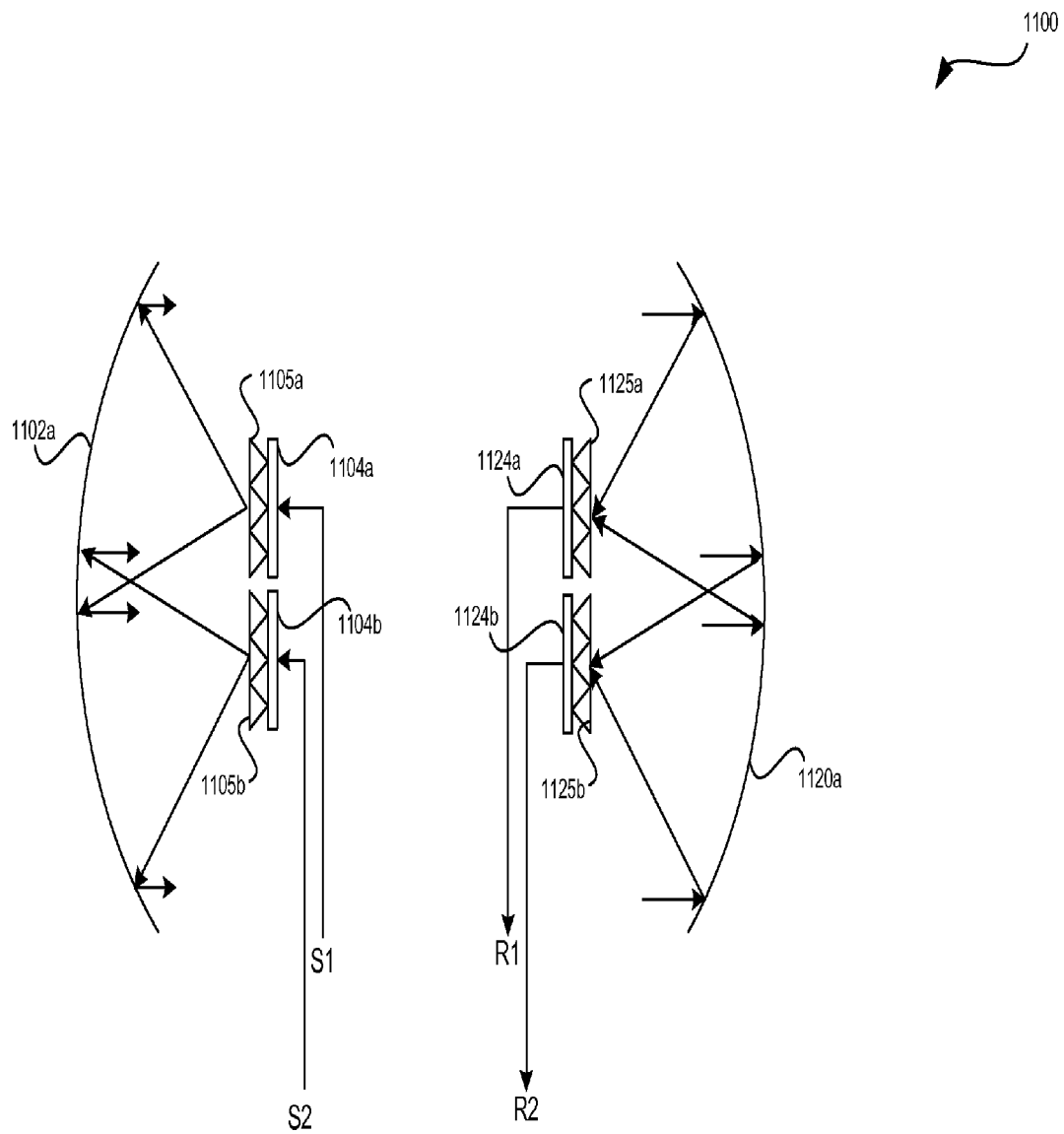
FIG. 11 is a diagram that illustrates the use of a single larger dish to transmit two data streams utilizing orthogonal polarization, in accordance with an exemplary embodiment of the invention.

FIG. 11 is a diagram that illustrates the use of a single larger dish to transmit two data streams utilizing orthogonal polarization, in accordance with an exemplary embodiment of the invention. Referring to FIG. 11, there is shown a communication system 1100 comprising a dish 1102*a*, a transmitter portion of a distributed transceiver 1104*a*, a transmitter portion of a distributed transceiver 1104*b*, an antenna array 1105*a*, an antenna array 1105*b*, a dish 1120*a*, a receiver portion of a distributed transceiver 1124*a*, a receiver portion of a distributed transceiver 1124*b*, an antenna array 1125*a* and an antenna array 1125*b*. The antenna arrays 1105*a*, 1105*b* may be located at the focal point of the dish 1102*a*. The antenna arrays 1125*a*, 1125*b* may be located at the focal point of the dish 1120*a*.

The transmitter portion of a distributed transceiver 1104*a* and the antenna array 1105*a* may be operable to transmit a data stream S1 via the dish 1102*a*. The transmitter portion of a distributed transceiver 1104*b* and the antenna array 1105*b* is operable to transmit a data stream S2 via the dish 1102*a*. The receiver portion of a distributed transceiver 1124*a* and the antenna array 1125*a* may be operable to receive the corresponding data stream R1 via the dish 1120*a*. The receiver portion of a distributed transceiver 1124*b* and the antenna array 1125*b* may be operable to receive the corresponding data stream R2 via the dish 1120*a*. The data streams S1, S2 may be communicated utilizing orthogonal polarizations and the corresponding received data streams R1 and R2, respectively, may be received on corresponding polarizations.

During communication, the two polarizations may not be fully orthogonal and as a result, this configuration may default to a 2×2 system with a MIMO matrix, which may be similar to the general case, and given by the following exemplary expression:

$$A = 1/2 \begin{bmatrix} 1e^{j\theta 11} & re^{j\theta 12} \\ re^{j\theta 21} & 1e^{j\theta 22} \end{bmatrix}_{2\times 2}$$

(factor of ½ times the 2×2 matrix) where the value of r is relatively small when orthogonal polarizations is used. In most practical cases, the value of r will be less than −10 dB. For such small values of r, the phase sum condition may be no longer necessary or critical to optimize capacity. Therefore, no phase condition optimization may be deployed for this embodiment of the invention. However, MIMO techniques, for example, singular-value-decomposition method or other methods, may be utilized to take into account the impact of the leakage ratio r.

In various other embodiments of the invention, the distributed dish method may be applied to distributed transceivers with the same polarization. In order to keep the dish gain high, two transceivers may configured to share the same dish, allowing for a larger dish size, while two other transceivers use separate dishes, allowing for relative movement/placement of them in the system.

Figure 12:
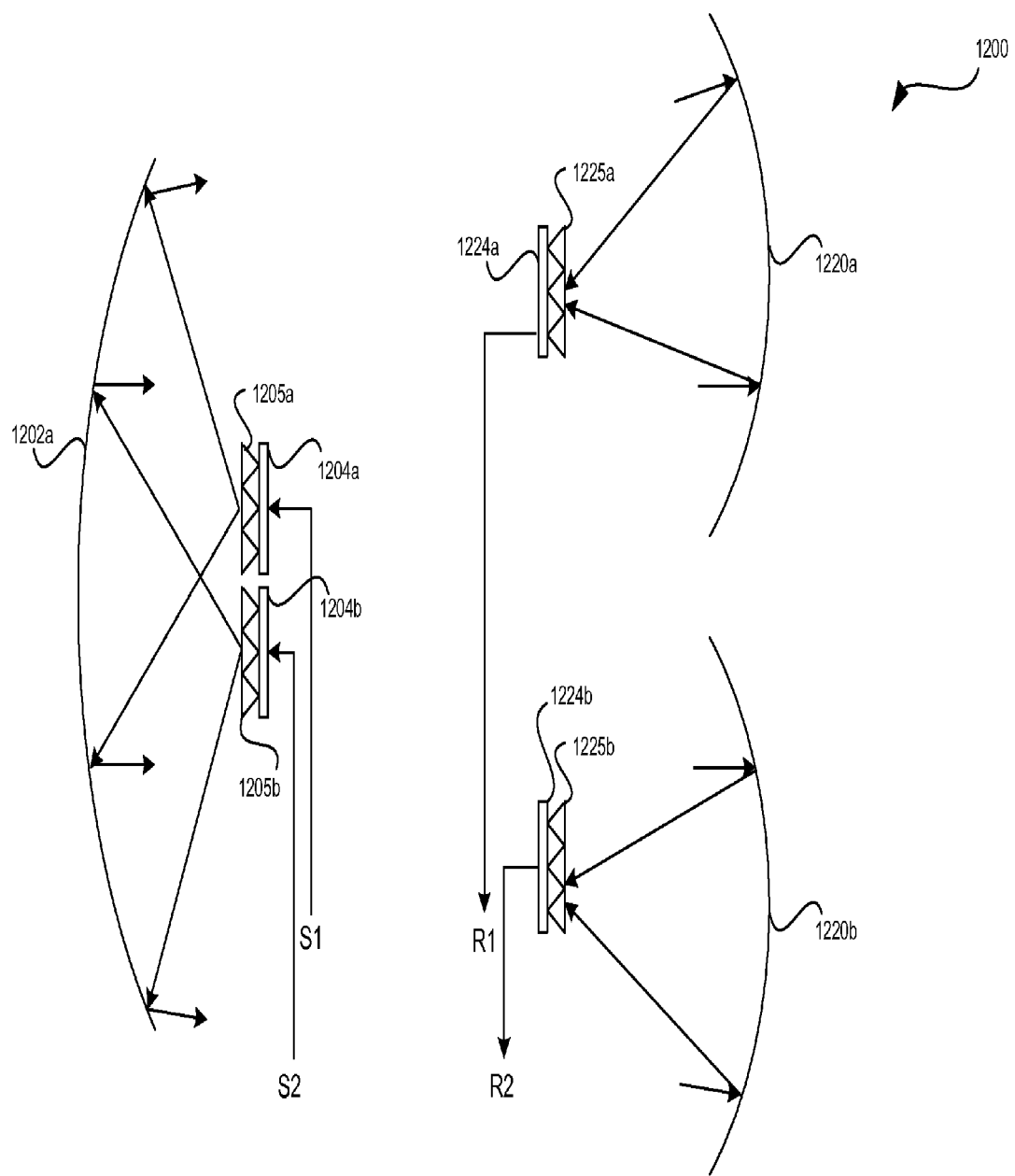
FIG. 12 is a diagram that illustrates the use of a single larger dish to transmit two data streams by two distributed transceivers utilizing similar polarization and receiving two corresponding data streams by two distributed transceivers with separate dishes, in accordance with an exemplary embodiment of the invention.

FIG. 12 is a diagram that illustrates the use of a single larger dish to transmit two data streams by two distributed transceivers utilizing similar polarization and receiving two corresponding data streams by two distributed transceivers with separate dishes, in accordance with an exemplary embodiment of the invention. Referring to FIG. 12, there is shown a communication system 1200 comprising a dish 1202a, a transmitter portion of a distributed transceiver 1204a, a transmitter portion of a distributed transceiver 1204b, an antenna array 1205a, an antenna array 1205b, a dish 1220a, a receiver portion of a distributed transceiver 1224a, a receiver portion of a distributed transceiver 1224b, an antenna array 1225a and an antenna array 1225b and a dish 1220b. The antenna arrays 1205a, 1205b may be located at the focal point of the dish 1202a. The antenna array 1225a may be located at the focal point of the dish 1220a and the antenna array 1225b may be located at the focal point of the dish 1220b.

The transmitter portion of a distributed transceiver 1204a and the antenna array 1205a may be operable to transmit a data stream S1 via the dish 1202a. The transmitter portion of a distributed transceiver 1204b and the antenna array 1205b may be operable to transmit a data stream S2 via the dish 1202a. The receiver portion of a distributed transceiver 1224a and the antenna array 1225a may be operable to receive the corresponding data stream R1 via the dish 1220a. The receiver portion of a distributed transceiver 1224b and the antenna array 1225b may be operable to receive the corresponding data stream R2 via the dish 1220b. The data streams S1, S2 may be communicated utilizing the same polarizations and the corresponding received data streams R1 and R2, respectively, may be received on the same polarizations. The phase condition may be tuned and/or enforced by moving one or both of the receiver side dishes 1220a, 1220b and/or one or both of receiver side antenna arrays 1225a, 1225b.

In another embodiment of the invention, orthogonal polarizations may be utilized within a dish, by two transceivers, while another two orthogonal polarizations may be utilized by another adjacent dish, by two transceivers. While the relative polarizations between the two sets may not be fully orthogonal, the relative polarization may be kept at somewhere between 0 and 90°.

Figure 13:
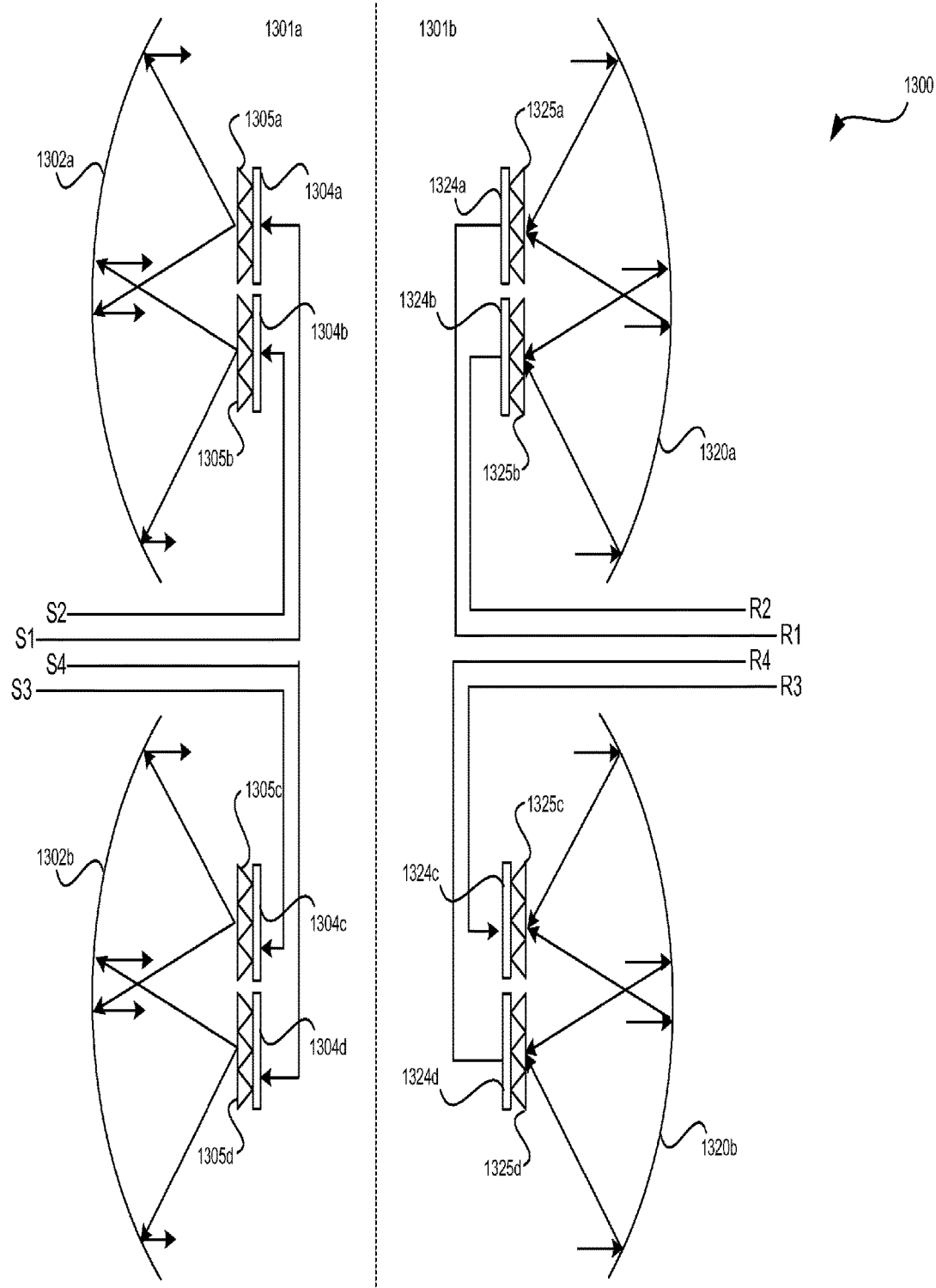
FIG. 13 is a diagram that illustrates the use of different polarizations by two distributed transceivers at two separate dishes to transmit four data streams and receiving four corresponding data streams by two distributed transceivers at two separate dishes, in accordance with an exemplary embodiment of the invention.

FIG. 13 is a diagram that illustrates the use of different polarizations by two distributed transceivers at two separate dishes to transmit four data streams and receiving four corresponding data streams by two distributed transceivers at two separate dishes, in accordance with an exemplary embodiment of the invention. Referring to FIG. 13, there is shown a communication system 1300 comprising a transmit side 1301a and a receive side 1301b. The transmit side 1301a comprises a dish 1302a, a transmitter portion of a distributed transceiver 1304a, a transmitter portion of a distributed transceiver 1304b, an antenna array 1305a, an antenna array 1305b, a dish 1302b, a transmitter portion of a distributed transceiver 1304c, a transmitter portion of a distributed transceiver 1304d, an antenna array 1305c, an antenna array 1305d. The antenna arrays 1305a, 1305b may be located at the focal point of the dish 1302a. The antenna arrays 1305c, 1305d may be located at the focal point of the dish 1302b. The receive side 1301b comprises a dish 1320a, a receiver portion of a distributed transceiver 1324a, a receiver portion of a distributed transceiver 1324b, an antenna array 1325a, an antenna array 1325b, a dish 1320b, a receiver portion of a distributed transceiver 1324c, a receiver portion of a distributed transceiver 1324d, an antenna array 1325c, an antenna array 1325d. The antenna arrays 1325a, 1325b may be located at the focal point of the dish 1320a. The antenna arrays 1325c, 1325d may be located at the focal point of the dish 1320b.

The transmitter portion of a distributed transceiver 1304a and the antenna array 1305a may be operable to transmit a data stream S1 via the dish 1302a. The transmitter portion of a distributed transceiver 1304b and the antenna array 1305b may be operable to transmit a data stream S2 via the dish 1302a. The transmitter portion of a distributed transceiver 1304c and the antenna array 1305c may be operable to transmit a data stream S3 via the dish 1302b. The transmitter portion of a distributed transceiver 1304d and the antenna array 1305d may be operable to transmit a data stream S4 via the dish 1302b.

The receiver portion of a distributed transceiver 1324a and the antenna array 1325a may be operable to receive a data stream S1, which corresponds to the transmitted data stream R1, via the dish 1320a. The receiver portion of a distributed transceiver 1324b and the antenna array 1325b may be operable to receive a data stream S2, which corresponds to the transmitted data stream R2, via the dish 1320a. The receiver portion of a distributed transceiver 1324c and the antenna array 1325c may be operable to receive a data stream S3 which corresponds to the transmitted data stream R3, via the dish 1320b. The receiver portion of a distributed transceiver 1324d and the antenna array 1325d may be operable to receive a data stream S4, which corresponds to the transmitted data stream R4, via the dish 1320b.

The data streams S1, S2 may be communicated utilizing orthogonal polarizations and the corresponding received data streams R1 and R2, respectively, may be received on orthogonal polarizations. The data streams S3, S4 may be communicated utilizing orthogonal polarizations and the corresponding received data streams R3 and R4, respectively, may be received on orthogonal polarizations. The phase condition may be tuned and/or enforced by moving one or both of the receiver side 1301b dishes 1320a, 1320b and/or one or more of receiver side 1301b antenna arrays 1325a, 1325b, 1325c, 1325d.

In the usage scenario of FIG. 13, power may leak between the two dishes resulting in cross interference. The set of transmit portions of the distributed transceivers 1304a, 1304b may utilize polarizations 0 and 90°, hence achieving good orthogonality with minimal interference between the data streams S1 and S2. Correspondingly, the set of receive portions of the distributed transceivers 1324a, 1324b may utilize polarizations 0 and 90°. The set of transmit portions of the distributed transceivers 1304c, 1304d may utilize polarizations 45° and 135°. This may provide good isolation between the data streams S3 and S4. Correspondingly, the set of receive portions of the distributed transceivers 1324c, 1324d may utilize polarizations 45° and 135°. Due to the proximity of dishes 1302a, 1302b, there will be leakage from the data streams S1, S2 at the receiver portion of the distributed transceivers 1324c, 1324d and leakage from the data streams S3, S4 at the receiver portions of the distributed transceivers 1324a, 1423b. In this configuration, pairs of transmitter portions of the distributed transceivers (1304a, 1304b) and (1304c, 1304d), and pairs of the receiver portions of the distributed transceivers (1324a, 1324b) and (1324c, 1324d) may be considered sufficiently close. In other words, for example, the propagation phase between 1304a-to-1324c, 1304b-to-1324c, 1304a-to-1324d, and 1304b-to-1324d may be considered to be similar. The phase relation between the set of transmitter portions of the distributed transceivers 1304a, 1304b and the set of receive portions of the distributed transceivers 1324a, 1324b is not critical since they use orthogonal polarization and the cross-interference between them may be negligible. Base on this, the leakage may be modeled as a 2×2 system in which the phase may be defined as follows:

$\theta_{11}$ is the phase between (TX1/TX2) and (RX1/RX2);
$\theta_{12}$ is the phase between (TX1/TX2) and (RX3/RX4);
$\theta_{21}$ is the phase between (TX3/TX4) and (RX1/RX2); and
$\theta_{22}$ is the phase between (TX3/TX4) and (RX3/RX4).

The phase condition $\theta_{12}-\theta_{11}+\theta_{21}-\theta_{22}$ from previous embodiments of the invention may be applied and optimized here by adjusting the effective placement of the transceivers and/or dishes. An advantage for this configuration is that due to lower leakage ratio, for example, 45° difference in cross-polarizations, the capacity degradation due to the phase condition may be less severe and will be more readily achievable since less displacement and/or spacing may be needed. In other words, the phase condition may be in the range of $\{(2n+1)\times 180°-\Delta, (2n+1)\times 180°+\Delta\}$ with a larger $\Delta$.

In another embodiment of the invention, instead of utilizing separate dishes on the transmit side 1301a and separate dishes on the receive side 1301b of FIG. 13, a common dish may be utilized on the transmit side 1301a and a common dish may be utilized on the receive side 1301b in order to, for example, maximize the dish gain for each of the distributed transceivers. In this configuration, 4 data streams are transported over 4 transmitters. Semi-orthogonal polarizations are used by TX1, TX2, TX3, and TX4 (e.g., polarizations offsets of 0°, 45°, 90°, 135° respectively). This arrangement ensures that cross-leakage between the transceivers is less than a threshold, hence making the phase condition requirement less critical.

Figure 14:
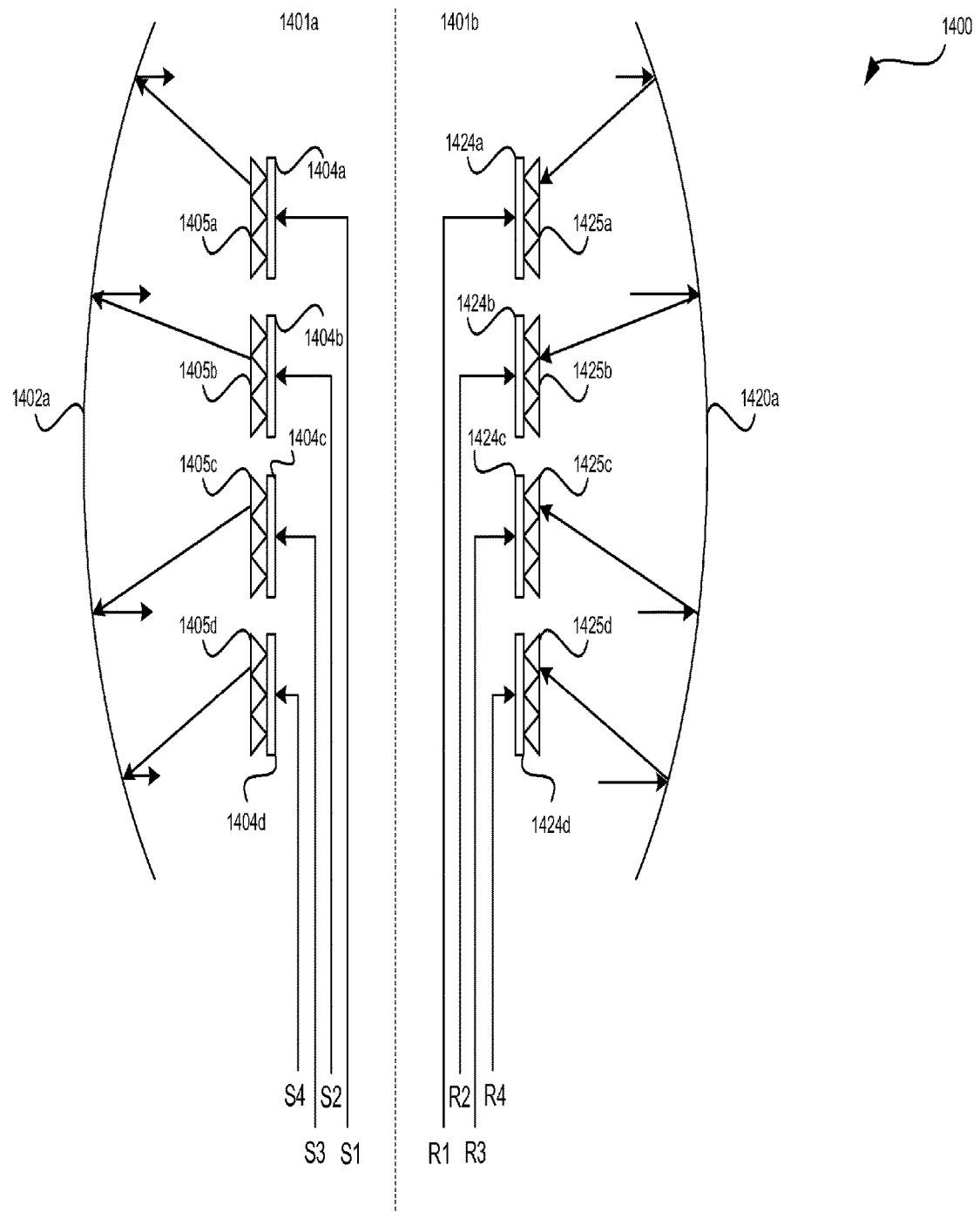
FIG. 14 is a diagram that illustrates the use of different relative polarizations by four distributed transceivers at a single dish to transmit four data streams and receiving four corresponding data streams by four distributed transceivers at a single dish, in accordance with an exemplary embodiment of the invention.

FIG. 14 is a diagram that illustrates the use of different relative polarizations by four distributed transceivers at a single dish to transmit four data streams and receiving four corresponding data streams by four distributed transceivers at a single dish, in accordance with an exemplary embodiment of the invention. Referring to FIG. 14, there is shown a communication system 1400 comprising a transmit side 1401a and a receive side 1401b. The transmit side 1401a may comprise a dish 1402a, a transmitter portion of a distributed transceiver 1404a, a transmitter portion of a distributed transceiver 1404b, a transmitter portion of a distributed transceiver 1404c, a transmitter portion of a distributed transceiver 1404d, an antenna array 1405a, an antenna array 1405b, an antenna array 1405c, an antenna array 1405d. The antenna arrays 1405a, 1405b, 1405c, 1405d may be located at the focal point of the dish 1402a. The receive side 1401b may comprise a dish 1420a, a transmitter portion of a distributed transceiver 1424a, a transmitter portion of a distributed transceiver 1424b, a transmitter portion of a distributed transceiver 1424c, a transmitter portion of a distributed transceiver 1424d, an antenna array 1425a, an antenna array 1425b, an antenna array 1425c, an antenna array 1425d. The antenna arrays 1425a, 1425b, 1425c, 1425d may be located at the focal point of the dish 1420a.

The transmitter portion of the distributed transceiver 1404a and the antenna array 1405a may be operable to transmit a data stream S1 via the dish 1402a. The transmitter portion of a distributed transceiver 1404b and the antenna array 1405b may be operable to transmit a data stream S2 via the dish 1402a. The transmitter portion of a distributed transceiver 1404c and the antenna array 1405c may be operable to transmit a data stream S3 via the dish 1402a. The transmitter portion of a distributed transceiver 1404d and the antenna array 1405d may be operable to transmit a data stream S4 via the dish 1402a.

The receiver portion of a distributed transceiver 1424a and the antenna array 1425a may be operable to receive a data stream S1, which corresponds to the transmitted data stream R1, via the dish 1420a. The receiver portion of a distributed transceiver 1424b and the antenna array 1425b may be operable to receive a data stream S2, which corresponds to the transmitted data stream R2, via the dish 1420a. The receiver portion of a distributed transceiver 1424c and the antenna array 1425c may be operable to receiver a data stream S3 which corresponds to the transmitted data stream R3, via the dish 1420a. The receiver portion of a distributed transceiver 1424d and the antenna array 1425d may be operable to receiver a data stream S4, which corresponds to the transmitted data stream R4, via the dish 1420a.

The data streams S1, S2, S3, S4 may be communicated utilizing semi-orthogonal polarizations and the corresponding received data streams R1, R2, R3, R4, respectively, may be received on corresponding orthogonal polarizations. In an exemplary embodiment of the invention, the transmitter portions of the distributed transceivers 1404a, 1404b, 1404c, 1404d may be operable to transmit the data streams S1, S2, S3, S4 utilizing polarizations of 0°, 45°, 90° and 135°, respectively. This arrangement ensures that cross-leakage between the distributed transceivers may be less than a threshold, thereby making the phase condition requirement less critical.

There may be instances when the channel matrix for the distributed transceivers that utilize dishes may no longer be symmetric in terms of its elements' amplitudes. Accordingly, the propagation channel responses as illustrated in FIG. 5, are modified accordingly as illustrated in FIG. 15.

Figure 15:
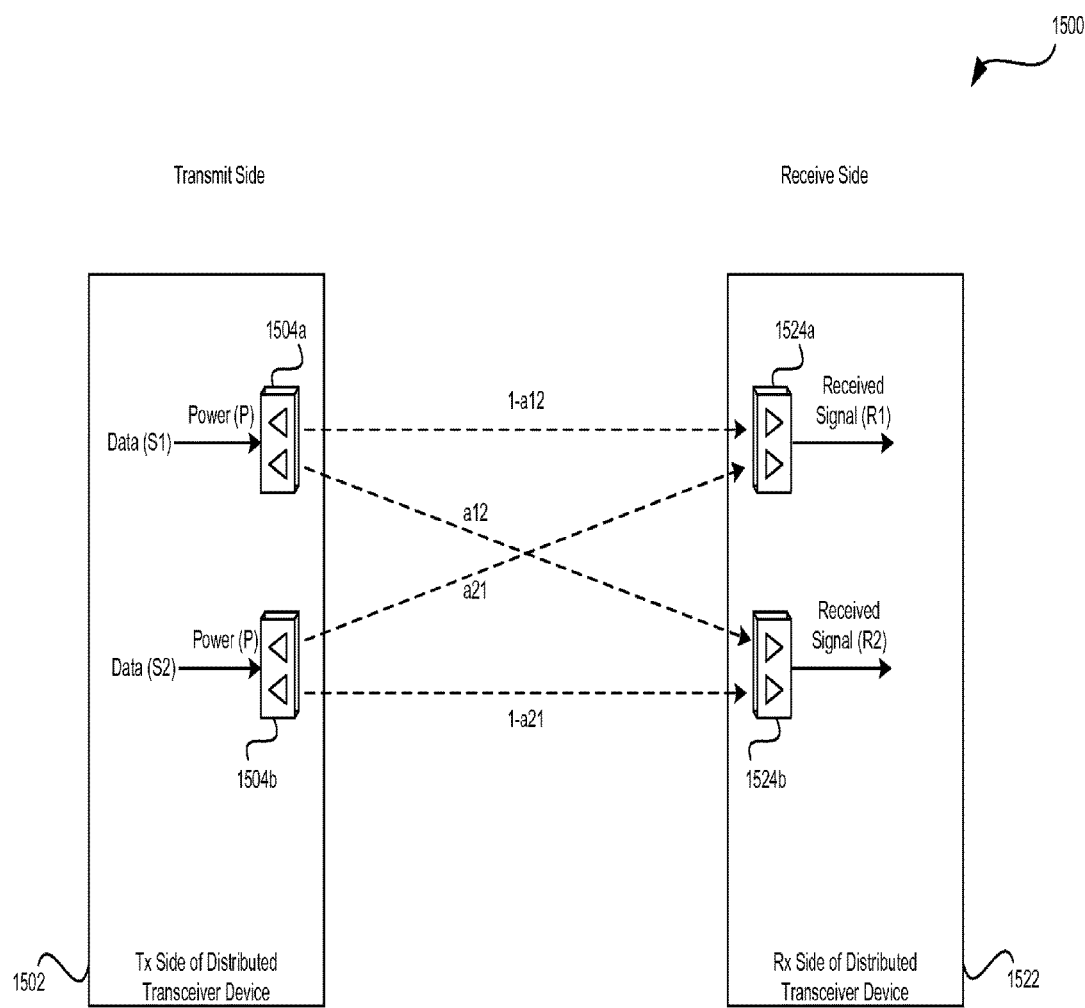
FIG. 15 is a block diagram of an exemplary propagation model for a leaky wave distributed transceiver environment where the channel matrix is asymmetric, in accordance with an exemplary embodiment of the invention.

FIG. 15 is a block diagram of an exemplary propagation model for a leaky wave distributed transceiver environment where the channel matrix is asymmetric, in accordance with an exemplary embodiment of the invention. Referring to FIG. 15, there is shown a propagation model 1500 comprising a transmit side of a distributed transceiver device 1502 and a receive side of a distributed transceiver device 1522. The transmit side of the distributed transceiver device 1502 comprises distributed transmitter portions 1504a, 1504b. The receive side of the distributed transceiver device 1522 comprises distributed receiver portions 1524a, 1524b. Although a 2×2 system of distributed transceivers is illustrated, the invention is not limited in this regard.

As illustrated in FIG. 15, each of the factors a12 and a21 may comprise a non-zero parameter that may be utilized to model cross interference between the two data stream samples S1, S2. In an exemplary embodiment of the invention, the distributed transceivers may be operable to utilize training and/or pilot sequences to estimate each of the factors a12, a21 during, for example, channel estimation. The estimated channel and the factor "a" may be available at both the transmit side of the distributed transceiver device 1502 and at the receive side of the distributed transceiver device 1522. The channel gain for a communication path between the distributed transmitter portion 1504a and the distributed receiver portion 1524a for the data stream samples S1 may be represented as 1-a12. The channel gain for a communication path between the distributed transmitter portion 1504a and the distributed receiver portion 1524b for the data stream samples S1 may be represented as a12. Similarly, the channel gain for a communication path between the distributed transmitter portion 1504b and the distributed receiver portion 1524a for the data stream samples S2 may be represented as a21. The channel gain for a communication path between the distributed transmitter portion 1504b and the distributed receiver portion 1524b for the data stream samples S2 may be represented as 1-a21. The signal received by the distributed receiver portion 1524a may be represented as R1 and the signal received by the distributed receiver portion 1524b may be represented as R2. Although the system formulation below is provided for a 2×2 distributed transceiver system, the results may be generalized to any number of transceivers.

The system transfer function may be represented by the following exemplary expression:

$$\begin{bmatrix} R1 \\ R2 \end{bmatrix} = H \begin{bmatrix} S1 \\ S2 \end{bmatrix} + \begin{bmatrix} n1 \\ n2 \end{bmatrix}$$

where (S1, S2) are the data stream samples, which may be selected from constellation points, that are transmitted from the transmit portion of the distributed transceiver, (R1, R2) are the data stream samples, which may correspond to the transmitted constellation points that are received at the receive portions of the distributed transceivers 1524a, 1524b.

The channel matrix H is given as:

$$H = h \begin{bmatrix} (1-a12)e^{j\theta 11} & (a12)e^{j\theta 12} \\ (a21)e^{j\theta 21} & (1-a21)e^{j\theta 22} \end{bmatrix}$$

where h is a scalar that represents the channel gain, that is a real number with no phase component and (n1, n2) represents the receiver noise sources additive at the receive portions of the distributed transceivers 1524a, 1524b.

The MIMO channel capacity, C, of the above system may be represented by the following exemplary expression:

$$C = B \times \log\left(\det\left(I + \frac{h^2}{\sigma_n^2} AA^*\right)\right)$$

where B is the spectrum used, a is the noise variance at each receiver, and the matrix A may be represented by the:

$$A = \begin{bmatrix} (1-a12)e^{j\theta 11} & (a12)e^{j\theta 12} \\ (a21)e^{j\theta 21} & (1-a21)e^{j\theta 22} \end{bmatrix}$$

In accordance with various embodiments of the invention, the available system parameters may be tuned to maximize the MIMO capacity, which is defined above. For illustrative purposes, assume that the corresponding position of one or more of the distributed transceivers is (or are) to be optimized in order to optimize system capacity optimization. It should be noted that in the symmetric case, only one transceiver placement was tuned in order to optimize system capacity. Assume that the locations of the transmitter portions of the distributed transceivers 1504a, 1504b and the receiver portion of the distributed transceivers 1524a, 1524b in the 3D coordinate space (x,y,z) are denoted by (x1,y1,z1), (x2,y2,z2), (x3,y3,z3), (x4,y4,z4), respectively. Furthermore, assume that one or more of the aforementioned 3D position(s) is (or are) mechanically and/or electronically tunable to optimize performance. In this regard, the system may be operable to utilize one or more searching algorithms, for example, brute-force, adaptive, iterative, and/or sub-optimal algorithm, in order to find an optimized configuration, which may be represented by the following exemplary expression:

$$\max_{over(x1,y1,z1),(x2,y2,z2),(x3,y3,z3),(x4,y4,z4),} \det\left(I + \frac{h^2}{\sigma_n^2} AA^*\right)$$

where the parameters a12, a21, and h are known and measured through channel estimation and may be considered constant over different values of locations for ease of finding the optimum solution. Based on relations between a12, a21, the above optimization problem may not easily lead to a closed-form equation for optimal parameters (as is doable in symmetric case). With no loss of generality, in the absence of a closed-form optimization equation, iterative and/or brute-force search methods may be used to find the optimal conditions for the above optimization problem. In some embodiments of the invention, a look up table (LUT) may comprise values, which may be utilized for the optimization. Furthermore, the noise variance may be known in the above optimization.

An optimal or sub-optimal solution may be determined over the location parameters and the resulting phase values $\theta_{12}$, $\theta_{11}$, $\theta_{21}$, $\theta_{22}$ may be estimated and/or measured. The channel matrix A may then be determined. Similar to the symmetric scenario, a pre-coding scheme at the transmit portion of the distributed transceiver and a post-processing scheme at the receive portion of the distributed transceiver may be utilized to achieve the above optimal capacity. The singular value decomposition of the channel matrix H may be represented by the following exemplary expression:

$$H = hU \begin{bmatrix} \gamma^1 & 0 \\ 0 & \gamma^2 \end{bmatrix} V^-$$

where matrices U and V may comprise unitary matrices and $\gamma_1, \gamma_2$ may determine the effective SNR for each data stream, which may no longer be the same. Using the above model, the transmitted symbols $$\begin{bmatrix} S1 \\ S2 \end{bmatrix}$$

may be generated from two independent symbols $$\begin{bmatrix} S'1 \\ S'2 \end{bmatrix}$$

through the following pre-coding, before being transmitted over the two transmit dishes:

$$\begin{bmatrix} S1 \\ S2 \end{bmatrix} = V \begin{bmatrix} S'1 \\ S'2 \end{bmatrix}$$

At the receiver side of the distributed transceiver, the received symbols may be processed to generate two new symbols $$\begin{bmatrix} R1 \\ R2 \end{bmatrix}$$

may be processed to generate two new symbols $$\begin{bmatrix} R'1 \\ R'2 \end{bmatrix},$$

which may be given by the following exemplary expression:

$$\begin{bmatrix} R'1 \\ R'2 \end{bmatrix} = U^* \begin{bmatrix} R1 \\ R2 \end{bmatrix}$$

The matrices U and V may be available at both the transmit side of the distributed transceivers and the receive side of the distributed transceivers. Both matrices are calculated using the channel matrix H. In accordance with some embodiments of the invention, different channel estimation methods may be utilized to estimate, track and/or fine-tune the channel response matrix H by, for example, pilot training. In instances where the channel may be estimated at the receiver portion of the distributed transceiver 1522, the receiver portion of the distributed transceiver 1522 may be operable to feedback the estimated channel values or the singular value decomposition values back to the transmitter portion of the distributed transceiver 1502. The channel elements of channel response matrix H may be updated periodically based on, for example, the rate of variation in the environment. Based on the above pre-coding and post-processing, the system model may be represented by the following exemplary expression:

$$\begin{bmatrix} R'1 \\ R'2 \end{bmatrix} = h \begin{bmatrix} \gamma_1 & 0 \\ 0 & \gamma_2 \end{bmatrix} \begin{bmatrix} S'1 \\ S'2 \end{bmatrix} + \begin{bmatrix} n'1 \\ n'2 \end{bmatrix}$$

Consequently, the symbol S'1 may be decoded from R'1, with no interference from S'2) and symbol S'2 may be decoded from R'2 with no interference from S'1. Accordingly, this may enable the system to transport two streams of data with no cross-interference.

The system optimization methods and transmission schemes developed for 2×2 leaky systems, both distributed transceivers and dish, may be extended to systems with larger numbers of transmitters and/or receivers. Although the phase condition requirement in the 2×2 case leads to a closed-form requirement (i.e., $\theta_{12}-\theta_{11}+\theta_{21}-\theta_{22}=(2n+1)$ 180°), for higher order systems, a closed form equation may not be easily achieved. However, the concepts of capacity optimization are applicable through mechanical and/or electronic displacement of antenna elements. Once the capacity is optimized, various MIMO techniques, for example, singular value decomposition may be deployed to realize the optimized capacity. The following is an example on how to extend the techniques to a 3×3 configuration.

Figure 16:
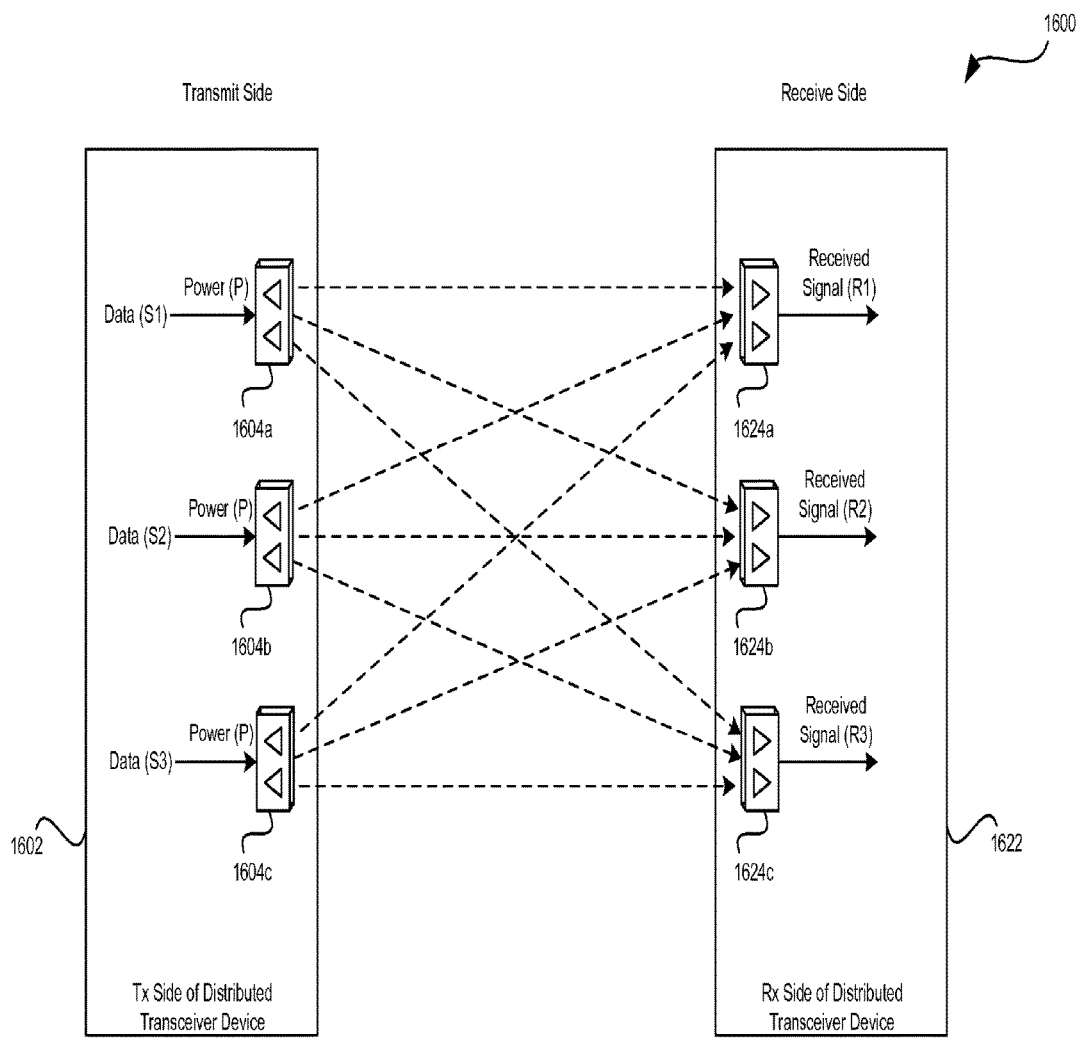
FIG. 16 is a block diagram of an exemplary propagation model for a leaky wave distributed 3×3 transceiver environment where the channel matrix is asymmetric, in accordance with an exemplary embodiment of the invention.

FIG. 16 is a block diagram of an exemplary propagation model for a leaky wave distributed 3×3 transceiver environment where the channel matrix is asymmetric, in accordance with an exemplary embodiment of the invention. Referring to FIG. 16, there is shown a propagation model 1600 comprising a transmit side of a distributed transceiver device 1602 and a receive side of a distributed transceiver device 1622. The transmit side of the distributed transceiver device 1602 comprises distributed transmitter portions 1604a, 1604b, 1604c. The receive side of the distributed transceiver device 1622 comprises distributed receiver portions 1624a, 1624b, 1624. Although a 3×3 system of distributed transceivers is illustrated, the invention is not limited in this regard. Accordingly, the principles may be applied to a 4×4 system of distributed transceivers and so on.

In FIG. 16, the propagation channel responses are modified for a 3×3 scenario. For ease of notation and generalization, $b_{ij}$ denotes the channel gain between the transmitter i and the receiver j. In special symmetric cases, the configuration becomes $b_{ii}=1$ for $i=\{1,2,3\}$ and $b_{ij}=b_{ji}$. Furthermore, $\theta_{ij}$ denotes the channel phase between the transmitter i and the receiver j. The corresponding system transfer function may be represented by the following exemplary expression:

$$\begin{bmatrix} R1 \\ R2 \\ R3 \end{bmatrix} = H \begin{bmatrix} S1 \\ S2 \\ S3 \end{bmatrix} + \begin{bmatrix} n1 \\ n2 \\ n3 \end{bmatrix}$$

where (S1, S2, S3) are the data stream samples, which may be selected from constellation points, that are transmitted from the transmit portion of the distributed transceiver, (R1, R2, R3) are the data stream samples, which may correspond to the transmitted constellation points that are received at the receive portion of the distributed transceiver.

The channel matrix H may be given by the following exemplary expression:

$$H = h \begin{bmatrix} b11e^{j\theta 11} & b12e^{j\theta 12} & b13e^{j\theta 13} \\ b21e^{j\theta 21} & b22e^{j\theta 22} & b23e^{j\theta 23} \\ b31e^{j\theta 31} & b32e^{j\theta 32} & b33e^{j\theta 33} \end{bmatrix}$$

where h is a scalar that represents the channel gain, that is a real number with no phase component and (n1, n2, n3) represents the receiver noise sources additive at the receive portion of the distributed transceivers.

The MIMO channel capacity, C, of the above system may be represented by the following exemplary expression:

$$C = B \times \log\left(\det\left(I + \frac{h^2}{\sigma_n^2} A A^*\right)\right)$$

where B is the spectrum used, $\sigma_n^2$ is the noise variance at each receiver, I is the 3×3 identity matrix and matrix A represents:

$$A = \begin{bmatrix} b11e^{j\theta 11} & b12e^{j\theta 12} & b13e^{j\theta 13} \\ b21e^{j\theta 21} & b22e^{j\theta 22} & b23e^{j\theta 23} \\ b31e^{j\theta 31} & b32e^{j\theta 32} & b33e^{j\theta 33} \end{bmatrix}$$

The available system parameters may be tuned to maximize the MIMO capacity that was defined above. The position of the transceivers may be moved in order to optimize the capacity. In the symmetric case, only a limited number of the placement for the transceivers may be tuned in order to optimize the capacity. Assume (x,y,z) locations of transmit portion of the distributed transceivers 1604a, 1604b, 1604c and the receive portion of the distributed transceivers 1624a, 1624b, 1624c are denoted by (x1,y1,z1), (x2,y2,z2), (x3,y3,z3), (x4,y4,z4), (x5,y5,z5), (x6,y6,z6), respectively. Furthermore, assume that a subset or all of these locations may be tunable mechanically and/or electronically for the purpose of optimizing performance. In some embodiments of the invention, only the z dimension may be tuned and/or tunable. In this case, the system may utilize a searching method, for example, brute-force, adaptive, iterative, and/or sub-optimal method to find a configuration for the optimization problem, which may be represented by the following exemplary expression:

$$\max_{over(x1,y1,z1),(x2,y2,z2),(x3,y3,z3),(x4,y4,z4),(x5,y5,z5),(x6,y6,z6)} \det\left(I + \frac{h^2}{\sigma_n^2}AA^*\right)$$

where the parameters bij and h are known and measured through propagation channel estimation and may be considered constant over different values of locations for ease of finding the optimum solution. Furthermore, noise variance is also known. For each set of:

(x1,y1,z1),(x2,y2,z2),(x3,y3,z3),(x4,y4,z4),(x5,y5,z5),
(x6,y6,z6)

the corresponding values of $\theta 11$, $\theta 12$, $\theta 13$, $\theta 21$, $\theta 22$, $\theta 23$, $\theta 31$, $\theta 32$, $\theta 33$ may be derived, for example, through triangulation and then the matrix A and det $$\left(I + \frac{h^2}{\sigma_n^2}AA^*\right)$$

may be calculated. The set of locations that results in the best capacity may be selected as the optimal configuration.

Once the above optimization (optimal or sub-optimal) is solved over location parameters, the resulting phase values $\theta 11, \theta 12, \theta 13, \theta 21, \theta 22, \theta 23, \theta 31, \theta 32, \theta 33$ may be estimated and/or measured. The resulting optimal channel matrix A is known. Similar to the symmetric scenario, a pre-coding scheme at transmit portion of the distributed transceiver 1602 and a post-processing scheme at receive portion of the distributed transceiver 1622 may be utilized to achieve the above optimal capacity. It may be shown that the singular value decomposition of channel matrix H becomes:

$$H = hU\begin{bmatrix} \gamma_1 & 0 & 0 \\ 0 & \gamma_2 & 0 \\ 0 & 0 & \gamma_3 \end{bmatrix}V^-$$

where the matrices U and V are unitary matrices and $\gamma_1$, $\gamma_2$, $\gamma_1$ determines the effective SNR for each stream, which may take on different values. Using the above model, the transmitted symbols (S1, S2, S3) may be generated from three independent symbols (S'1, S'2, S'3) through the following pre-coding before being transmitted over the three transmitters:

$$\begin{bmatrix} S1 \\ S2 \\ S3 \end{bmatrix} = V\begin{bmatrix} S'1 \\ S'2 \\ S'3 \end{bmatrix}$$

At the receiver portion of the distributed transceivers 1622, the received symbols (R1,R2,R3) may be processed to generate three new symbols (R'1,R'2,R'3) as represented by the following exemplary expression:

$$\begin{bmatrix} R'1 \\ R'2 \\ R'3 \end{bmatrix} = U^*\begin{bmatrix} R1 \\ R2 \\ R3 \end{bmatrix}$$

The unitary matrices U and V are available at both the transmit portion of the distributed transceiver 1602 and the receive portion of the distributed transceiver 1622. Both matrices may be calculated using the channel matrix H. Different channel estimation methods may be utilized to estimate, track and/or fine-tune the channel response matrix H, utilizing, for example, pilot training. If the channel is estimated at the receive portion of the distributed transceiver 1622, the receive portion of the distributed transceiver 1622 may be operable to feedback the estimated channel values or the singular value decomposition values to the transmitter portion of the distributed transceiver 1602. The channel elements of the channel response matrix H may be updated periodically based on, for example, the rate of variation in the environment. Based on the above pre-coding and post-processing, the system model may be represented by the following exemplary expression:

$$\begin{bmatrix} R'1 \\ R'2 \\ R'3 \end{bmatrix} = h\begin{bmatrix} \gamma_1 & 0 & 0 \\ 0 & \gamma_2 & 0 \\ 0 & 0 & \gamma_3 \end{bmatrix}\begin{bmatrix} S'1 \\ S'2 \\ S'3 \end{bmatrix} + \begin{bmatrix} n'1 \\ n'2 \\ n'3 \end{bmatrix}$$

Consequently, the symbol S'1 may be decoded from R'1, with no interference from S'2 and S'3 and so forth. The above techniques may be extended or applied to different number of transceivers.

Figure 17:
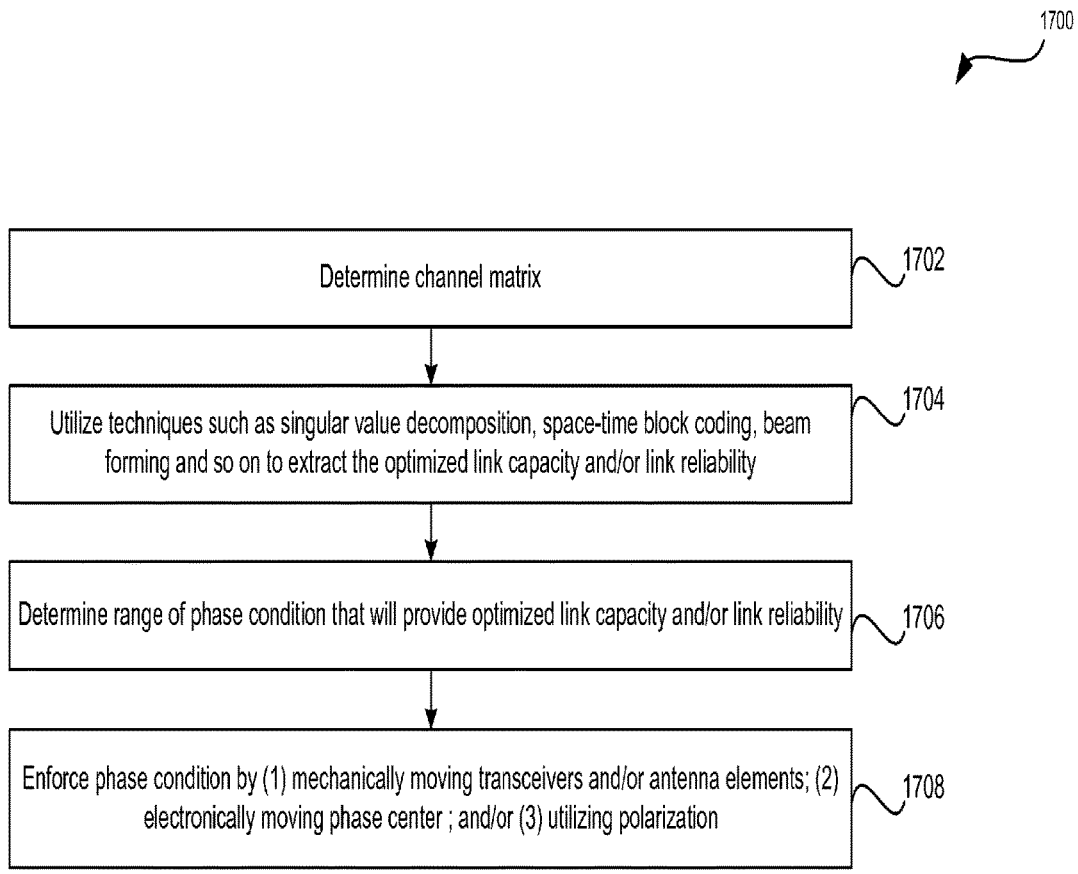
FIG. 17 is a flow chart illustrating exemplary steps for optimizing communication in leaky wave distributed transceiver environments, in accordance with an exemplary embodiment of the invention.

FIG. 17 is a flow chart illustrating exemplary steps for optimizing communication in leaky wave distributed transceiver environments, in accordance with an exemplary embodiment of the invention. Referring to FIG. 17, there is shown a flow chart 1700 comprising exemplary steps 1702 through 1708. In step 1702, the channel matrix may be determined. In step 1704, exemplary techniques such as singular value decomposition, space-time block coding, beamforming and so on may be utilized to extract the optimized link capacity and/or link reliability. In step 1706, the range of phase conditions that will provide optimized link capacity and/or link reliability may be determined. In step 1708, the phase condition may be enforced by (1) mechanically moving transceivers and/or antenna elements; (2) electronically moving phase center to enforce phase condition; and/or (3) utilizing polarization As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for optimizing communication in leaky wave distributed transceiver environments.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of transmitting a plurality of data streams by a first communication device comprising a plurality of distributed transceivers, each distributed transceiver comprising one or more corresponding antenna arrays, the method comprising:
   determining a location of the first communication device;
   identifying a set of one or more reflectors within a communication environment of the first communication device;
   determining characteristics of the set of reflectors, the characteristics comprising at least one of a reflective property and a refractive property of the set of reflectors;
   based on the determined locations of the first communication device and the identified set of reflectors, and the determined characteristics of the set of reflectors, configuring antenna patterns of the antenna arrays of a set of distributed transceivers in the plurality of distributed transceivers to associate each distributed transceiver in the set of distributed transceivers with an identified reflector to transmit a data stream to a second communication device using the distributed transceiver and the associated reflector, said configuring comprising adjusting a phase of signals transmitted by the antenna arrays of the set of distributed transceivers to shape the antenna arrays' beam patterns, wherein at least two distributed transceivers are configured to transmit different data streams to the second communication device;
   transmitting a plurality of data streams from the antenna arrays of the set of distributed transceivers of the first communication device to the second communication device;
   storing a set of the determined characteristics, corresponding spatial and temporal information, a location for the set of reflectors, and signal propagation characteristics within the communication environment; and
   generating a map of the communication environment based on one or more of the stored determined characteristics, the corresponding spatial and temporal information, the location of the set of reflectors, and the signal propagation characteristics.

2. The method of claim 1 further comprising determining whether a data path between each antenna array of the first communication device and the second communication device is a reflective path or a refractive path, wherein configuring the antenna patterns of the antenna arrays of the set of distributed transceivers comprises configuring the antenna patterns based on whether the data path between each antenna array of the first communication device and the second communication device is a reflective path or a refractive path.

3. The method of claim 1, wherein the set of reflectors comprises a set of reflectors installed in the communication environment to optimize communication between communication devices in the environment.

4. The method of claim 1, wherein the set of reflectors comprises at least one of (i) a set of curved reflective surfaces and (ii) a set of refractive surfaces.

5. The method of claim 1 further comprising:
   analyzing characteristics of signals received and transmitted by one or more of the plurality of distributed transceivers to identify curved reflectors and refractive reflectors in the communication environment; and
   utilizing the identified curved and refractive reflectors to communicate different data streams.

6. The method of claim 1 further comprising identifying a communication path between each identified reflector and the first communication device, wherein configuring the antenna patterns of the antenna arrays of the set of distributed transceivers further comprises configuring the antenna patterns of the antenna arrays of the set of distributed transceivers to communicate the data streams utilizing the identified communication paths between each identified reflector and the first communication device.

7. The method of claim 1 further comprising:
identifying a location of the set of reflectors, wherein configuring the antenna patterns of the antenna arrays of the set of distributed transceivers further comprises utilizing the location of the reflectors to configure the antenna patterns.

8. The method of claim 1 further comprising dynamically updating one or more of the stored determined characteristics, the corresponding temporal information, the corresponding spatial information, the location of the set of reflectors, the signal propagation characteristics, and the map based on at least one of additional information acquired by the first communication device, information received from one or more communication devices other than the first communication device, and information received from one or more network devices.

9. The method of claim 1 further comprising communicating communication environment data comprising one or more of the determined characteristics, the corresponding temporal information, the corresponding spatial information, the location for the set of reflectors, and the signal propagation characteristics, from the first communication device to a coordinating device, wherein the coordinating device is configured to:
process and aggregate the communicated communication environment data with other corresponding data for the communication environment, which is received from one or more communication devices other than the first communication device and a set of network devices to generate resulting data for the communication environment; and
communicate the resulting data for the communication environment from the coordinating device to at least one of the first communication device, the one or more communication devices and the set of network devices.

10. The method of claim 9 further comprising:
receiving the communicated resulting data for the communication environment from said coordinating device; and
adjusting configuration of one or more of (i) the plurality of distributed transceivers and (ii) the corresponding antenna arrays based on the received resulting data for the communication environment.

11. The method of claim 1, wherein configuring the antenna patterns of the antenna arrays comprises determining one or more communication paths for communicating said plurality of data streams within the communication environment, the method further comprising:
configuring one or more of the set of distributed transceivers and the corresponding antenna arrays to communicate said plurality of data streams via said determined one or more communication paths,
wherein the determined one or more communication paths for communicating said plurality of data streams within the communication environment utilizes one or more of a reflective and a refractive surface of the set of reflectors.

12. A first communication device comprising:
a plurality of distributed transceivers, each distributed transceiver comprising one or more corresponding antenna arrays;
a processor configured to:
determine a location of the first communication device;
identify a set of one or more reflectors within a communication environment of said first communication device; and
determine characteristics of the set of reflectors, the characteristics comprising at least one of a reflective property and a refractive property of the set of reflectors;
based on the determined locations of the first communication device and the identified set of reflectors, and the determined characteristics of the set of reflectors, configure antenna patterns of the antenna arrays of a set of distributed transceivers in the plurality of distributed transceivers to associate each distributed transceiver in the set of distributed transceivers with an identified reflector to transmit a data stream to a second communication device using the distributed transceiver and the associated reflector, the configuring comprising adjusting a phase of signals transmitted by the antenna arrays of the set of distributed transceivers to shape the antenna arrays' beam patterns, at least two distributed transceivers configured to transmit different data streams to the second communication device; and
a memory configured to store a set of the determined characteristics, corresponding spatial and temporal information, a location for the set of reflectors, and signal propagation characteristics within the communication environment,
where the antenna arrays of the set of distributed transceivers of the first communication device are configured to transmit a plurality of data streams to the second communication device, and
wherein the processor is further configured to generate a map of the communication environment based on one or more of the stored determined characteristics, the corresponding spatial and temporal information, the location of the set of reflectors, and the signal propagation characteristics.

13. The communication device of claim 12, the processor further configured to determine whether a data path between each antenna array of the first communication device and the second communication device is a reflective path or a refractive path, wherein configuring the antenna patterns of the antenna arrays of the set of distributed transceivers comprises configuring the antenna patterns based on whether the data path between each antenna array of the first communication device and the second communication device is a reflective path or a refractive path.

14. The communication device of claim 12, wherein the set of reflectors comprise a set of reflectors installed in the communication environment to optimize communication between communication devices in the environment.

15. The communication device of claim 12, wherein the set of reflectors comprises at least one of (i) a set of curved reflective surfaces and (ii) a set of refractive surfaces.

16. The communication device of claim 12, the processor further configured to analyze characteristics of signals received and transmitted by one or more of the plurality of distributed transceivers to identify curved reflectors and refractive reflectors in the communication environment, the antenna arrays of the set of distributed transceivers further configured to utilize the identified curved and refractive reflectors to communicate different data streams.

17. The communication device of claim 12, the processor further configured to identify a communication path between each identified reflector and the first communication device, wherein configuring the antenna patterns of the antenna arrays of the set of distributed transceivers further comprises configuring the antenna patterns of the antenna arrays of the set of distributed transceivers to communicate the data streams utilizing the identified communication paths between each identified reflector and the first communication device.

18. The communication device of claim 12, the processor further configured to identify a location of the set of reflectors, wherein configuring the antenna patterns of the antenna arrays of the set of distributed transceivers further comprises utilizing the location of the reflectors to configure the antenna patterns.

19. The communication device of claim 12, the processor further configured to dynamically update one or more of the stored determined characteristics, the corresponding temporal information, the corresponding spatial information, the location of the set of reflectors, the signal propagation characteristics, and the map based on at least one of additional information acquired by the first communication device, information received from one or more communication devices other than the first communication device, and information received from one or more network devices.

20. The communication device of claim 12, the processor further configured to communicate communication environment data comprising one or more of the determined characteristics, the corresponding temporal information, the corresponding spatial information, the location for the set of reflectors, and the signal propagation characteristics, from the first communication device to a coordinating device, wherein the coordinating device is configured to:
  process and aggregate the communicated communication environment data with other corresponding data for the communication environment, which is received from one or more communication devices other than the first communication device and a set of network devices to generate resulting data for the communication environment; and
  communicate the resulting data for the communication environment from the coordinating device to at least one of the first communication device, the one or more communication devices and the set of network devices.

21. The communication device of claim 20, the processor further configured to adjust configuration of one or more of (i) the plurality of distributed transceivers and (ii) the corresponding antenna arrays based on the resulting data for the communication environment received from the coordinating device.

22. The communication device of claim 12, wherein configuring the antenna patterns of the antenna arrays comprises determining one or more communication paths for communicating said plurality of data streams within the communication environment, the processor further configured to:
  configure one or more of the set of distributed transceivers and the corresponding antenna arrays to communicate said plurality of data streams via said determined one or more communication paths,
  wherein the determined one or more communication paths for communicating said plurality of data streams within the communication environment utilizes one or more of a reflective and a refractive surface of the set of reflectors.

* * * * *